US00RE50355E

(19) United States
(12) Reissued Patent
Guo et al.

(10) Patent Number: US RE50,355 E
(45) Date of Reissued Patent: Mar. 25, 2025

(54) REDUCING UNICAST SESSION DURATION WITH RESTART TV

(71) Applicant: Adeia Technologies Inc., San Jose, CA (US)

(72) Inventors: Terry Qing Guo, Mountain View, CA (US); Nadav M. Neufeld, Sunnyvale, CA (US); Edwin K. Lau, San Francisco, CA (US); Haoyun Wu, Redmond, WA (US)

(73) Assignee: Adeia Technologies Inc., San Jose, CA (US)

(21) Appl. No.: 17/006,545

(22) Filed: Aug. 28, 2020

Related U.S. Patent Documents

Reissue of:
(64) Patent No.: 10,063,934
Issued: Aug. 28, 2018
Appl. No.: 12/277,797
Filed: Nov. 25, 2008

(51) Int. Cl.

| | |
|---|---|
| ***H04N 21/63*** | (2011.01) |
| ***H04N 21/432*** | (2011.01) |
| ***H04N 21/433*** | (2011.01) |
| ***H04N 21/462*** | (2011.01) |
| ***H04N 21/6405*** | (2011.01) |
| ***H04N 21/6408*** | (2011.01) |

(52) U.S. Cl.
CPC ..... *H04N 21/631* (2013.01); *H04N 21/4325* (2013.01); *H04N 21/4334* (2013.01); *H04N 21/4622* (2013.01); *H04N 21/6405* (2013.01); *H04N 21/6408* (2013.01)

(58) Field of Classification Search
CPC ..... H04N 21/631; H04N 21/6405; H04N 21/6408; H04N 21/4334; H04N 21/4325; H04N 21/4622
See application file for complete search history.

(56) References Cited

U.S. PATENT DOCUMENTS

| | | | |
|---|---|---|---|
| 4,024,401 | A | 5/1977 | Bernstein et al. |
| 4,079,419 | A | 3/1978 | Siegle et al. |
| 4,081,753 | A | 3/1978 | Miller |
| 4,081,754 | A | 3/1978 | Jackson |
| 4,103,524 | A | 8/1978 | Mitchell et al. |

(Continued)

FOREIGN PATENT DOCUMENTS

| | | |
|---|---|---|
| AU | 731010 B2 | 3/2001 |
| AU | 733993 B2 | 5/2001 |

(Continued)

OTHER PUBLICATIONS

U.S. Appl. No. 12/277,797, filed Nov. 25, 2008.

(Continued)

*Primary Examiner* — Jalatee Worjloh
(74) *Attorney, Agent, or Firm* — Haley Guiliano LLP

(57) ABSTRACT

A first portion of programming aired prior to a first time is obtained via a unicast session with a server, the first portion including previously aired programming. When the programming data being sent via the unicast session catches up to a multicast broadcast of the programming, the unicast session is terminated and a switch is made to obtaining a remaining portion of the programming from a different source other than the server. This different source can be, for example, a local storage device or a multicast broadcast of the programming.

40 Claims, 7 Drawing Sheets

(56) References Cited

U.S. PATENT DOCUMENTS 4,162,513 A 7/1979 Beyers, Jr. et al.
4,170,782 A 10/1979 Miller
4,193,120 A 3/1980 Yello
4,206,483 A 6/1980 Nakamura
4,264,924 A 4/1981 Freeman
4,264,925 A 4/1981 Freeman et al.
4,267,563 A 5/1981 Sato et al.
4,271,532 A 6/1981 Wine
4,280,148 A 7/1981 Saxena
4,300,040 A 11/1981 Gould et al.
4,305,101 A 12/1981 Yarbrough et al.
4,310,924 A 1/1982 Miyasaka et al.
4,325,081 A 4/1982 Abe et al.
4,331,974 A 5/1982 Cogswell et al.
4,334,242 A 6/1982 Mangold
4,355,415 A 10/1982 George et al.
4,367,559 A 1/1983 Tults
4,375,651 A 3/1983 Templin et al.
4,381,522 A 4/1983 Lambert
4,385,210 A 5/1983 Marquiss
4,390,901 A 6/1983 Keiser
4,422,105 A 12/1983 Rodesch et al.
4,425,579 A 1/1984 Merrell
4,429,385 A 1/1984 Cichelli et al.
4,435,842 A 3/1984 Mayumi et al.
4,449,249 A 5/1984 Price
4,475,153 A 10/1984 Kihara et al.
4,488,179 A 12/1984 Krüger et al.
4,495,654 A 1/1985 Deiss
4,504,393 A 3/1985 Davies
4,510,623 A 4/1985 Bonneau et al.
4,519,003 A 5/1985 Scholz
4,527,194 A 7/1985 Sirazi
4,536,791 A 8/1985 Campbell et al.
4,554,584 A 11/1985 Elam et al.
4,563,710 A 1/1986 Baldwin
4,573,072 A 2/1986 Freeman
4,593,414 A 6/1986 Koyanagi
4,598,288 A 7/1986 Yarbrough et al.
4,602,279 A 7/1986 Freeman
4,605,964 A 8/1986 Chard
4,605,973 A 8/1986 Von Kohorn
4,621,259 A 11/1986 Schepers et al.
4,625,080 A 11/1986 Scott
4,630,108 A 12/1986 Gomersall
4,631,601 A 12/1986 Brugliera et al.
4,635,121 A 1/1987 Hoffman et al.
4,638,424 A 1/1987 Beglin et al.
4,641,203 A 2/1987 Miller
4,641,205 A 2/1987 Beyers, Jr.
4,645,873 A 2/1987 Chomet
4,677,501 A 6/1987 Saltzman et al.
4,680,647 A 7/1987 Moriyama
4,685,131 A 8/1987 Horne
4,689,022 A 8/1987 Peers et al.
4,691,351 A 9/1987 Hayashi et al.
4,694,490 A 9/1987 Harvey et al.
4,704,725 A 11/1987 Harvey et al.
4,706,121 A 11/1987 Young
4,718,107 A 1/1988 Hayes
RE32,632 E 3/1988 Atkinson
4,745,549 A 5/1988 Hashimoto
4,750,036 A 6/1988 Martinez
4,750,213 A 6/1988 Novak
4,751,578 A 6/1988 Reiter et al.
4,754,326 A 6/1988 Kram et al.
4,755,883 A 7/1988 Uehira
4,761,684 A 8/1988 Clark et al.
4,771,375 A 9/1988 Beglin et al.
4,775,935 A 10/1988 Yourick
4,787,063 A 11/1988 Muguet
4,802,022 A 1/1989 Harada
4,829,558 A 5/1989 Welsh
4,832,373 A 5/1989 Swan
4,837,584 A 6/1989 Sharkey et al.
4,841,132 A 6/1989 Kajitani et al.
4,841,562 A 6/1989 Lem
4,843,482 A 6/1989 Hegendorfer
4,847,696 A 7/1989 Matsumoto et al.
4,847,698 A 7/1989 Freeman
4,847,700 A 7/1989 Freeman
4,857,999 A 8/1989 Welsh
4,866,434 A 9/1989 Keenan
4,873,584 A 10/1989 Hashimoto
4,879,611 A 11/1989 Fukui et al.
4,882,732 A 11/1989 Kaminaga
4,885,579 A 12/1989 Sandbank
4,890,321 A 12/1989 Seth-Smith et al.
4,894,789 A 1/1990 Yee
4,899,370 A 2/1990 Kameo et al.
4,908,707 A 3/1990 Kinghorn
4,908,713 A 3/1990 Levine
4,920,432 A 4/1990 Eggers et al.
4,930,158 A 5/1990 Vogel
4,930,160 A 5/1990 Vogel
4,937,806 A 6/1990 Babson et al.
4,945,563 A 7/1990 Horton et al.
4,947,244 A 8/1990 Fenwick et al.
4,949,187 A 8/1990 Cohen
4,959,719 A 9/1990 Strubbe et al.
4,959,720 A 9/1990 Duffield et al.
4,963,994 A 10/1990 Levine
4,963,995 A 10/1990 Lang
4,965,825 A 10/1990 Harvey et al.
4,977,455 A 12/1990 Young
4,991,012 A 2/1991 Yoshino
4,994,908 A 2/1991 Kuban et al.
4,996,642 A 2/1991 Hey
5,001,554 A 3/1991 Johnson et al.
5,012,409 A 4/1991 Fletcher et al.
5,014,125 A 5/1991 Pocock et al.
5,016,273 A 5/1991 Hoff
5,027,400 A 6/1991 Baji et al.
5,036,314 A 7/1991 Barillari et al.
5,038,211 A 8/1991 Hallenbeck
5,046,092 A 9/1991 Walker et al.
5,047,867 A 9/1991 Strubbe et al.
5,053,948 A 10/1991 DeClute et al.
5,057,932 A 10/1991 Lang
5,058,160 A 10/1991 Banker et al.
5,068,733 A 11/1991 Bennett
5,075,771 A 12/1991 Hashimoto
5,085,385 A 2/1992 Breitenstein
5,089,885 A 2/1992 Clark
5,090,049 A 2/1992 Chen
5,099,319 A 3/1992 Esch et al.
5,105,184 A 4/1992 Pirani et al.
5,109,279 A 4/1992 Ando
5,109,414 A 4/1992 Harvey et al.
5,111,296 A 5/1992 Duffield et al.
5,113,259 A 5/1992 Romesburg et al.
5,119,188 A 6/1992 McCalley et al.
5,119,577 A 6/1992 Lilly
5,121,476 A 6/1992 Yee
5,123,046 A 6/1992 Levine
5,126,851 A 6/1992 Yoshimura et al.
5,132,992 A 7/1992 Yurt et al.
5,134,649 A 7/1992 Gutzmer
5,134,719 A 7/1992 Mankovitz
5,151,789 A 9/1992 Young
5,152,012 A 9/1992 Schwob
5,155,591 A 10/1992 Wachob
5,168,353 A 12/1992 Walker et al.
5,168,372 A 12/1992 Sweetser
5,170,388 A 12/1992 Endoh
5,172,413 A 12/1992 Bradley et al.
5,179,439 A 1/1993 Hashimoto
5,187,589 A 2/1993 Kono et al.
5,189,608 A 2/1993 Lyons et al.
5,189,630 A 2/1993 Barstow et al.
5,191,423 A 3/1993 Yoshida
5,195,092 A 3/1993 Wilson et al.
5,195,134 A 3/1993 Inoue
5,200,822 A 4/1993 Bronfin et al.

(56) References Cited

U.S. PATENT DOCUMENTS 5,202,915 A 4/1993 Nishii
5,210,611 A 5/1993 Yee et al.
5,212,553 A 5/1993 Maruoka
5,216,228 A 6/1993 Hashimoto
5,220,420 A 6/1993 Hoarty et al.
5,223,924 A 6/1993 Strubbe
5,225,902 A 7/1993 McMullan, Jr.
5,227,874 A 7/1993 Von Kohorn
5,228,077 A 7/1993 Darbee
5,231,493 A 7/1993 Apitz
5,231,494 A 7/1993 Wachob
5,231,543 A 7/1993 Kubota et al.
RE34,340 E 8/1993 Freeman
5,233,423 A 8/1993 Jernigan et al.
5,241,428 A 8/1993 Goldwasser et al.
5,247,364 A 9/1993 Banker et al.
5,249,043 A 9/1993 Grandmougin et al.
5,251,921 A 10/1993 Daniels
5,253,066 A 10/1993 Vogel
5,253,275 A 10/1993 Yurt et al.
5,260,778 A 11/1993 Kauffman et al.
5,262,860 A 11/1993 Fitzpatrick et al.
5,280,392 A 1/1994 Koo
5,283,560 A 2/1994 Bartlett
5,283,639 A 2/1994 Esch et al.
5,283,819 A 2/1994 Glick et al.
5,285,284 A 2/1994 Takashima et al.
5,291,554 A 3/1994 Morales
5,293,357 A 3/1994 Hallenbeck
5,296,931 A 3/1994 Na et al.
5,297,204 A 3/1994 Levine
5,299,006 A 3/1994 Kim et al.
5,301,028 A 4/1994 Banker et al.
5,301,270 A 4/1994 Steinberg et al.
5,307,173 A 4/1994 Yuen et al.
5,311,423 A 5/1994 Clark
5,315,452 A 5/1994 Hong
5,317,403 A 5/1994 Keenan
5,317,730 A 5/1994 Moore et al.
5,319,445 A 6/1994 Fitts
5,323,234 A 6/1994 Kawasaki
5,323,240 A 6/1994 Amano et al.
5,325,183 A 6/1994 Rhee
5,325,423 A 6/1994 Lewis
5,335,079 A 8/1994 Yuen et al.
5,335,277 A 8/1994 Harvey et al.
5,339,393 A 8/1994 Duffy et al.
5,339,434 A 8/1994 Rusis
5,341,350 A 8/1994 Frank et al.
5,345,430 A 9/1994 Moe
5,347,632 A 9/1994 Filepp et al.
5,351,075 A 9/1994 Herz et al.
5,353,121 A 10/1994 Young et al.
5,355,162 A 10/1994 Yazolino et al.
5,355,302 A 10/1994 Martin et al.
5,357,276 A 10/1994 Banker et al.
5,359,367 A 10/1994 Stockill
5,371,551 A 12/1994 Logan et al.
5,373,288 A 12/1994 Blahut
5,374,951 A 12/1994 Welsh
5,377,317 A 12/1994 Bates et al.
5,382,970 A 1/1995 Kiefl
5,382,983 A 1/1995 Kwoh et al.
5,386,493 A 1/1995 Degen et al.
5,390,027 A 2/1995 Henmi et al.
5,392,983 A 2/1995 Clarke-Bolling et al.
5,396,546 A 3/1995 Remillard
5,398,074 A 3/1995 Duffield et al.
5,398,138 A 3/1995 Tomita
5,400,402 A 3/1995 Garfinkle
5,404,567 A 4/1995 DePietro et al.
5,410,326 A 4/1995 Goldstein
5,410,343 A 4/1995 Coddington et al.
5,410,344 A 4/1995 Graves et al.
5,410,367 A 4/1995 Zahavi et al.
5,412,720 A 5/1995 Hoarty
5,414,569 A 5/1995 Sekiguchi et al.
5,414,756 A 5/1995 Levine
5,416,508 A 5/1995 Sakuma et al.
5,418,622 A 5/1995 Takeuchi
5,426,699 A 6/1995 Wunderlich et al.
5,432,561 A 7/1995 Strubbe
5,434,626 A 7/1995 Hayashi et al.
5,434,678 A 7/1995 Abecassis
5,438,355 A 8/1995 Palmer
5,440,678 A 8/1995 Eisen et al.
5,442,389 A 8/1995 Blahut et al.
5,442,390 A 8/1995 Hooper et al.
5,444,499 A 8/1995 Saitoh
5,446,488 A 8/1995 Vogel
5,446,919 A 8/1995 Wilkins
5,450,135 A 9/1995 Schick
5,452,012 A 9/1995 Saitoh
5,453,779 A 9/1995 Dan et al.
5,455,570 A 10/1995 Cook et al.
5,457,478 A 10/1995 Frank
5,459,522 A 10/1995 Pint
5,461,415 A 10/1995 Wolf et al.
5,465,113 A 11/1995 Gilboy
5,465,385 A 11/1995 Ohga et al.
5,467,264 A 11/1995 Rauch et al.
5,469,206 A 11/1995 Strubbe et al.
5,477,262 A 12/1995 Banker et al.
5,479,266 A 12/1995 Young et al.
5,479,268 A 12/1995 Young et al.
5,479,302 A 12/1995 Haines
5,479,497 A 12/1995 Kovarik
5,481,296 A 1/1996 Cragun et al.
5,483,278 A 1/1996 Strubbe et al.
5,485,197 A 1/1996 Hoarty
5,485,219 A 1/1996 Woo
5,485,221 A 1/1996 Banker et al.
5,485,518 A 1/1996 Hunter et al.
5,488,409 A 1/1996 Yuen et al.
5,497,420 A 3/1996 Garneau et al.
5,502,504 A 3/1996 Marshall et al.
5,506,932 A 4/1996 Holmes et al.
5,508,815 A 4/1996 Levine
5,512,934 A 4/1996 Kochanski
5,515,098 A 5/1996 Carles
5,515,106 A 5/1996 Chaney et al.
5,515,511 A 5/1996 Nguyen et al.
5,517,254 A 5/1996 Monta et al.
5,517,256 A 5/1996 Hashimoto
5,517,257 A 5/1996 Dunn et al.
5,517,321 A 5/1996 Yoshida
5,521,631 A 5/1996 Budow et al.
5,521,712 A 5/1996 Oguro
5,523,794 A 6/1996 Mankovitz et al.
5,523,796 A 6/1996 Marshall et al.
5,524,195 A 6/1996 Clanton, III et al.
5,524,271 A 6/1996 Hollmann et al.
5,524,272 A 6/1996 Podowski et al.
5,526,034 A 6/1996 Hoarty et al.
5,526,257 A 6/1996 Lerner
5,528,304 A 6/1996 Cherrick et al.
5,528,513 A 6/1996 Vaitzblit et al.
5,530,754 A 6/1996 Garfinkle
5,532,754 A 7/1996 Young et al.
5,534,911 A 7/1996 Levitan
5,537,141 A 7/1996 Harper et al.
5,539,449 A 7/1996 Blahut et al.
5,539,822 A 7/1996 Lett
5,539,880 A 7/1996 Lakhani
5,541,638 A 7/1996 Story
5,541,662 A 7/1996 Adams et al.
5,541,738 A 7/1996 Mankovitz
5,543,852 A 8/1996 Yuen et al.
5,543,856 A 8/1996 Rosser et al.
5,543,929 A 8/1996 Mankovitz et al.
5,543,933 A 8/1996 Kang et al.
5,544,321 A 8/1996 Theimer et al.
5,548,338 A 8/1996 Ellis et al.
5,548,345 A 8/1996 Brian et al.

(56) References Cited

U.S. PATENT DOCUMENTS 5,550,575 A 8/1996 West et al.
5,550,576 A 8/1996 Klosterman
5,550,578 A 8/1996 Hoarty et al.
5,550,825 A 8/1996 McMullan, Jr. et al.
5,550,863 A 8/1996 Yurt et al.
5,552,833 A 9/1996 Henmi et al.
5,553,123 A 9/1996 Chan et al.
5,553,221 A 9/1996 Reimer et al.
5,557,338 A 9/1996 Maze et al.
5,557,422 A 9/1996 Nishigaki et al.
5,557,721 A 9/1996 Fite et al.
5,557,724 A 9/1996 Sampat et al.
5,558,339 A 9/1996 Perlman
5,559,548 A 9/1996 Davis et al.
5,559,549 A 9/1996 Hendricks et al.
5,559,550 A 9/1996 Mankovitz
5,561,709 A 10/1996 Remillard
5,563,665 A 10/1996 Chang
5,568,272 A 10/1996 Levine
5,568,614 A 10/1996 Mendelson et al.
5,570,295 A 10/1996 Isenberg et al.
5,570,415 A 10/1996 Stretton et al.
5,571,282 A 11/1996 Earle
5,572,332 A 11/1996 Shin
5,572,442 A 11/1996 Schulhof et al.
5,574,778 A 11/1996 Ely et al.
5,574,962 A 11/1996 Fardeau et al.
5,574,965 A 11/1996 Welmer
5,576,755 A 11/1996 Davis et al.
5,576,951 A 11/1996 Lockwood
5,579,239 A 11/1996 Freeman et al.
5,581,479 A 12/1996 McLaughlin et al.
5,581,614 A 12/1996 Ng et al.
5,583,560 A 12/1996 Florin et al.
5,583,561 A 12/1996 Baker et al.
5,583,563 A 12/1996 Wanderscheid et al.
5,583,576 A 12/1996 Perlman et al.
5,583,653 A 12/1996 Timmermans et al.
5,583,763 A 12/1996 Atcheson et al.
5,585,838 A 12/1996 Lawler et al.
5,585,858 A 12/1996 Harper et al.
5,585,865 A 12/1996 Amano et al.
5,585,866 A 12/1996 Miller et al.
5,586,264 A 12/1996 Belknap et al.
5,589,892 A 12/1996 Knee et al.
5,589,945 A 12/1996 Abecassis
5,592,482 A 1/1997 Abraham
5,592,551 A 1/1997 Lett et al.
5,592,571 A 1/1997 Peters
5,594,490 A 1/1997 Dawson et al.
5,594,491 A 1/1997 Hodge et al.
5,594,509 A 1/1997 Florin et al.
5,594,661 A 1/1997 Bruner et al.
5,594,779 A 1/1997 Goodman
5,595,865 A 1/1997 Possanza et al.
5,596,361 A 1/1997 Martinez
5,596,373 A 1/1997 White et al.
5,596,705 A 1/1997 Reimer et al.
5,598,523 A 1/1997 Fujita
5,600,364 A 2/1997 Hendricks et al.
5,600,365 A 2/1997 Kondo et al.
5,600,573 A 2/1997 Hendricks et al.
5,602,582 A 2/1997 Wanderscheid et al.
5,606,374 A 2/1997 Bertram
5,606,642 A 2/1997 Stautner et al.
5,606,726 A 2/1997 Yoshinobu
5,608,448 A 3/1997 Smoral et al.
5,610,653 A 3/1997 Abecassis
5,616,876 A 4/1997 Cluts
5,617,526 A 4/1997 Oran et al.
5,617,565 A 4/1997 Augenbraun et al.
5,619,247 A 4/1997 Russo
5,619,249 A 4/1997 Billock et al.
5,619,274 A 4/1997 Roop et al.
5,619,335 A 4/1997 Tsinberg et al.
5,619,570 A 4/1997 Tsutsui
5,621,456 A 4/1997 Florin et al.
5,621,579 A 4/1997 Yuen
5,623,613 A 4/1997 Rowe et al.
5,625,406 A 4/1997 Newberry et al.
5,625,464 A 4/1997 Compoint et al.
5,625,678 A 4/1997 Blomfield-Brown
5,625,693 A 4/1997 Rohatgi et al.
5,629,733 A 5/1997 Youman et al.
5,629,867 A 5/1997 Goldman
5,629,980 A 5/1997 Stefik et al.
5,630,060 A 5/1997 Tang et al.
5,630,067 A 5/1997 Kindell et al.
5,630,119 A 5/1997 Aristides et al.
5,631,995 A 5/1997 Weissensteiner et al.
5,632,007 A 5/1997 Freeman
5,634,051 A 5/1997 Thomson
5,635,978 A 6/1997 Alten et al.
5,635,979 A 6/1997 Kostreski et al.
5,635,987 A 6/1997 Park et al.
5,635,989 A 6/1997 Rothmuller
5,636,346 A 6/1997 Saxe
5,640,484 A 6/1997 Mankovitz
5,646,603 A 7/1997 Nagata et al.
5,646,796 A 7/1997 Kimura et al.
5,648,813 A 7/1997 Tanigawa et al.
5,648,824 A 7/1997 Dunn et al.
5,650,826 A 7/1997 Eitz
5,650,831 A 7/1997 Farwell
5,651,129 A 7/1997 Yokote et al.
5,652,613 A 7/1997 Lazarus et al.
5,652,615 A 7/1997 Bryant et al.
5,654,747 A 8/1997 Ottesen et al.
5,654,748 A 8/1997 Matthews, III
5,654,886 A 8/1997 Zereski, Jr. et al.
5,655,214 A 8/1997 Mullett et al.
5,657,072 A 8/1997 Aristides et al.
5,657,091 A 8/1997 Bertram
5,657,414 A 8/1997 Lett et al.
5,659,350 A 8/1997 Hendricks et al.
5,659,366 A 8/1997 Kerman
5,659,367 A 8/1997 Yuen
5,659,742 A 8/1997 Beattie et al.
5,661,516 A 8/1997 Carles
5,661,517 A 8/1997 Budow et al.
5,663,757 A 9/1997 Morales
5,666,293 A 9/1997 Metz et al.
5,666,498 A 9/1997 Amro
5,666,645 A 9/1997 Thomas et al.
5,671,276 A 9/1997 Eyer et al.
5,671,277 A 9/1997 Ikenoue et al.
5,671,377 A 9/1997 Bleidt et al.
5,671,411 A 9/1997 Watts et al.
5,671,607 A 9/1997 Clemens et al.
5,675,390 A 10/1997 Schindler et al.
5,675,734 A 10/1997 Hair
5,675,743 A 10/1997 Mavity
5,675,752 A 10/1997 Scott et al.
5,677,708 A 10/1997 Matthews, III et al.
5,677,981 A 10/1997 Kato et al.
5,682,195 A 10/1997 Hendricks et al.
5,682,206 A 10/1997 Wehmeyer et al.
5,682,525 A 10/1997 Bouve et al.
5,684,511 A 11/1997 Westerink et al.
5,684,525 A 11/1997 Klosterman
5,686,954 A 11/1997 Yoshinobu et al.
5,687,331 A 11/1997 Volk et al.
5,689,648 A 11/1997 Diaz et al.
5,689,663 A 11/1997 Williams
5,689,666 A 11/1997 Berquist et al.
5,691,476 A 11/1997 Madaras
5,692,213 A 11/1997 Goldberg et al.
5,692,214 A 11/1997 Levine
5,692,335 A 12/1997 Magnuson
5,694,163 A 12/1997 Harrison
5,694,176 A 12/1997 Bruette et al.
5,694,381 A 12/1997 Sako
5,696,695 A 12/1997 Ehlers et al.
5,696,765 A 12/1997 Safadi

(56) References Cited

U.S. PATENT DOCUMENTS 5,696,824 A 12/1997 Walsh
5,696,905 A 12/1997 Reimer et al.
5,699,052 A 12/1997 Miyahara
5,699,107 A 12/1997 Lawler et al.
5,699,125 A 12/1997 Rzeszewski et al.
5,699,528 A 12/1997 Hogan
5,701,383 A 12/1997 Russo et al.
5,703,604 A 12/1997 McCutchen
5,708,478 A 1/1998 Tognazzini
5,708,767 A 1/1998 Yeo et al.
5,708,780 A 1/1998 Levergood et al.
5,708,845 A 1/1998 Wistendahl et al.
5,708,961 A 1/1998 Hylton et al.
5,710,601 A 1/1998 Marshall et al.
5,710,605 A 1/1998 Nelson
5,710,815 A 1/1998 Ming et al.
5,710,884 A 1/1998 Dedrick
5,715,020 A 2/1998 Kuroiwa et al.
5,717,452 A 2/1998 Janin et al.
5,717,923 A 2/1998 Dedrick
5,721,815 A 2/1998 Ottesen et al.
5,721,829 A 2/1998 Dunn et al.
5,722,041 A 2/1998 Freadman
5,724,091 A 3/1998 Freeman et al.
5,724,103 A 3/1998 Batchelor
5,724,203 A 3/1998 Kwoh et al.
5,724,521 A 3/1998 Dedrick
5,724,525 A 3/1998 Beyers, II et al.
5,724,546 A 3/1998 Tsutsui et al.
5,724,567 A 3/1998 Rose et al.
5,726,702 A 3/1998 Hamaguchi et al.
5,727,060 A 3/1998 Young
5,731,844 A 3/1998 Rauch et al.
5,732,216 A 3/1998 Logan et al.
5,734,119 A 3/1998 France et al.
5,734,720 A 3/1998 Salganicoff
5,734,853 A 3/1998 Hendricks et al.
5,734,893 A 3/1998 Li et al.
5,737,028 A 4/1998 Bertram et al.
5,737,552 A 4/1998 Lavallee et al.
5,740,231 A 4/1998 Cohn et al.
5,740,388 A 4/1998 Hunt
5,740,549 A 4/1998 Reilly et al.
5,742,443 A 4/1998 Tsao et al.
5,742,816 A 4/1998 Barr et al.
5,742,905 A 4/1998 Pepe et al.
5,745,710 A 4/1998 Clanton, III et al.
5,748,191 A 5/1998 Rozak et al.
5,748,716 A 5/1998 Levine
5,748,732 A 5/1998 Le Berre et al.
5,749,043 A 5/1998 Worthy
5,749,081 A 5/1998 Whiteis
5,751,282 A 5/1998 Girard et al.
5,751,672 A 5/1998 Yankowski
5,751,883 A 5/1998 Ottesen et al.
5,752,159 A 5/1998 Faust et al.
5,752,160 A 5/1998 Dunn
5,754,771 A 5/1998 Epperson et al.
5,754,938 A 5/1998 Herz et al.
5,754,939 A 5/1998 Herz et al.
5,757,415 A 5/1998 Asamizuya et al.
5,757,417 A 5/1998 Aras et al.
5,758,257 A 5/1998 Herz et al.
5,758,258 A 5/1998 Shoff et al.
5,758,259 A 5/1998 Lawler
5,760,767 A 6/1998 Shore et al.
5,760,821 A 6/1998 Ellis et al.
5,761,372 A 6/1998 Yoshinobu et al.
5,761,417 A 6/1998 Henley et al.
5,761,601 A 6/1998 Nemirofsky et al.
5,761,606 A 6/1998 Wolzien
5,761,607 A 6/1998 Gudesen et al.
5,761,662 A 6/1998 Dasan
5,764,281 A 6/1998 Seo
5,767,896 A 6/1998 Nemirofsky
5,768,528 A 6/1998 Stumm
5,771,275 A 6/1998 Brunner et al.
5,771,354 A 6/1998 Crawford
5,774,170 A 6/1998 Hite et al.
5,774,357 A 6/1998 Hoffberg et al.
5,774,534 A 6/1998 Mayer
5,774,539 A 6/1998 Maass et al.
5,774,664 A 6/1998 Hidary et al.
5,774,666 A 6/1998 Portuesi
5,774,859 A 6/1998 Houser et al.
5,778,181 A 7/1998 Hidary et al.
5,778,182 A 7/1998 Cathey et al.
5,778,187 A 7/1998 Monteiro et al.
5,781,226 A 7/1998 Sheehan
5,781,227 A 7/1998 Goode et al.
5,781,228 A 7/1998 Sposato
5,781,246 A 7/1998 Alten et al.
5,781,734 A 7/1998 Ohno et al.
5,787,259 A 7/1998 Haroun et al.
5,788,507 A 8/1998 Redford et al.
5,790,198 A 8/1998 Roop et al.
5,790,201 A 8/1998 Antos
5,790,202 A 8/1998 Kummer et al.
5,790,423 A 8/1998 Lau et al.
5,790,426 A 8/1998 Robinson
5,790,753 A 8/1998 Krishnamoorthy et al.
5,790,835 A 8/1998 Case et al.
5,790,935 A 8/1998 Payton
5,790,952 A 8/1998 Seazholtz et al.
5,793,366 A 8/1998 Mano et al.
5,793,409 A 8/1998 Tetsumura
5,793,412 A 8/1998 Asamizuya
5,793,438 A 8/1998 Bedard
5,793,964 A 8/1998 Rogers et al.
5,793,971 A 8/1998 Fujita et al.
5,793,972 A 8/1998 Shane et al.
5,794,217 A 8/1998 Allen
5,796,952 A 8/1998 Davis et al.
5,798,785 A 8/1998 Hendricks et al.
5,798,921 A 8/1998 Johnson et al.
5,801,747 A 9/1998 Bedard
5,801,785 A 9/1998 Crump et al.
5,801,787 A 9/1998 Schein et al.
5,802,284 A 9/1998 Karlton et al.
5,805,154 A 9/1998 Brown
5,805,155 A 9/1998 Allibhoy et al.
5,805,167 A 9/1998 van Cruyningen
5,805,204 A 9/1998 Thompson et al.
5,805,763 A 9/1998 Lawler et al.
5,805,804 A 9/1998 Laursen et al.
5,805,806 A 9/1998 McArthur
5,808,608 A 9/1998 Young et al.
5,808,628 A 9/1998 Hinson et al.
5,808,662 A 9/1998 Kinney et al.
5,808,694 A 9/1998 Usui et al.
5,809,204 A 9/1998 Young et al.
5,809,214 A 9/1998 Nureki et al.
5,809,242 A 9/1998 Shaw et al.
5,809,246 A 9/1998 Goldman
5,809,471 A 9/1998 Brodsky
5,812,123 A 9/1998 Rowe et al.
5,812,124 A 9/1998 Eick et al.
5,812,205 A 9/1998 Milnes et al.
5,812,763 A 9/1998 Teng
5,812,930 A 9/1998 Zavrel
5,812,931 A 9/1998 Yuen
5,812,937 A 9/1998 Takahisa et al.
5,815,145 A 9/1998 Matthews, III
5,815,146 A 9/1998 Youden et al.
5,815,297 A 9/1998 Ciciora
5,815,662 A 9/1998 Ong
5,815,671 A 9/1998 Morrison
5,818,438 A 10/1998 Howe et al.
5,818,439 A 10/1998 Nagasaka et al.
5,818,441 A 10/1998 Throckmorton et al.
5,818,511 A 10/1998 Farry et al.
5,818,935 A 10/1998 Maa
5,819,019 A 10/1998 Nelson
5,819,156 A 10/1998 Belmont

(56) References Cited

U.S. PATENT DOCUMENTS

| | | | |
|---|---|---|---|
| 5,819,160 | A | 10/1998 | Foladare et al. |
| 5,819,284 | A | 10/1998 | Farber et al. |
| 5,819,285 | A | 10/1998 | Damico et al. |
| 5,822,123 | A | 10/1998 | Davis et al. |
| 5,822,530 | A | 10/1998 | Brown |
| 5,822,606 | A | 10/1998 | Morton |
| 5,825,407 | A | 10/1998 | Cowe et al. |
| 5,828,419 | A | 10/1998 | Bruette et al. |
| 5,828,420 | A | 10/1998 | Marshall et al. |
| 5,828,839 | A | 10/1998 | Moncreiff |
| 5,828,945 | A | 10/1998 | Klosterman |
| RE35,954 | E | 11/1998 | Levine |
| 5,830,068 | A | 11/1998 | Brenner et al. |
| 5,831,664 | A | 11/1998 | Wharton et al. |
| 5,832,223 | A | 11/1998 | Hara et al. |
| 5,833,468 | A | 11/1998 | Guy et al. |
| 5,835,126 | A | 11/1998 | Lewis |
| 5,835,717 | A | 11/1998 | Karlton et al. |
| 5,838,314 | A | 11/1998 | Neel et al. |
| 5,838,319 | A | 11/1998 | Guzak et al. |
| 5,838,383 | A | 11/1998 | Chimoto et al. |
| 5,841,979 | A | 11/1998 | Schulhof et al. |
| 5,842,010 | A | 11/1998 | Jain et al. |
| 5,842,199 | A | 11/1998 | Miller et al. |
| 5,844,552 | A | 12/1998 | Gaughan et al. |
| 5,844,620 | A | 12/1998 | Coleman et al. |
| 5,848,396 | A | 12/1998 | Gerace |
| 5,850,218 | A | 12/1998 | LaJoie et al. |
| 5,851,149 | A | 12/1998 | Xidos et al. |
| 5,852,437 | A | 12/1998 | Wugofski et al. |
| 5,861,881 | A | 1/1999 | Freeman et al. |
| 5,861,906 | A | 1/1999 | Dunn et al. |
| 5,862,292 | A | 1/1999 | Kubota et al. |
| 5,864,704 | A | 1/1999 | Battle et al. |
| 5,864,823 | A | 1/1999 | Levitan |
| 5,867,223 | A | 2/1999 | Schindler et al. |
| 5,867,226 | A | 2/1999 | Wehmeyer et al. |
| 5,867,227 | A | 2/1999 | Yamaguchi |
| 5,867,233 | A | 2/1999 | Tanaka |
| 5,867,799 | A | 2/1999 | Lang et al. |
| 5,870,543 | A | 2/1999 | Ronning |
| 5,870,754 | A | 2/1999 | Dimitrova et al. |
| 5,872,588 | A | 2/1999 | Aras et al. |
| 5,873,660 | A | 2/1999 | Walsh et al. |
| 5,874,985 | A | 2/1999 | Matthews, III |
| 5,875,108 | A | 2/1999 | Hoffberg et al. |
| 5,877,906 | A | 3/1999 | Nagasawa et al. |
| 5,878,222 | A | 3/1999 | Harrison |
| 5,880,720 | A | 3/1999 | Iwafune et al. |
| 5,880,768 | A | 3/1999 | Lemmons et al. |
| 5,881,245 | A | 3/1999 | Thompson |
| 5,883,621 | A | 3/1999 | Iwamura |
| 5,883,677 | A | 3/1999 | Hofmann |
| 5,884,028 | A | 3/1999 | Kindell et al. |
| 5,884,141 | A | 3/1999 | Inoue et al. |
| 5,884,298 | A | 3/1999 | Smith, II et al. |
| 5,886,691 | A | 3/1999 | Furuya et al. |
| 5,886,707 | A | 3/1999 | Berg |
| 5,886,731 | A | 3/1999 | Ebisawa |
| 5,886,732 | A | 3/1999 | Humpleman |
| 5,887,243 | A | 3/1999 | Harvey et al. |
| 5,889,950 | A | 3/1999 | Kuzma |
| 5,890,138 | A | 3/1999 | Godin et al. |
| 5,892,535 | A | 4/1999 | Allen et al. |
| 5,892,536 | A | 4/1999 | Logan et al. |
| 5,892,767 | A | 4/1999 | Bell et al. |
| 5,892,915 | A | 4/1999 | Duso et al. |
| 5,894,589 | A | 4/1999 | Reber et al. |
| 5,895,474 | A | 4/1999 | Maarek et al. |
| 5,896,414 | A | 4/1999 | Meyer et al. |
| 5,898,441 | A | 4/1999 | Flurry |
| 5,898,456 | A | 4/1999 | Wahl |
| 5,899,576 | A | 5/1999 | Fukuzawa |
| 5,899,582 | A | 5/1999 | DuLac |
| 5,899,920 | A | 5/1999 | DeSatnick et al. |
| 5,900,867 | A | 5/1999 | Schindler et al. |
| 5,900,904 | A | 5/1999 | Okada et al. |
| 5,900,905 | A | 5/1999 | Shoff et al. |
| 5,901,366 | A | 5/1999 | Nakano et al. |
| 5,903,234 | A | 5/1999 | Kimura |
| 5,903,263 | A | 5/1999 | Emura |
| 5,903,264 | A | 5/1999 | Moeller et al. |
| 5,903,314 | A | 5/1999 | Niijima et al. |
| 5,903,454 | A | 5/1999 | Hoffberg et al. |
| 5,903,545 | A | 5/1999 | Sabourin et al. |
| 5,903,723 | A | 5/1999 | Beck et al. |
| 5,903,816 | A | 5/1999 | Broadwin et al. |
| 5,905,522 | A | 5/1999 | Lawler |
| 5,905,847 | A | 5/1999 | Kobayashi et al. |
| 5,905,865 | A | 5/1999 | Palmer et al. |
| 5,907,322 | A | 5/1999 | Kelly et al. |
| 5,907,323 | A | 5/1999 | Lawler et al. |
| 5,907,366 | A | 5/1999 | Farmer et al. |
| 5,909,212 | A | 6/1999 | Nishina et al. |
| 5,909,638 | A | 6/1999 | Allen |
| 5,911,046 | A | 6/1999 | Amano |
| 5,912,664 | A | 6/1999 | Eick et al. |
| 5,913,039 | A | 6/1999 | Nakamura et al. |
| 5,914,712 | A | 6/1999 | Sartain et al. |
| 5,914,746 | A | 6/1999 | Matthews, III et al. |
| 5,914,941 | A | 6/1999 | Janky |
| 5,915,026 | A | 6/1999 | Mankovitz |
| 5,915,068 | A | 6/1999 | Levine |
| 5,915,090 | A | 6/1999 | Joseph et al. |
| 5,915,094 | A | 6/1999 | Kouloheris et al. |
| 5,915,250 | A | 6/1999 | Jain et al. |
| 5,916,303 | A | 6/1999 | Scott |
| 5,917,405 | A | 6/1999 | Joao |
| 5,917,481 | A | 6/1999 | Rzeszewski et al. |
| 5,917,538 | A | 6/1999 | Asamizuya |
| 5,917,830 | A | 6/1999 | Chen et al. |
| 5,917,835 | A | 6/1999 | Barrett et al. |
| 5,918,014 | A | 6/1999 | Robinson |
| 5,920,700 | A | 7/1999 | Gordon et al. |
| 5,920,702 | A | 7/1999 | Bleidt et al. |
| 5,920,800 | A | 7/1999 | Schafer |
| 5,920,842 | A | 7/1999 | Cooper et al. |
| 5,922,045 | A | 7/1999 | Hanson |
| 5,922,048 | A | 7/1999 | Emura |
| 5,923,361 | A | 7/1999 | Sutton, Jr. |
| 5,923,848 | A | 7/1999 | Goodhand et al. |
| 5,926,204 | A | 7/1999 | Mayer |
| 5,926,205 | A | 7/1999 | Krause et al. |
| 5,926,624 | A | 7/1999 | Katz et al. |
| 5,928,327 | A | 7/1999 | Wang et al. |
| 5,929,849 | A | 7/1999 | Kikinis |
| 5,929,850 | A | 7/1999 | Broadwin et al. |
| 5,929,932 | A | 7/1999 | Otsuki et al. |
| 5,930,473 | A | 7/1999 | Teng et al. |
| 5,930,493 | A | 7/1999 | Ottesen et al. |
| 5,931,901 | A | 8/1999 | Wolfe et al. |
| 5,931,905 | A | 8/1999 | Hashimoto et al. |
| 5,933,603 | A | 8/1999 | Vahalia et al. |
| 5,933,835 | A | 8/1999 | Adams et al. |
| 5,935,206 | A | 8/1999 | Dixon et al. |
| 5,936,569 | A | 8/1999 | Ståhle et al. |
| 5,937,160 | A | 8/1999 | Davis et al. |
| 5,940,071 | A | 8/1999 | Treffers et al. |
| 5,940,073 | A | 8/1999 | Klosterman et al. |
| 5,940,387 | A | 8/1999 | Humpleman |
| 5,940,572 | A | 8/1999 | Balaban et al. |
| 5,943,046 | A | 8/1999 | Cave et al. |
| 5,943,047 | A | 8/1999 | Suzuki |
| 5,945,987 | A | 8/1999 | Dunn |
| 5,945,988 | A | 8/1999 | Williams et al. |
| 5,946,386 | A | 8/1999 | Rogers et al. |
| 5,947,746 | A | 9/1999 | Tsai |
| 5,949,411 | A | 9/1999 | Doerr et al. |
| 5,949,954 | A | 9/1999 | Young et al. |
| 5,951,642 | A | 9/1999 | Onoe et al. |
| 5,953,005 | A | 9/1999 | Liu |
| 5,953,485 | A | 9/1999 | Abecassis |
| 5,955,988 | A | 9/1999 | Blonstein et al. |
| 5,956,025 | A | 9/1999 | Goulden et al. |

(56) References Cited

U.S. PATENT DOCUMENTS

| | | | |
|---|---|---|---|
| 5,956,482 | A | 9/1999 | Agraharam et al. |
| 5,956,487 | A | 9/1999 | Venkatraman et al. |
| 5,956,716 | A | 9/1999 | Kenner et al. |
| 5,959,592 | A | 9/1999 | Petruzzelli |
| 5,959,659 | A | 9/1999 | Dokic |
| 5,959,688 | A | 9/1999 | Schein et al. |
| 5,960,411 | A | 9/1999 | Hartman et al. |
| 5,961,603 | A | 10/1999 | Kunkel et al. |
| 5,963,202 | A | 10/1999 | Polish |
| 5,963,264 | A | 10/1999 | Jackson |
| 5,963,645 | A | 10/1999 | Kigawa et al. |
| 5,964,455 | A | 10/1999 | Catanzarite et al. |
| 5,966,187 | A | 10/1999 | Do |
| 5,969,283 | A | 10/1999 | Looney et al. |
| 5,969,714 | A | 10/1999 | Butcher |
| 5,969,748 | A | 10/1999 | Casement et al. |
| 5,970,473 | A | 10/1999 | Gerszberg et al. |
| 5,970,486 | A | 10/1999 | Yoshida et al. |
| 5,973,680 | A | 10/1999 | Ueda |
| 5,973,683 | A | 10/1999 | Cragun et al. |
| 5,973,722 | A | 10/1999 | Wakai et al. |
| 5,974,217 | A | 10/1999 | Haraguchi |
| 5,974,222 | A | 10/1999 | Yuen et al. |
| 5,977,963 | A | 11/1999 | Gaughan et al. |
| 5,977,964 | A | 11/1999 | Williams et al. |
| 5,978,567 | A | 11/1999 | Rebane et al. |
| 5,978,843 | A | 11/1999 | Wu et al. |
| 5,982,411 | A | 11/1999 | Eyer et al. |
| 5,983,236 | A | 11/1999 | Yager et al. |
| 5,986,650 | A | 11/1999 | Ellis et al. |
| 5,987,213 | A | 11/1999 | Mankovitz et al. |
| 5,987,509 | A | 11/1999 | Portuesi |
| 5,987,621 | A | 11/1999 | Duso et al. |
| 5,988,078 | A | 11/1999 | Levine |
| 5,990,881 | A | 11/1999 | Inoue et al. |
| 5,990,884 | A | 11/1999 | Douma et al. |
| 5,990,885 | A | 11/1999 | Gopinath |
| 5,990,890 | A | 11/1999 | Etheredge |
| 5,990,927 | A | 11/1999 | Hendricks et al. |
| 5,991,498 | A | 11/1999 | Young |
| 5,991,735 | A | 11/1999 | Gerace |
| 5,991,799 | A | 11/1999 | Yen et al. |
| 5,991,832 | A | 11/1999 | Sato et al. |
| 5,995,155 | A | 11/1999 | Schindler et al. |
| 5,999,688 | A | 12/1999 | Iggulden et al. |
| 5,999,970 | A | 12/1999 | Krisbergh et al. |
| 6,002,393 | A | 12/1999 | Hite et al. |
| 6,002,394 | A | 12/1999 | Schein et al. |
| 6,002,443 | A | 12/1999 | Iggulden |
| 6,002,444 | A | 12/1999 | Marshall et al. |
| 6,002,450 | A | 12/1999 | Darbee et al. |
| 6,002,720 | A | 12/1999 | Yurt et al. |
| 6,003,030 | A | 12/1999 | Kenner et al. |
| 6,005,561 | A | 12/1999 | Hawkins et al. |
| 6,005,563 | A | 12/1999 | White et al. |
| 6,005,564 | A | 12/1999 | Ahmad et al. |
| 6,005,565 | A | 12/1999 | Legall et al. |
| 6,005,566 | A | 12/1999 | Jones et al. |
| 6,005,597 | A | 12/1999 | Barrett et al. |
| 6,005,600 | A | 12/1999 | Hill |
| 6,005,631 | A | 12/1999 | Anderson et al. |
| 6,006,257 | A | 12/1999 | Slezak |
| 6,008,802 | A | 12/1999 | Iki et al. |
| 6,008,803 | A | 12/1999 | Rowe et al. |
| 6,009,153 | A | 12/1999 | Houghton et al. |
| 6,009,465 | A | 12/1999 | Decker et al. |
| 6,011,546 | A | 1/2000 | Bertram |
| 6,012,086 | A | 1/2000 | Lowell |
| 6,012,089 | A | 1/2000 | Hasegawa |
| 6,012,091 | A | 1/2000 | Boyce |
| 6,014,184 | A | 1/2000 | Knee et al. |
| 6,014,381 | A | 1/2000 | Troxel et al. |
| 6,014,502 | A | 1/2000 | Moraes |
| 6,014,689 | A | 1/2000 | Budge et al. |
| 6,014,693 | A | 1/2000 | Ito et al. |
| 6,014,694 | A | 1/2000 | Aharoni et al. |
| 6,014,706 | A | 1/2000 | Cannon et al. |
| 6,016,141 | A | 1/2000 | Knudson et al. |
| 6,018,359 | A | 1/2000 | Kermode et al. |
| 6,018,372 | A | 1/2000 | Etheredge |
| 6,018,612 | A | 1/2000 | Thomason et al. |
| 6,018,765 | A | 1/2000 | Durana et al. |
| 6,018,768 | A | 1/2000 | Ullman et al. |
| 6,020,880 | A | 2/2000 | Naimpally |
| 6,020,883 | A | 2/2000 | Herz et al. |
| 6,020,912 | A | 2/2000 | De Lang |
| 6,020,929 | A | 2/2000 | Marshall et al. |
| 6,020,930 | A | 2/2000 | Legrand |
| 6,022,223 | A | 2/2000 | Taniguchi et al. |
| 6,023,267 | A | 2/2000 | Chapuis et al. |
| 6,023,725 | A | 2/2000 | Ozawa et al. |
| 6,025,837 | A | 2/2000 | Matthews, III et al. |
| 6,025,868 | A | 2/2000 | Russo |
| 6,025,869 | A | 2/2000 | Stas et al. |
| 6,025,886 | A | 2/2000 | Koda |
| 6,028,599 | A | 2/2000 | Yuen et al. |
| 6,028,600 | A | 2/2000 | Rosin et al. |
| 6,029,045 | A | 2/2000 | Picco et al. |
| 6,029,064 | A | 2/2000 | Farris et al. |
| 6,029,176 | A | 2/2000 | Cannon |
| 6,029,195 | A | 2/2000 | Herz |
| 6,031,806 | A | 2/2000 | Tomita |
| 6,032,202 | A | 2/2000 | Lea et al. |
| 6,035,091 | A | 3/2000 | Kazo |
| 6,035,339 | A | 3/2000 | Agraharam et al. |
| 6,038,367 | A | 3/2000 | Abecassis |
| 6,038,591 | A | 3/2000 | Wolfe et al. |
| 6,038,614 | A | 3/2000 | Chan et al. |
| 6,040,829 | A | 3/2000 | Croy et al. |
| 6,049,823 | A | 4/2000 | Hwang |
| 6,049,824 | A | 4/2000 | Simonin |
| 6,049,831 | A | 4/2000 | Gardell et al. |
| 6,052,145 | A | 4/2000 | Macrae et al. |
| 6,057,872 | A | 5/2000 | Candelore |
| 6,057,890 | A | 5/2000 | Virden et al. |
| 6,058,238 | A | 5/2000 | Ng |
| 6,058,242 | A | 5/2000 | Kim |
| 6,061,056 | A | 5/2000 | Menard et al. |
| 6,061,082 | A | 5/2000 | Park |
| 6,061,097 | A | 5/2000 | Satterfield |
| 6,061,779 | A | 5/2000 | Garde |
| 6,064,376 | A | 5/2000 | Berezowski et al. |
| 6,064,380 | A | 5/2000 | Swenson et al. |
| 6,064,980 | A | 5/2000 | Jacobi et al. |
| 6,065,047 | A | 5/2000 | Carpenter et al. |
| 6,067,561 | A | 5/2000 | Dillon |
| 6,067,564 | A | 5/2000 | Urakoshi et al. |
| 6,072,460 | A | 6/2000 | Marshall et al. |
| 6,072,982 | A | 6/2000 | Haddad |
| 6,075,526 | A | 6/2000 | Rothmuller |
| 6,075,568 | A | 6/2000 | Matsuura |
| 6,075,575 | A | 6/2000 | Schein et al. |
| 6,078,348 | A | 6/2000 | Klosterman et al. |
| 6,078,914 | A | 6/2000 | Redfern |
| 6,081,291 | A | 6/2000 | Ludwig, Jr. |
| 6,081,750 | A | 6/2000 | Hoffberg et al. |
| 6,081,830 | A | 6/2000 | Schindler |
| 6,085,236 | A | 7/2000 | Lea |
| 6,088,722 | A | 7/2000 | Herz et al. |
| 6,088,945 | A | 7/2000 | Sanderfoot |
| 6,091,823 | A | 7/2000 | Hosomi et al. |
| 6,091,883 | A | 7/2000 | Artigalas et al. |
| 6,091,884 | A | 7/2000 | Yuen et al. |
| RE36,801 | E | 8/2000 | Logan et al. |
| 6,097,441 | A | 8/2000 | Allport |
| 6,097,878 | A | 8/2000 | Saib |
| 6,098,065 | A | 8/2000 | Skillen et al. |
| 6,098,082 | A | 8/2000 | Gibbon et al. |
| 6,104,334 | A | 8/2000 | Allport |
| 6,104,705 | A | 8/2000 | Ismail et al. |
| 6,111,614 | A | 8/2000 | Mugura et al. |
| 6,111,677 | A | 8/2000 | Shintani et al. |
| 6,112,181 | A | 8/2000 | Shear et al. |
| 6,112,186 | A | 8/2000 | Bergh et al. |

(56) References Cited

U.S. PATENT DOCUMENTS 6,115,057 A 9/2000 Kwoh et al.
6,118,450 A 9/2000 Proehl et al.
6,118,492 A 9/2000 Milnes et al.
6,119,098 A 9/2000 Guyot et al.
6,119,101 A 9/2000 Peckover
6,119,144 A 9/2000 Fujita et al.
6,122,011 A 9/2000 Dias et al.
6,124,854 A 9/2000 Sartain et al.
6,125,230 A 9/2000 Yaginuma
6,125,231 A 9/2000 Yuen et al.
6,130,726 A 10/2000 Darbee et al.
6,133,847 A 10/2000 Yang
6,133,909 A 10/2000 Schein et al.
6,133,910 A 10/2000 Stinebruner
6,133,912 A 10/2000 Montero
6,139,177 A 10/2000 Venkatraman et al.
6,141,003 A 10/2000 Chor et al.
6,141,488 A 10/2000 Knudson et al.
6,144,401 A 11/2000 Casement et al.
6,144,702 A 11/2000 Yurt et al.
6,147,715 A 11/2000 Yuen et al.
6,151,059 A 11/2000 Schein et al.
6,151,643 A 11/2000 Cheng et al.
6,154,203 A 11/2000 Yuen et al.
6,154,206 A 11/2000 Ludtke
6,154,771 A 11/2000 Rangan et al.
6,155,001 A 12/2000 Marin
6,157,411 A 12/2000 Williams et al.
6,157,413 A 12/2000 Hanafee et al.
6,160,545 A 12/2000 Eyer et al.
6,160,546 A 12/2000 Thompson et al.
6,160,570 A 12/2000 Sitnik
6,160,796 A 12/2000 Zou
6,160,988 A 12/2000 Shroyer
6,163,316 A 12/2000 Killian
6,163,345 A 12/2000 Noguchi et al.
6,166,730 A 12/2000 Goode et al.
6,166,778 A 12/2000 Yamamoto et al.
6,167,188 A 12/2000 Young et al.
6,169,542 B1 1/2001 Hooks et al.
6,169,543 B1 1/2001 Wehmeyer
6,169,725 B1 1/2001 Gibbs et al.
6,169,844 B1 1/2001 Arai
6,170,006 B1 1/2001 Namba
6,172,674 B1 1/2001 Etheredge
6,172,677 B1 1/2001 Stautner et al.
6,177,931 B1 1/2001 Alexander et al.
6,178,446 B1 1/2001 Gerszberg et al.
6,181,335 B1 1/2001 Hendricks et al.
6,181,867 B1 1/2001 Kenner et al.
6,182,094 B1 1/2001 Humpleman et al.
6,184,877 B1 2/2001 Dodson et al.
6,184,878 B1 2/2001 Alonso et al.
6,185,360 B1 2/2001 Inoue et al.
6,186,287 B1 2/2001 Heidenreich et al.
6,188,381 B1 2/2001 van der Wal et al.
6,188,397 B1 2/2001 Humpleman
6,192,340 B1 2/2001 Abecassis
6,195,501 B1 2/2001 Perry et al.
6,198,479 B1 3/2001 Humpleman et al.
6,199,076 B1 3/2001 Logan et al.
6,201,536 B1 3/2001 Hendricks et al.
6,202,211 B1 3/2001 Williams, Jr.
6,202,212 B1 3/2001 Sturgeon et al.
6,205,485 B1 3/2001 Kikinis
6,208,335 B1 3/2001 Gordon et al.
6,208,341 B1 3/2001 van Ee et al.
6,208,384 B1 3/2001 Schultheiss
6,208,799 B1 3/2001 Marsh et al.
6,209,129 B1 3/2001 Carr et al.
6,209,130 B1 3/2001 Rector, Jr. et al.
6,212,327 B1 4/2001 Berstis et al.
6,212,553 B1 4/2001 Lee et al.
6,216,264 B1 4/2001 Maze et al.
6,219,489 B1 4/2001 Ohta et al.
6,219,839 B1 4/2001 Sampsell
6,226,444 B1 5/2001 Goldschmidt Iki et al.
6,226,447 B1 5/2001 Sasaki et al.
6,230,200 B1 5/2001 Forecast et al.
6,230,325 B1 5/2001 Iinuma et al.
6,232,539 B1 5/2001 Looney et al.
6,233,389 B1 5/2001 Barton et al.
6,233,393 B1 5/2001 Yanagihara et al.
6,233,734 B1 5/2001 Macrae et al.
6,236,395 B1 5/2001 Sezan et al.
6,236,801 B1 5/2001 Engle et al.
6,236,978 B1 5/2001 Tuzhilin
6,237,049 B1 5/2001 Ludtke
6,239,794 B1 5/2001 Yuen et al.
6,240,241 B1 5/2001 Yuen
6,240,555 B1 5/2001 Shoff et al.
6,243,707 B1 6/2001 Humpleman et al.
6,243,725 B1 6/2001 Hempleman et al.
6,243,865 B1 6/2001 Wei et al.
6,247,176 B1 6/2001 Schein et al.
6,256,071 B1 7/2001 Hiroi
6,256,785 B1 7/2001 Klappert et al.
6,260,088 B1 7/2001 Gove et al.
6,262,721 B1 7/2001 Tsukidate et al.
6,262,722 B1 7/2001 Allison et al.
6,262,772 B1 7/2001 Shen et al.
6,263,501 B1 7/2001 Schein et al.
6,263,503 B1 7/2001 Margulis
6,263,507 B1 7/2001 Ahmad et al.
6,266,814 B1 7/2001 Lemmons et al.
6,268,849 B1 7/2001 Boyer et al.
6,275,268 B1 8/2001 Ellis et al.
6,275,648 B1 8/2001 Knudson et al.
6,279,029 B1 8/2001 Sampat et al.
6,279,157 B1 8/2001 Takasu
6,285,685 B1 9/2001 Bum
6,286,005 B1 9/2001 Cannon
6,286,140 B1 9/2001 Ivanyi
6,286,142 B1 9/2001 Ehreth
6,288,716 B1 9/2001 Humpleman et al.
6,289,165 B1 9/2001 Abecassis
6,289,346 B1 9/2001 Milewski et al.
6,292,624 B1 9/2001 Saib et al.
6,298,482 B1 10/2001 Seidman et al.
6,305,018 B1 10/2001 Usui et al.
6,310,886 B1 10/2001 Barton
6,311,011 B1 10/2001 Kuroda
6,312,336 B1 11/2001 Handelman et al.
6,314,575 B1 11/2001 Billock et al.
6,317,881 B1 11/2001 Shah-Nazaroff et al.
6,317,884 B1 11/2001 Eames et al.
6,317,885 B1 11/2001 Fries
6,320,588 B1 11/2001 Palmer et al.
6,321,318 B1 11/2001 Baltz et al.
6,323,911 B1 11/2001 Schein et al.
6,324,338 B1 11/2001 Wood et al.
6,326,982 B1 12/2001 Wu et al.
6,327,049 B1 12/2001 Ohtsuka
6,327,418 B1 12/2001 Barton
6,331,877 B1 12/2001 Bennington et al.
6,334,022 B1 12/2001 Ohba et al.
6,335,963 B1 1/2002 Bosco
6,336,099 B1 1/2002 Barnett et al.
6,337,715 B1 1/2002 Inagaki et al.
6,341,374 B2 1/2002 Schein et al.
6,344,939 B2 2/2002 Oguro
6,347,400 B1 2/2002 Ohkura et al.
6,348,932 B1 2/2002 Nishikawa et al.
6,353,700 B1 3/2002 Zhou
6,356,971 B1 3/2002 Katz et al.
6,357,042 B2 3/2002 Srinivasan et al.
6,357,043 B1 3/2002 Ellis et al.
6,359,636 B1 3/2002 Schindler et al.
6,359,661 B1 3/2002 Nickum
6,363,525 B1 3/2002 Dougherty et al.
6,366,890 B1 4/2002 Usrey
6,367,080 B1 4/2002 Enomoto et al.
6,370,688 B1 * 4/2002 Hejna, Jr. ..... 725/101
6,373,528 B1 4/2002 Bennington et al.

(56) References Cited

U.S. PATENT DOCUMENTS

| | | | |
|---|---|---|---|
| 6,374,406 | B2 | 4/2002 | Hirata |
| 6,377,745 | B2 | 4/2002 | Akiba et al. |
| 6,378,130 | B1 | 4/2002 | Adams |
| 6,388,714 | B1 | 5/2002 | Schein et al. |
| 6,389,593 | B1 | 5/2002 | Yamagishi |
| 6,392,710 | B1 | 5/2002 | Gonsalves et al. |
| 6,393,430 | B1 | 5/2002 | Van Ryzin |
| 6,396,544 | B1 | 5/2002 | Schindler et al. |
| 6,396,546 | B1 | 5/2002 | Alten et al. |
| 6,397,080 | B1 | 5/2002 | Viktorsson et al. |
| 6,400,407 | B1 | 6/2002 | Zigmond et al. |
| 6,401,242 | B1 | 6/2002 | Eyer et al. |
| 6,405,370 | B1 | 6/2002 | Jarrell |
| 6,405,371 | B1 | 6/2002 | Oosterhout et al. |
| 6,408,435 | B1 | 6/2002 | Sato |
| 6,408,437 | B1 | 6/2002 | Hendricks et al. |
| 6,411,696 | B1 | 6/2002 | Iverson et al. |
| 6,412,110 | B1 | 6/2002 | Schein et al. |
| 6,418,556 | B1 | 7/2002 | Bennington et al. |
| 6,419,137 | B1 | 7/2002 | Marshall et al. |
| 6,421,067 | B1 | 7/2002 | Kamen et al. |
| 6,425,000 | B1 | 7/2002 | Carmello et al. |
| 6,434,524 | B1 | 8/2002 | Weber |
| 6,434,614 | B1 | 8/2002 | Blumenau |
| 6,437,836 | B1 | 8/2002 | Huang et al. |
| 6,441,832 | B1 | 8/2002 | Tao et al. |
| 6,442,332 | B1 | 8/2002 | Knudson et al. |
| 6,445,306 | B1 | 9/2002 | Trovato et al. |
| 6,445,398 | B1 | 9/2002 | Gerba et al. |
| 6,445,872 | B1 | 9/2002 | Sano et al. |
| 6,453,471 | B1 | 9/2002 | Klosterman |
| 6,456,621 | B1 | 9/2002 | Wada et al. |
| RE37,881 | E | 10/2002 | Haines |
| 6,463,206 | B1 | 10/2002 | Yuen et al. |
| 6,463,585 | B1 | 10/2002 | Hendricks et al. |
| 6,469,753 | B1 | 10/2002 | Klosterman et al. |
| 6,470,497 | B1 | 10/2002 | Ellis et al. |
| 6,473,559 | B1 | 10/2002 | Knudson et al. |
| 6,477,579 | B1 | 11/2002 | Kunkel et al. |
| 6,477,705 | B1 | 11/2002 | Yuen et al. |
| 6,480,667 | B1 | 11/2002 | O'Connor |
| 6,480,889 | B1 | 11/2002 | Saito et al. |
| 6,486,892 | B1 | 11/2002 | Stern |
| 6,487,145 | B1 | 11/2002 | Berhan |
| 6,487,362 | B1 | 11/2002 | Yuen et al. |
| 6,493,875 | B1 | 12/2002 | Eames et al. |
| 6,496,981 | B1 | 12/2002 | Wistendahl et al. |
| 6,498,895 | B2 | 12/2002 | Young et al. |
| 6,499,138 | B1 | 12/2002 | Swix et al. |
| 6,505,348 | B1 | 1/2003 | Knowles et al. |
| 6,507,953 | B1 | 1/2003 | Horlander et al. |
| 6,509,908 | B1 | 1/2003 | Croy et al. |
| 6,515,680 | B1 | 2/2003 | Hendricks et al. |
| 6,516,323 | B1 | 2/2003 | Kamba |
| 6,516,467 | B1 | 2/2003 | Schindler et al. |
| 6,526,577 | B1 | 2/2003 | Knudson et al. |
| 6,530,082 | B1 | 3/2003 | Del Sesto et al. |
| 6,530,083 | B1 | 3/2003 | Liebenow |
| 6,532,589 | B1 | 3/2003 | Proehl et al. |
| 6,539,548 | B1 | 3/2003 | Hendricks et al. |
| 6,543,053 | B1 | 4/2003 | Li et al. |
| 6,545,578 | B2 | 4/2003 | Yoshiyama |
| 6,545,722 | B1 | 4/2003 | Schultheiss et al. |
| 6,546,399 | B1 | 4/2003 | Reed et al. |
| 6,553,178 | B2 | 4/2003 | Abecassis |
| 6,557,031 | B1 | 4/2003 | Mimura et al. |
| 6,564,005 | B1 | 5/2003 | Berstis |
| 6,564,378 | B1 | 5/2003 | Satterfield et al. |
| 6,564,379 | B1 | 5/2003 | Knudson et al. |
| 6,564,383 | B1 | 5/2003 | Combs et al. |
| 6,567,982 | B1 | 5/2003 | Howe et al. |
| 6,571,279 | B1 | 5/2003 | Herz et al. |
| 6,571,390 | B1 | 5/2003 | Dunn et al. |
| 6,577,735 | B1 | 6/2003 | Bharat |
| 6,578,070 | B1 | 6/2003 | Weaver et al. |
| 6,588,013 | B1 | 7/2003 | Lumley et al. |
| 6,594,699 | B1 | 7/2003 | Sahai et al. |
| 6,598,228 | B2 | 7/2003 | Hejna, Jr. |
| 6,600,503 | B2 | 7/2003 | Stautner et al. |
| 6,601,074 | B1 | 7/2003 | Liebenow |
| 6,601,237 | B1 | 7/2003 | Ten Kate et al. |
| 6,603,488 | B2 | 8/2003 | Humpleman et al. |
| 6,611,654 | B1 | 8/2003 | Shteyn |
| 6,611,842 | B1 | 8/2003 | Brown |
| 6,611,958 | B1 | 8/2003 | Shintani et al. |
| 6,614,987 | B1 | 9/2003 | Ismail et al. |
| 6,622,171 | B2 | 9/2003 | Gupta et al. |
| 6,622,304 | B1 | 9/2003 | Carhart |
| 6,622,306 | B1 | 9/2003 | Kamada |
| 6,630,954 | B1 | 10/2003 | Okada |
| 6,631,523 | B1 | 10/2003 | Matthews, III et al. |
| 6,637,029 | B1 | 10/2003 | Maissel et al. |
| 6,661,468 | B2 | 12/2003 | Alten et al. |
| 6,665,869 | B1 | 12/2003 | Ellis et al. |
| 6,668,377 | B1 | 12/2003 | Dunn |
| 6,670,971 | B1 | 12/2003 | Oral et al. |
| 6,671,882 | B1 | 12/2003 | Murphy et al. |
| 6,675,385 | B1 | 1/2004 | Wang |
| 6,675,386 | B1 | 1/2004 | Hendricks et al. |
| 6,678,004 | B1 | 1/2004 | Schultheiss et al. |
| 6,678,462 | B1 | 1/2004 | Chihara |
| 6,678,737 | B1 | 1/2004 | Bucher |
| 6,681,396 | B1 | 1/2004 | Bates et al. |
| 6,696,373 | B2 | 2/2004 | Kinn et al. |
| 6,698,020 | B1 | 2/2004 | Zigmond et al. |
| 6,701,523 | B1 | 3/2004 | Hancock et al. |
| 6,701,527 | B2 | 3/2004 | Schein et al. |
| 6,704,028 | B2 | 3/2004 | Wugofski |
| 6,704,931 | B1 | 3/2004 | Schaffer et al. |
| 6,711,622 | B1 | 3/2004 | Fuller et al. |
| 6,718,552 | B1 | 4/2004 | Goode |
| 6,721,954 | B1 | 4/2004 | Nickum |
| 6,727,914 | B1 | 4/2004 | Gutta |
| 6,732,366 | B1 | 5/2004 | Russo |
| 6,732,369 | B1 | 5/2004 | Schein et al. |
| 6,732,372 | B2 | 5/2004 | Tomita et al. |
| 6,738,978 | B1 | 5/2004 | Hendricks et al. |
| 6,741,617 | B2 | 5/2004 | Rosengren et al. |
| 6,742,183 | B1 | 5/2004 | Reynolds et al. |
| 6,744,967 | B2 | 6/2004 | Kaminski et al. |
| 6,745,391 | B1 | 6/2004 | Macrae et al. |
| 6,750,881 | B1 | 6/2004 | Appelman |
| 6,754,904 | B1 | 6/2004 | Cooper et al. |
| 6,756,987 | B2 | 6/2004 | Goyins et al. |
| 6,756,997 | B1 | 6/2004 | Ward, III et al. |
| 6,760,537 | B2 | 7/2004 | Mankovitz |
| 6,760,538 | B1 | 7/2004 | Bumgardner et al. |
| 6,762,797 | B1 | 7/2004 | Pelletier |
| 6,766,100 | B1 | 7/2004 | Komar et al. |
| 6,771,317 | B2 | 8/2004 | Ellis et al. |
| 6,771,886 | B1 | 8/2004 | Mendelsohn |
| 6,772,433 | B1 | 8/2004 | LaJoie et al. |
| 6,785,720 | B1 | 8/2004 | Seong |
| 6,788,882 | B1 | 9/2004 | Geer et al. |
| 6,792,197 | B1 | 9/2004 | Helmstetter |
| 6,792,618 | B1 | 9/2004 | Bendinelli et al. |
| 6,799,326 | B2 | 9/2004 | Boylan, III et al. |
| 6,799,327 | B1 | 9/2004 | Reynolds et al. |
| 6,813,775 | B1 | 11/2004 | Finseth et al. |
| 6,816,172 | B1 | 11/2004 | Iki et al. |
| 6,816,904 | B1 | 11/2004 | Ludwig et al. |
| 6,820,278 | B1 | 11/2004 | Ellis |
| 6,822,661 | B2 | 11/2004 | Sai et al. |
| 6,828,993 | B1 | 12/2004 | Hendricks et al. |
| 6,832,385 | B2 | 12/2004 | Young et al. |
| 6,837,791 | B1 | 1/2005 | McNutt et al. |
| 6,847,686 | B2 | 1/2005 | Morad et al. |
| 6,850,693 | B2 | 2/2005 | Young et al. |
| 6,859,839 | B1 | 2/2005 | Zahorjan et al. |
| 6,865,746 | B1 | 3/2005 | Herrington et al. |
| 6,868,225 | B1 | 3/2005 | Brown et al. |
| 6,868,551 | B1 | 3/2005 | Lawler et al. |
| 6,871,146 | B1 | 3/2005 | Kelly et al. |
| 6,871,186 | B1 | 3/2005 | Tuzhilin et al. |

(56) References Cited

U.S. PATENT DOCUMENTS

| | | | |
|---|---|---|---|
| 6,882,299 | B1 | 4/2005 | Allport |
| 6,898,762 | B2 | 5/2005 | Ellis et al. |
| 6,920,278 | B1 | 7/2005 | Yano et al. |
| 6,920,281 | B1 | 7/2005 | Agnibotri et al. |
| 6,925,035 | B2 | 8/2005 | Ueki |
| 6,925,567 | B1 | 8/2005 | Hirata et al. |
| 6,927,806 | B2 | 8/2005 | Chan |
| 6,934,964 | B1 | 8/2005 | Schaffer et al. |
| 6,973,663 | B1 | 12/2005 | Brown et al. |
| 6,973,669 | B2 | 12/2005 | Daniels |
| 6,983,478 | B1 | 1/2006 | Grauch et al. |
| 6,983,483 | B2 | 1/2006 | Maze et al. |
| 6,985,188 | B1 | 1/2006 | Hurst, Jr. |
| 7,003,792 | B1 | 2/2006 | Yuen |
| 7,006,881 | B1 | 2/2006 | Hoffberg et al. |
| 7,013,339 | B2 | 3/2006 | Schwager et al. |
| 7,013,478 | B1 | 3/2006 | Hendricks et al. |
| 7,017,118 | B1 | 3/2006 | Carroll |
| 7,017,171 | B1 | 3/2006 | Horlander et al. |
| 7,017,179 | B1 | 3/2006 | Asamoto et al. |
| 7,027,716 | B1 | 4/2006 | Boyle et al. |
| 7,028,323 | B2 | 4/2006 | Franken et al. |
| 7,028,326 | B1 | 4/2006 | Westlake et al. |
| 7,039,935 | B2 | 5/2006 | Knudson et al. |
| 7,047,241 | B1 | 5/2006 | Erickson |
| 7,047,549 | B2 | 5/2006 | Schein et al. |
| 7,047,550 | B1 | 5/2006 | Yasukawa et al. |
| 7,050,988 | B2 | 5/2006 | Atcheson et al. |
| 7,051,353 | B2 | 5/2006 | Yamashita et al. |
| 7,058,635 | B1 | 6/2006 | Shah-Nazaroff et al. |
| 7,069,576 | B1 | 6/2006 | Knudson et al. |
| 7,084,780 | B2 | 8/2006 | Nguyen et al. |
| 7,086,077 | B2 | 8/2006 | Giammaressi |
| 7,088,910 | B2 | 8/2006 | Potrebic et al. |
| 7,095,949 | B2 | 8/2006 | Okada |
| 7,096,486 | B1 | 8/2006 | Ukai et al. |
| 7,117,518 | B1 | 10/2006 | Takahashi et al. |
| 7,124,424 | B2 | 10/2006 | Gordon et al. |
| 7,127,735 | B1 | 10/2006 | Lee et al. |
| 7,134,131 | B1 | 11/2006 | Hendricks et al. |
| 7,143,430 | B1 | 11/2006 | Fingerman et al. |
| 7,151,886 | B2 | 12/2006 | Young et al. |
| 7,152,236 | B1 | 12/2006 | Wugofski et al. |
| 7,162,729 | B2 | 1/2007 | Schein et al. |
| 7,165,098 | B1 | 1/2007 | Boyer et al. |
| 7,168,086 | B1 | 1/2007 | Carpenter et al. |
| 7,171,677 | B1 | 1/2007 | Ochiai |
| 7,181,128 | B1 | 2/2007 | Wada et al. |
| 7,185,355 | B1 | 2/2007 | Ellis et al. |
| 7,187,847 | B2 | 3/2007 | Young et al. |
| 7,188,356 | B1 | 3/2007 | Miura et al. |
| 7,194,755 | B1 | 3/2007 | Nakata et al. |
| 7,200,859 | B1 | 4/2007 | Perlman et al. |
| 7,207,055 | B1 | 4/2007 | Hendricks et al. |
| 7,209,640 | B2 | 4/2007 | Young et al. |
| 7,218,839 | B2 | 5/2007 | Plourde, Jr. et al. |
| 7,224,886 | B2 | 5/2007 | Akamatsu et al. |
| 7,229,012 | B1 | 6/2007 | Enright et al. |
| 7,229,354 | B2 | 6/2007 | McNutt et al. |
| 7,231,175 | B2 | 6/2007 | Ellis |
| 7,240,356 | B2 | 7/2007 | Iki et al. |
| 7,243,139 | B2 | 7/2007 | Ullman et al. |
| 7,243,364 | B2 | 7/2007 | Dunn et al. |
| 7,260,564 | B1 | 8/2007 | Lynn et al. |
| 7,266,833 | B2 | 9/2007 | Ward, III et al. |
| 7,272,298 | B1 | 9/2007 | Lang et al. |
| 7,277,859 | B2 | 10/2007 | Watanabe et al. |
| 7,284,202 | B1 | 10/2007 | Zenith |
| 7,287,267 | B2 | 10/2007 | Knudson et al. |
| 7,293,276 | B2 | 11/2007 | Phillips et al. |
| 7,293,279 | B1 | 11/2007 | Asmussen |
| 7,328,450 | B2 | 2/2008 | Macrae et al. |
| 7,330,693 | B1 | 2/2008 | Goss |
| 7,334,090 | B2 | 2/2008 | Zellner |
| 7,343,614 | B1 | 3/2008 | Hendricks et al. |
| 7,343,616 | B1 | 3/2008 | Takahashi et al. |
| 7,349,976 | B1 | 3/2008 | Glaser et al. |
| 7,356,246 | B1 | 4/2008 | Kobb |
| 7,356,829 | B1 | 4/2008 | Terakado et al. |
| 7,363,645 | B1 | 4/2008 | Hendricks |
| 7,369,749 | B2 | 5/2008 | Ichioka et al. |
| 7,369,750 | B2 | 5/2008 | Cheng et al. |
| 7,392,532 | B2 | 6/2008 | White et al. |
| 7,403,693 | B2 | 7/2008 | Shteyn |
| 7,437,751 | B2 | 10/2008 | Daniels |
| 7,454,515 | B2 | 11/2008 | Lamkin et al. |
| 7,477,832 | B2 | 1/2009 | Young et al. |
| 7,480,929 | B2 | 1/2009 | Klosterman et al. |
| 7,493,641 | B2 | 2/2009 | Klosterman et al. |
| 7,503,055 | B2 | 3/2009 | Reynolds et al. |
| 7,519,268 | B2 | 4/2009 | Juen et al. |
| 7,529,465 | B2 | 5/2009 | Barton et al. |
| 7,533,400 | B1 | 5/2009 | Hailey et al. |
| 7,540,010 | B2 | 5/2009 | Hanaya et al. |
| 7,542,320 | B2 | 6/2009 | Kitou |
| 7,543,320 | B2 | 6/2009 | Schein et al. |
| 7,567,747 | B2 | 7/2009 | Hira |
| 7,577,336 | B2 | 8/2009 | Srinivasan et al. |
| 7,599,753 | B2 | 10/2009 | Taylor et al. |
| 7,603,685 | B2 | 10/2009 | Knudson et al. |
| 7,614,066 | B2 | 11/2009 | Urdang et al. |
| 7,624,345 | B2 | 11/2009 | Nishina et al. |
| 7,624,412 | B2 | 11/2009 | McEvilly et al. |
| 7,650,621 | B2 | 1/2010 | Thomas et al. |
| 7,665,109 | B2 | 2/2010 | Matthews, III et al. |
| 7,673,315 | B1 | 3/2010 | Wong et al. |
| 7,689,995 | B1 | 3/2010 | Francis et al. |
| 7,707,617 | B2 | 4/2010 | Birleson |
| 7,721,307 | B2 | 5/2010 | Hendricks et al. |
| 7,757,254 | B2 | 7/2010 | Shoff et al. |
| 7,765,235 | B2 | 7/2010 | Day et al. |
| 7,770,196 | B1 | 8/2010 | Hendricks |
| 7,777,816 | B2 | 8/2010 | Chang et al. |
| 7,778,158 | B2 | 8/2010 | Vogel et al. |
| 7,779,445 | B2 | 8/2010 | Ellis |
| 7,784,081 | B2 | 8/2010 | Hassell et al. |
| 7,788,393 | B2 * | 8/2010 | Pickens et al. ..... 709/231 |
| 7,793,322 | B2 | 9/2010 | Hassell et al. |
| 7,802,285 | B2 | 9/2010 | Ellis et al. |
| 7,823,055 | B2 | 10/2010 | Sull et al. |
| 7,827,585 | B2 | 11/2010 | Hassell et al. |
| 7,859,571 | B1 | 12/2010 | Brown et al. |
| 7,870,585 | B2 | 1/2011 | Ellis et al. |
| 7,873,760 | B2 | 1/2011 | Versteeg |
| 7,895,625 | B1 | 2/2011 | Bryan et al. |
| 7,913,278 | B2 | 3/2011 | Ellis et al. |
| 7,925,141 | B2 | 4/2011 | Geer et al. |
| 7,962,935 | B2 | 6/2011 | Kurosaki et al. |
| 7,962,946 | B2 | 6/2011 | Creamer et al. |
| 7,971,222 | B2 | 6/2011 | Ellis |
| 7,992,163 | B1 | 8/2011 | Jerding et al. |
| 7,996,864 | B2 | 8/2011 | Yuen et al. |
| 8,001,564 | B2 | 8/2011 | Hassell et al. |
| 8,006,263 | B2 | 8/2011 | Ellis et al. |
| 8,046,801 | B2 | 10/2011 | Ellis et al. |
| 8,051,450 | B2 | 11/2011 | Robarts et al. |
| 8,060,905 | B1 | 11/2011 | Hendricks |
| 8,069,460 | B2 | 11/2011 | Young et al. |
| 8,073,921 | B2 | 12/2011 | Thomas et al. |
| 8,078,751 | B2 | 12/2011 | Janik et al. |
| 8,082,568 | B2 | 12/2011 | Ellis |
| 8,087,048 | B2 | 12/2011 | Hassell et al. |
| 8,091,110 | B2 | 1/2012 | Ellis et al. |
| 8,112,776 | B2 | 2/2012 | Schein et al. |
| 8,214,869 | B2 | 7/2012 | Day |
| 8,265,458 | B2 | 9/2012 | Helmstetter |
| 8,286,207 | B1 | 10/2012 | Schneidewend et al. |
| 8,295,674 | B2 | 10/2012 | Sasaki et al. |
| 8,302,127 | B2 | 10/2012 | Klarfeld et al. |
| 8,363,679 | B2 | 1/2013 | Sorenson et al. |
| 8,370,884 | B2 | 2/2013 | Ellis |
| 8,381,249 | B2 | 2/2013 | Rasanen et al. |
| 8,397,255 | B2 | 3/2013 | Wachtfogel et al. |
| 8,478,750 | B2 | 7/2013 | Rao et al. |

(56) References Cited

U.S. PATENT DOCUMENTS 8,528,019 B1 9/2013 Dimitrova et al.
8,613,024 B2 12/2013 Bovenschulte et al.
8,627,389 B2 1/2014 Craner
8,707,366 B2 4/2014 Wong et al.
8,719,090 B2 5/2014 Lewis
8,732,757 B2 5/2014 Ward, III et al.
8,832,742 B2 9/2014 Rasanen et al.
2001/0001160 A1 5/2001 Shoff et al.
2001/0004338 A1 6/2001 Yankowski
2001/0007147 A1 7/2001 Goldschmidt Iki et al.
2001/0013122 A1 8/2001 Hirata
2001/0026533 A1 10/2001 Schwager
2001/0027555 A1 10/2001 Franken et al.
2001/0027562 A1 10/2001 Schein et al.
2001/0028782 A1 10/2001 Ohno et al.
2001/0029610 A1 10/2001 Corvin et al.
2001/0034237 A1 10/2001 Garahi
2001/0042246 A1 11/2001 Yuen et al.
2001/0043700 A1 11/2001 Shima et al.
2001/0043795 A1 11/2001 Wood et al.
2001/0047298 A1 11/2001 Moore et al.
2001/0049820 A1 12/2001 Barton
2002/0009283 A1 1/2002 Ichioka et al.
2002/0013941 A1 1/2002 Ward et al.
2002/0013949 A1 1/2002 Hejna
2002/0026496 A1 2/2002 Boyer et al.
2002/0026644 A1 2/2002 Hatayama
2002/0032907 A1 3/2002 Daniels
2002/0040475 A1 4/2002 Yap et al.
2002/0042913 A1 4/2002 Ellis et al.
2002/0042914 A1 4/2002 Walker et al.
2002/0048448 A1 4/2002 Daniels
2002/0056098 A1 5/2002 White
2002/0057892 A1 5/2002 Mano et al.
2002/0057893 A1 5/2002 Wood et al.
2002/0059599 A1 5/2002 Schein et al.
2002/0059602 A1 5/2002 Macrae et al.
2002/0059610 A1 5/2002 Ellis
2002/0059626 A1 5/2002 Lemmons
2002/0073424 A1 6/2002 Ward et al.
2002/0076203 A1 6/2002 Takahashi
2002/0083439 A1 6/2002 Eldering
2002/0083455 A1 6/2002 Sato
2002/0087588 A1 7/2002 McBride et al.
2002/0090203 A1 7/2002 Mankovitz
2002/0092017 A1 7/2002 Klosterman et al.
2002/0095673 A1 7/2002 Leung et al.
2002/0100044 A1 7/2002 Daniels
2002/0100052 A1 7/2002 Daniels
2002/0103920 A1 8/2002 Berkun et al.
2002/0110353 A1 8/2002 Potrebic et al.
2002/0112239 A1 8/2002 Goldman
2002/0112249 A1 8/2002 Hendricks et al.
2002/0116533 A1 8/2002 Holliman et al.
2002/0116712 A1 8/2002 Schein et al.
2002/0118676 A1 8/2002 Tonnby et al.
2002/0124249 A1 9/2002 Shintani et al.
2002/0124258 A1* 9/2002 Fritsch ..... 725/88
2002/0129360 A1 9/2002 Lee
2002/0129368 A1 9/2002 Schlack et al.
2002/0138840 A1 9/2002 Schein et al.
2002/0144279 A1 10/2002 Zhou
2002/0147975 A1 10/2002 Seo
2002/0147977 A1 10/2002 Hammett et al.
2002/0154888 A1 10/2002 Allen et al.
2002/0169712 A1 11/2002 Ginzboorg et al.
2002/0170068 A1 11/2002 Rafey et al.
2002/0174424 A1 11/2002 Chang et al.
2002/0174430 A1 11/2002 Ellis et al.
2002/0174433 A1 11/2002 Baumgartner et al.
2002/0184457 A1 12/2002 Yuasa et al.
2002/0184626 A1 12/2002 Darbee et al.
2002/0184629 A1 12/2002 Sie et al.
2002/0186958 A1 12/2002 Ikeda et al.
2002/0188944 A1 12/2002 Noble
2002/0191954 A1 12/2002 Beach et al.
2002/0194585 A1 12/2002 Connelly
2002/0194596 A1 12/2002 Srivastava
2002/0194598 A1 12/2002 Connelly
2002/0194607 A1 12/2002 Connelly
2002/0199185 A1 12/2002 Kaminski et al.
2003/0005432 A1 1/2003 Ellis et al.
2003/0005445 A1 1/2003 Schein et al.
2003/0009766 A1 1/2003 Marolda
2003/0012554 A1 1/2003 Zeidler et al.
2003/0012555 A1 1/2003 Yuen et al.
2003/0028878 A1 2/2003 Schein et al.
2003/0028889 A1 2/2003 McCoskey et al.
2003/0031465 A1 2/2003 Blake
2003/0033601 A1 2/2003 Sakata et al.
2003/0037336 A1 2/2003 Leftwich
2003/0040962 A1 2/2003 Lewis
2003/0044165 A1 3/2003 Wood et al.
2003/0061610 A1 3/2003 Errico
2003/0066085 A1 4/2003 Boyer et al.
2003/0067554 A1 4/2003 Klarfeld et al.
2003/0072556 A1 4/2003 Okujima et al.
2003/0084461 A1 5/2003 Hoang
2003/0088872 A1 5/2003 Maissel et al.
2003/0088873 A1 5/2003 McCoy et al.
2003/0093329 A1 5/2003 Gutta
2003/0097227 A1 5/2003 Bloch et al.
2003/0098891 A1 5/2003 Molander
2003/0099457 A1 5/2003 Takahashi et al.
2003/0103088 A1 6/2003 Dresti et al.
2003/0110499 A1 6/2003 Knudson et al.
2003/0115602 A1 6/2003 Knee et al.
2003/0118323 A1 6/2003 Ismail et al.
2003/0126607 A1 7/2003 Phillips et al.
2003/0131356 A1 7/2003 Proehl et al.
2003/0142957 A1 7/2003 Young et al.
2003/0149975 A1 8/2003 Eldering et al.
2003/0149980 A1 8/2003 Hassell et al.
2003/0149988 A1 8/2003 Ellis et al.
2003/0154485 A1 8/2003 Johnson et al.
2003/0154486 A1 8/2003 Dunn et al.
2003/0159157 A1 8/2003 Chan
2003/0163813 A1 8/2003 Klosterman et al.
2003/0164858 A1 9/2003 Klosterman et al.
2003/0165324 A1 9/2003 O'Connor et al.
2003/0167471 A1 9/2003 Roth et al.
2003/0188310 A1 10/2003 Klosterman et al.
2003/0188311 A1 10/2003 Yuen et al.
2003/0196201 A1 10/2003 Schein et al.
2003/0196203 A1 10/2003 Ellis et al.
2003/0198462 A1 10/2003 Bumgardner et al.
2003/0204847 A1 10/2003 Ellis et al.
2003/0206719 A1 11/2003 Bumgardner et al.
2003/0208756 A1 11/2003 Macrae et al.
2003/0208758 A1 11/2003 Schein et al.
2003/0208763 A1 11/2003 McElhatten et al.
2003/0208767 A1 11/2003 Williamson et al.
2003/0210898 A1 11/2003 Juen et al.
2003/0217057 A1 11/2003 Kuroiwa et al.
2003/0226147 A1 12/2003 Richmond et al.
2003/0229900 A1 12/2003 Reisman
2004/0001690 A1 1/2004 Boston et al.
2004/0003413 A1 1/2004 Boston et al.
2004/0008971 A1 1/2004 Young et al.
2004/0010807 A1 1/2004 Urdang et al.
2004/0019900 A1 1/2004 Knightbridge et al.
2004/0031050 A1 2/2004 Klosterman
2004/0049787 A1 3/2004 Maissel et al.
2004/0049794 A1 3/2004 Shao et al.
2004/0060063 A1 3/2004 Russ et al.
2004/0070594 A1 4/2004 Burke
2004/0073924 A1 4/2004 Pendakur
2004/0078809 A1 4/2004 Drazin
2004/0078815 A1 4/2004 Lemmons et al.
2004/0078820 A1 4/2004 Nickum
2004/0098744 A1 5/2004 Gutta
2004/0103434 A1 5/2004 Ellis
2004/0103439 A1 5/2004 Macrae et al.
2004/0111742 A1 6/2004 Hendricks et al.

(56) References Cited

U.S. PATENT DOCUMENTS

2004/0111745 A1 6/2004 Schein et al.
2004/0111756 A1 6/2004 Stuckman et al.
2004/0117845 A1 6/2004 Karaoguz et al.
2004/0125779 A1 7/2004 Kelton et al.
2004/0128685 A1 7/2004 Hassell et al.
2004/0128686 A1 7/2004 Boyer et al.
2004/0128690 A1 7/2004 Zohar Ariely
2004/0133655 A1 7/2004 Yen et al.
2004/0133907 A1 7/2004 Rodriguez et al.
2004/0139465 A1 7/2004 Matthews et al.
2004/0154040 A1 8/2004 Ellis
2004/0156614 A1 8/2004 Bumgardner et al.
2004/0160862 A1 8/2004 Ueki
2004/0163104 A1 8/2004 Schein et al.
2004/0181814 A1 9/2004 Ellis et al.
2004/0187150 A1 9/2004 Gonder et al.
2004/0187164 A1 9/2004 Kandasamy et al.
2004/0194131 A1 9/2004 Ellis et al.
2004/0194138 A1 9/2004 Boylan et al.
2004/0210932 A1 10/2004 Mori et al.
2004/0210935 A1 10/2004 Schein et al.
2004/0221310 A1 11/2004 Herrington et al.
2004/0257939 A1 12/2004 Kawamura
2004/0261108 A1 12/2004 Yuen et al.
2004/0264920 A1 12/2004 Helmstetter
2005/0015804 A1 1/2005 LaJoie et al.
2005/0015815 A1 1/2005 Shoff et al.
2005/0025469 A1 2/2005 Geer et al.
2005/0028208 A1 2/2005 Ellis et al.
2005/0028218 A1 2/2005 Blake
2005/0044567 A1 2/2005 Young et al.
2005/0050218 A1 3/2005 Sheldon
2005/0055715 A1 3/2005 Minnick et al.
2005/0066353 A1 3/2005 Fransdonk
2005/0080497 A1 4/2005 Rao
2005/0089022 A1 4/2005 Muhonen et al.
2005/0097622 A1 5/2005 Zigmond et al.
2005/0105528 A1 5/2005 Kobayashi
2005/0120003 A1 6/2005 Drury et al.
2005/0123001 A1 6/2005 Craven et al.
2005/0129049 A1 6/2005 Srinivasan et al.
2005/0138305 A1 6/2005 Zellner
2005/0138660 A1 6/2005 Boyer et al.
2005/0155056 A1 7/2005 Knee et al.
2005/0157217 A1 7/2005 Hendricks
2005/0160283 A1 7/2005 Hirata
2005/0160458 A1 7/2005 Baumgartner
2005/0160461 A1 7/2005 Baumgartner et al.
2005/0183123 A1 8/2005 Lee et al.
2005/0188415 A1 8/2005 Riley
2005/0193015 A1 9/2005 Logston et al.
2005/0193414 A1 9/2005 Horvitz et al.
2005/0198006 A1 9/2005 Boicey et al.
2005/0198668 A1 9/2005 Yuen et al.
2005/0204388 A1 9/2005 Knudson et al.
2005/0204393 A1 9/2005 Bopardikar et al.
2005/0213938 A1 9/2005 Ozawa et al.
2005/0216932 A1 9/2005 Danker
2005/0227611 A1 10/2005 Ellis
2005/0229214 A1 10/2005 Young et al.
2005/0229215 A1 10/2005 Schein et al.
2005/0234992 A1 10/2005 Haberman
2005/0235320 A1 10/2005 Maze et al.
2005/0235323 A1 10/2005 Ellis et al.
2005/0238168 A1 10/2005 Lee et al.
2005/0240962 A1 10/2005 Cooper et al.
2005/0240968 A1 10/2005 Knudson et al.
2005/0244138 A1 11/2005 O'Connor et al.
2005/0249130 A1 11/2005 Schutte et al.
2005/0251822 A1 11/2005 Knowles et al.
2005/0251827 A1 11/2005 Ellis et al.
2005/0265169 A1 12/2005 Yoshimaru et al.
2005/0267819 A1 12/2005 Kaplan
2005/0271357 A1 12/2005 Adler et al.
2005/0271363 A1 12/2005 Tanikawa
2005/0271364 A1 12/2005 Collar
2005/0271365 A1 12/2005 Hisatomi
2005/0271366 A1 12/2005 Wiinter et al.
2005/0273819 A1 12/2005 Knudson et al.
2005/0278741 A1 12/2005 Robarts et al.
2005/0283796 A1 12/2005 Flickinger
2005/0283800 A1 12/2005 Ellis et al.
2005/0289618 A1 12/2005 Hardin
2006/0010470 A1 1/2006 Kurosaki et al.
2006/0031883 A1 2/2006 Ellis et al.
2006/0034341 A1 2/2006 Vasudevan et al.
2006/0037044 A1 2/2006 Daniels
2006/0062550 A1 3/2006 Lee
2006/0064728 A1 3/2006 Son et al.
2006/0075443 A1* 4/2006 Eckert ..... H04N 7/17318 725/97
2006/0083484 A1 4/2006 Wada et al.
2006/0085825 A1 4/2006 Istvan et al.
2006/0085826 A1 4/2006 Funk et al.
2006/0111038 A1 5/2006 Tatsumi et al.
2006/0112410 A1 5/2006 Poli et al.
2006/0136965 A1 6/2006 Ellis et al.
2006/0136966 A1 6/2006 Folk
2006/0140584 A1 6/2006 Ellis et al.
2006/0143665 A1 6/2006 Meek et al.
2006/0143669 A1* 6/2006 Cohen ..... 725/90
2006/0146787 A1 7/2006 Wijnands et al.
2006/0165379 A1 7/2006 Agnihotri et al.
2006/0168620 A1 7/2006 Schein et al.
2006/0174270 A1 8/2006 Westberg et al.
2006/0206912 A1 9/2006 Klarfeld et al.
2006/0212904 A1 9/2006 Klarfeld et al.
2006/0218601 A1 9/2006 Michel
2006/0259949 A1 11/2006 Schaefer et al.
2007/0022032 A1 1/2007 Anderson et al.
2007/0067800 A1 3/2007 Wachtfogel et al.
2007/0071399 A1 3/2007 Ellis
2007/0074245 A1 3/2007 Nyako et al.
2007/0094684 A1 4/2007 Schein et al.
2007/0101377 A1 5/2007 Six et al.
2007/0104456 A1 5/2007 Craner
2007/0107010 A1 5/2007 Jolna et al.
2007/0116048 A1 5/2007 Addington
2007/0121678 A1 5/2007 Brooks et al.
2007/0136751 A1 6/2007 Garbow et al.
2007/0136753 A1 6/2007 Bovenschulte et al.
2007/0143813 A1 6/2007 Chen et al.
2007/0157241 A1 7/2007 Walker
2007/0157242 A1 7/2007 Cordray et al.
2007/0180072 A1 8/2007 Siripunkaw et al.
2007/0180465 A1 8/2007 Ou et al.
2007/0192812 A1* 8/2007 Pickens ..... H04N 7/17318 725/94
2007/0204285 A1 8/2007 Louw
2007/0204308 A1 8/2007 Nicholas et al.
2007/0204311 A1 8/2007 Hasek et al.
2007/0212023 A1 9/2007 Whillock
2007/0220553 A1 9/2007 Branam et al.
2007/0245371 A1 10/2007 Quinard
2007/0250863 A1 10/2007 Ferguson
2007/0266401 A1 11/2007 Hallberg
2007/0271582 A1 11/2007 Ellis et al.
2008/0010655 A1 1/2008 Ellis et al.
2008/0013429 A1 1/2008 Chen et al.
2008/0022331 A1 1/2008 Barrett
2008/0025304 A1* 1/2008 Venkataswami ..... H04N 21/238 370/390
2008/0062990 A1* 3/2008 Oran ..... H04L 1/1607 370/392
2008/0066016 A1 3/2008 Dowdy et al.
2008/0077957 A1 3/2008 Schein et al.
2008/0086747 A1 4/2008 Rasanen et al.
2008/0092168 A1 4/2008 Logan et al.
2008/0098431 A1 4/2008 Young et al.
2008/0098436 A1 4/2008 White
2008/0115169 A1 5/2008 Ellis et al.
2008/0170622 A1 7/2008 Gordon et al.
2008/0175143 A1 7/2008 Ansley
2008/0178221 A1 7/2008 Schein et al.

(56) References Cited

U.S. PATENT DOCUMENTS

| | | | |
|---|---|---|---|
| 2008/0184304 | A1 | 7/2008 | Ellis et al. |
| 2008/0184305 | A1 | 7/2008 | Schein et al. |
| 2008/0184308 | A1 | 7/2008 | Herrington et al. |
| 2008/0184312 | A1 | 7/2008 | Schein et al. |
| 2008/0184313 | A1 | 7/2008 | Knudson et al. |
| 2008/0184315 | A1 | 7/2008 | Ellis et al. |
| 2008/0184319 | A1 | 7/2008 | Mankovitz |
| 2008/0184322 | A1 | 7/2008 | Blake |
| 2008/0189742 | A1 | 8/2008 | Ellis et al. |
| 2008/0189743 | A1 | 8/2008 | Ellis et al. |
| 2008/0189744 | A1 | 8/2008 | Schein et al. |
| 2008/0189745 | A1 | 8/2008 | Hassell et al. |
| 2008/0212942 | A1 | 9/2008 | Gordon et al. |
| 2008/0216136 | A1 | 9/2008 | Pfeffer et al. |
| 2008/0229379 | A1 | 9/2008 | Akhter |
| 2008/0232769 | A1 | 9/2008 | Jureczki et al. |
| 2008/0235725 | A1 | 9/2008 | Hendricks |
| 2008/0263600 | A1 | 10/2008 | Olague et al. |
| 2008/0288980 | A1 | 11/2008 | Schein et al. |
| 2008/0320540 | A1 | 12/2008 | Brooks et al. |
| 2009/0025027 | A1 | 1/2009 | Craner |
| 2009/0025052 | A1 | 1/2009 | Schlack et al. |
| 2009/0031335 | A1 | 1/2009 | Hendricks et al. |
| 2009/0044226 | A1 | 2/2009 | Ellis et al. |
| 2009/0060468 | A1 | 3/2009 | Carlberg et al. |
| 2009/0060469 | A1 | 3/2009 | Olague et al. |
| 2009/0063681 | A1* | 3/2009 | Ramakrishnan et al. ..... H04N 7/17318 709/225 |
| 2009/0070817 | A1 | 3/2009 | Ellis et al. |
| 2009/0074380 | A1 | 3/2009 | Boston et al. |
| 2009/0077589 | A1 | 3/2009 | Boyer et al. |
| 2009/0148131 | A1* | 6/2009 | Akgul ..... H04N 21/439 386/355 |
| 2009/0241144 | A1 | 9/2009 | LaJoie et al. |
| 2009/0271818 | A1 | 10/2009 | Schlack |
| 2009/0297124 | A1 | 12/2009 | Ng |
| 2010/0036963 | A1* | 2/2010 | Gahm et al. ..... 709/231 |
| 2010/0046927 | A1* | 2/2010 | Manthoulis ..... 386/124 |
| 2010/0115413 | A1 | 5/2010 | Schein et al. |
| 2010/0115541 | A1 | 5/2010 | Schein et al. |
| 2010/0175090 | A1 | 7/2010 | Cordray |
| 2010/0211969 | A1 | 8/2010 | Schein et al. |
| 2010/0211975 | A1 | 8/2010 | Boyer et al. |
| 2010/0247065 | A1 | 9/2010 | Cooper et al. |
| 2011/0013885 | A1 | 1/2011 | Wong et al. |
| 2011/0030027 | A1 | 2/2011 | Nishioka et al. |
| 2011/0173660 | A1 | 7/2011 | Schein et al. |
| 2011/0185387 | A1 | 7/2011 | Schein et al. |
| 2011/0209170 | A1 | 8/2011 | Schein et al. |
| 2011/0258663 | A1 | 10/2011 | Lemmons et al. |
| 2011/0265124 | A1 | 10/2011 | Goldenberg et al. |
| 2012/0079539 | A1 | 3/2012 | Schein et al. |
| 2012/0272270 | A1 | 10/2012 | Boyer et al. |
| 2012/0304211 | A1 | 11/2012 | Berezowski et al. |
| 2013/0304586 | A1 | 11/2013 | Angles et al. |

FOREIGN PATENT DOCUMENTS

| | | | |
|---|---|---|---|
| AU | 2008201306 | A1 | 4/2008 |
| BR | PI97097942 | | 8/1999 |
| CA | 1030505 | A1 | 5/1978 |
| CA | 1187197 | A1 | 5/1985 |
| CA | 1188811 | A1 | 6/1985 |
| CA | 1196082 | A1 | 10/1985 |
| CA | 1200911 | A1 | 2/1986 |
| CA | 2091160 | A1 | 3/1992 |
| CA | 2151458 | A1 | 6/1994 |
| CA | 2345161 | A1 | 6/1994 |
| CA | 2164608 | A1 | 12/1994 |
| CA | 2232003 | | 4/1997 |
| CA | 2256691 | A1 | 12/1997 |
| CA | 2257971 | A1 | 12/1997 |
| CA | 2260993 | A1 | 2/1998 |
| CA | 2764753 | A1 | 6/1998 |
| CA | 2285645 | A1 | 7/1998 |
| CA | 2312326 | A1 | 6/1999 |
| CA | 2364020 | A1 | 5/2002 |
| CN | 1117687 | A | 2/1996 |
| CN | 1130843 | A | 9/1996 |
| CN | 1174477 | | 2/1998 |
| CN | 1175851 | A | 3/1998 |
| CN | 1200221 | A | 11/1998 |
| CN | 1225776 | A | 8/1999 |
| CN | 1355994 | A | 6/2002 |
| CN | 1567986 | | 1/2005 |
| DE | 29 18 846 | | 11/1980 |
| DE | 31 51 492 | | 7/1983 |
| DE | 3246225 | A1 | 6/1984 |
| DE | 3337204 | | 4/1985 |
| DE | 3 610 600 | | 1/1987 |
| DE | 36 21 263 | A1 | 1/1988 |
| DE | 3640436 | A1 | 6/1988 |
| DE | 3909334 | A1 | 9/1990 |
| DE | 4201031 | A1 | 7/1993 |
| DE | 4217246 | A1 | 12/1993 |
| DE | 4240187 | A1 | 6/1994 |
| DE | 4407701 | A1 | 9/1995 |
| DE | 44 31 438 | A1 | 3/1996 |
| DE | 44 40 174 | | 5/1996 |
| DE | 4440419 | A1 | 5/1996 |
| DE | 195 02 922 | | 8/1996 |
| DE | 19 531 121 | A1 | 2/1997 |
| DE | 19615437 | C1 | 7/1997 |
| DE | 19 740 079 | A1 | 3/1999 |
| DE | 19 931 046 | A1 | 1/2001 |
| EP | 0 072 153 | A2 | 2/1983 |
| EP | 0122626 | A2 | 10/1984 |
| EP | 0133985 | A2 | 3/1985 |
| EP | 0160545 | A2 | 11/1985 |
| EP | 0 239 884 | A1 | 10/1987 |
| EP | 0 276425 | A2 | 8/1988 |
| EP | 0339675 | | 11/1989 |
| EP | 0396062 | A2 | 11/1990 |
| EP | 0401930 | | 12/1990 |
| EP | 0408892 | A1 | 1/1991 |
| EP | 0420123 | A2 | 4/1991 |
| EP | 0424469 | | 5/1991 |
| EP | 0424648 | A2 | 5/1991 |
| EP | 0439281 | A2 | 7/1991 |
| EP | 0439290 | A1 | 7/1991 |
| EP | 0444496 | | 9/1991 |
| EP | 0447968 | A2 | 9/1991 |
| EP | 0 463 451 | A2 | 1/1992 |
| EP | 0472147 | | 2/1992 |
| EP | 0 477 754 | A2 | 4/1992 |
| EP | 0477756 | A2 | 4/1992 |
| EP | 0 492 853 | A2 | 7/1992 |
| EP | 0532322 | A2 | 3/1993 |
| EP | 0535749 | A2 | 4/1993 |
| EP | 0550911 | A1 | 7/1993 |
| EP | 0 560 593 | | 9/1993 |
| EP | 0 572 090 | | 12/1993 |
| EP | 0 575 956 | A2 | 12/1993 |
| EP | 0584991 | | 3/1994 |
| EP | 0605115 | A2 | 7/1994 |
| EP | 0617563 | A1 | 9/1994 |
| EP | 0 624 040 | A2 | 11/1994 |
| EP | 0624039 | A2 | 11/1994 |
| EP | 0627857 | A1 | 12/1994 |
| EP | 0631437 | A2 | 12/1994 |
| EP | 0 644 689 | A2 | 3/1995 |
| EP | 0 650 114 | A2 | 4/1995 |
| EP | 0 658 048 | A1 | 6/1995 |
| EP | 0660221 | A1 | 6/1995 |
| EP | 0 662 769 | A1 | 7/1995 |
| EP | 0662771 | A1 | 7/1995 |
| EP | 0665551 | | 8/1995 |
| EP | 0673160 | A1 | 9/1995 |
| EP | 0673583 | A1 | 9/1995 |
| EP | 0 682 452 | A2 | 11/1995 |
| EP | 0696140 | A2 | 2/1996 |
| EP | 0 705 036 | | 4/1996 |

(56) References Cited

FOREIGN PATENT DOCUMENTS

| | | | |
|---|---|---|---|
| EP | 0711073 | | 5/1996 |
| EP | 0711076 | A2 | 5/1996 |
| EP | 0713334 | | 5/1996 |
| EP | 0 723369 | A1 | 7/1996 |
| EP | 0721253 | A2 | 7/1996 |
| EP | 0725539 | A2 | 8/1996 |
| EP | 0737979 | A2 | 10/1996 |
| EP | 0737980 | A2 | 10/1996 |
| EP | 0 742669 | | 11/1996 |
| EP | 0744853 | A2 | 11/1996 |
| EP | 0744866 | | 11/1996 |
| EP | 0752767 | A2 | 1/1997 |
| EP | 0753964 | | 1/1997 |
| EP | 0758833 | A2 | 2/1997 |
| EP | 0762657 | A2 | 3/1997 |
| EP | 0762751 | A2 | 3/1997 |
| EP | 0762756 | A2 | 3/1997 |
| EP | 0763938 | | 3/1997 |
| EP | 0 774 853 | | 5/1997 |
| EP | 0 774 868 | A1 | 5/1997 |
| EP | 0772360 | | 5/1997 |
| EP | 0773682 | A2 | 5/1997 |
| EP | 0774866 | A2 | 5/1997 |
| EP | 0775417 | A1 | 5/1997 |
| EP | 0782332 | A2 | 7/1997 |
| EP | 0784405 | | 7/1997 |
| EP | 0 789 488 | | 8/1997 |
| EP | 0 793 225 | | 9/1997 |
| EP | 0 795 994 | | 9/1997 |
| EP | 0797355 | | 9/1997 |
| EP | 0801389 | A2 | 10/1997 |
| EP | 0801390 | A2 | 10/1997 |
| EP | 0 806 111 | A1 | 11/1997 |
| EP | 0805594 | A2 | 11/1997 |
| EP | 0806721 | A1 | 11/1997 |
| EP | 0822713 | | 2/1998 |
| EP | 0822718 | | 2/1998 |
| EP | 0827340 | A2 | 3/1998 |
| EP | 0 836 320 | | 4/1998 |
| EP | 0 836 321 | | 4/1998 |
| EP | 0 837599 | A2 | 4/1998 |
| EP | 0834798 | | 4/1998 |
| EP | 0843468 | | 5/1998 |
| EP | 0 848 383 | | 6/1998 |
| EP | 0848554 | A2 | 6/1998 |
| EP | 0849948 | | 6/1998 |
| EP | 0849958 | | 6/1998 |
| EP | 0 852361 | A2 | 7/1998 |
| EP | 0 854645 | | 7/1998 |
| EP | 0851681 | | 7/1998 |
| EP | 0852442 | A1 | 7/1998 |
| EP | 0854654 | | 7/1998 |
| EP | 0 858 223 | A2 | 8/1998 |
| EP | 0872834 | | 10/1998 |
| EP | 0874524 | | 10/1998 |
| EP | 0880856 | A1 | 12/1998 |
| EP | 0 892 554 | A2 | 1/1999 |
| EP | 0897242 | A1 | 2/1999 |
| EP | 0905985 | A2 | 3/1999 |
| EP | 0908049 | A1 | 4/1999 |
| EP | 0 921 682 | A2 | 6/1999 |
| EP | 0924927 | | 6/1999 |
| EP | 0932275 | | 7/1999 |
| EP | 0935393 | A2 | 8/1999 |
| EP | 0 940 983 | | 9/1999 |
| EP | 0 945003 | B1 | 9/1999 |
| EP | 0940985 | | 9/1999 |
| EP | 0944253 | A1 | 9/1999 |
| EP | 0944257 | A1 | 9/1999 |
| EP | 0963119 | A1 | 12/1999 |
| EP | 6969661 | | 1/2000 |
| EP | 0986046 | A1 | 3/2000 |
| EP | 0988876 | A1 | 3/2000 |
| EP | 1014715 | A2 | 6/2000 |
| EP | 1 059 749 | | 12/2000 |
| EP | 1094665 | A1 | 4/2001 |
| EP | 1 099 339 | | 5/2001 |
| EP | 1095504 | A2 | 5/2001 |
| EP | 1099341 | A1 | 5/2001 |
| EP | 1107588 | A2 | 6/2001 |
| EP | 0 856 847 | | 11/2001 |
| EP | 1152605 | A1 | 11/2001 |
| EP | 1158793 | A2 | 11/2001 |
| EP | 1187467 | A2 | 3/2002 |
| EP | 1217787 | A2 | 6/2002 |
| EP | 1 271 952 | | 1/2003 |
| EP | 1292137 | A1 | 3/2003 |
| EP | 0936811 | B1 | 5/2003 |
| EP | 1355489 | A2 | 10/2003 |
| EP | 1377049 | A1 | 1/2004 |
| EP | 1427148 | A1 | 6/2004 |
| EP | 1473934 | | 11/2004 |
| EP | 1 515 549 | | 3/2005 |
| EP | 1 538 838 | | 6/2005 |
| EP | 1581001 | A2 | 9/2005 |
| EP | 1613066 | A2 | 1/2006 |
| EP | 1667455 | A1 | 6/2006 |
| EP | 1763234 | A2 | 3/2007 |
| EP | 1796393 | A1 | 6/2007 |
| EP | 1940158 | A2 | 7/2008 |
| EP | 2174484 | A | 4/2010 |
| FR | 2572235 | A1 | 4/1986 |
| FR | 2579397 | A2 | 9/1986 |
| FR | 2962895 | A1 | 12/1991 |
| FR | 2 678 091 | | 12/1992 |
| GB | 1 554 411 | | 10/1979 |
| GB | 2034995 | A | 6/1980 |
| GB | 2126002 | A | 3/1984 |
| GB | 2164194 | A | 3/1986 |
| GB | 2185670 | A | 7/1987 |
| GB | 2 210 526 | | 6/1989 |
| GB | 2219886 | | 12/1989 |
| GB | 2 227 622 | | 8/1990 |
| GB | 2 229 595 | | 9/1990 |
| GB | 2 256 115 | | 11/1992 |
| GB | 2256116 | A | 11/1992 |
| GB | 2256546 | A | 12/1992 |
| GB | 2265792 | | 10/1993 |
| GB | 2275800 | | 9/1994 |
| GB | 2 286 754 | | 8/1995 |
| GB | 2289782 | A | 11/1995 |
| GB | 2294173 | A | 4/1996 |
| GB | 2298544 | | 9/1996 |
| GB | 2 300 551 | A | 11/1996 |
| GB | 2309134 | A | 7/1997 |
| GB | 2325537 | A | 11/1998 |
| GB | 2 346 251 | | 8/2000 |
| GB | 2 375 674 | A | 11/2002 |
| HK | 1022969 | A1 | 4/2007 |
| JP | 58137334 | A | 8/1983 |
| JP | 58196738 | A | 11/1983 |
| JP | 58210776 | A | 12/1983 |
| JP | 59141878 | A | 8/1984 |
| JP | 60171685 | A | 9/1985 |
| JP | 61050470 | A | 3/1986 |
| JP | 61074476 | A | 4/1986 |
| JP | 62-060370 | | 3/1987 |
| JP | 62060372 | | 3/1987 |
| JP | 62060378 | A | 3/1987 |
| JP | 62060384 | A | 3/1987 |
| JP | 63-054884 | A | 3/1988 |
| JP | 06392177 | | 4/1988 |
| JP | 63234679 | A | 9/1988 |
| JP | 63-289619 | A | 11/1988 |
| JP | 64013278 | U | 1/1989 |
| JP | 11-32311 | A | 5/1989 |
| JP | 11-88280 | A | 7/1989 |
| JP | 01209399 | A | 8/1989 |
| JP | 1212986 | A | 8/1989 |
| JP | 01213853 | A | 8/1989 |
| JP | 01307944 | A | 12/1989 |
| JP | 02045495 | A | 2/1990 |
| JP | 02048879 | A | 2/1990 |
| JP | 0281385 | | 3/1990 |

(56) References Cited

FOREIGN PATENT DOCUMENTS

| | | | |
|---|---|---|---|
| JP | 10-234007 | | 9/1990 |
| JP | 03-022770 | | 1/1991 |
| JP | 03059837 | A | 3/1991 |
| JP | 03063990 | A | 3/1991 |
| JP | 03215781 | A | 9/1991 |
| JP | 03226083 | | 10/1991 |
| JP | 03286483 | | 12/1991 |
| JP | 04079053 | | 3/1992 |
| JP | 04105285 | A | 4/1992 |
| JP | 04227380 | | 8/1992 |
| JP | 04250760 | A | 9/1992 |
| JP | 05101471 | | 4/1993 |
| JP | 05-183826 | | 7/1993 |
| JP | 05260400 | A | 10/1993 |
| JP | 05260554 | A | 10/1993 |
| JP | 05284437 | | 10/1993 |
| JP | 05-314186 | B2 | 11/1993 |
| JP | 06-21907 | | 1/1994 |
| JP | 06014129 | A | 1/1994 |
| JP | 04042454 | B2 | 2/1994 |
| JP | 06038165 | | 2/1994 |
| JP | 6046345 | A | 2/1994 |
| JP | 60-61935 | A | 3/1994 |
| JP | 06069850 | A | 3/1994 |
| JP | 06-121262 | | 4/1994 |
| JP | 06111413 | | 4/1994 |
| JP | 06-124309 | | 5/1994 |
| JP | 06133334 | | 5/1994 |
| JP | 06504165 | | 5/1994 |
| JP | 06-208500 | | 7/1994 |
| JP | 06-217271 | | 8/1994 |
| JP | 06236592 | | 8/1994 |
| JP | 06-261139 | A | 9/1994 |
| JP | 06243539 | | 9/1994 |
| JP | 06303541 | | 10/1994 |
| JP | 06-350546 | | 12/1994 |
| JP | 07-021619 | | 1/1995 |
| JP | 07020254 | A | 1/1995 |
| JP | 07023356 | | 1/1995 |
| JP | 07-050259 | | 2/1995 |
| JP | 07044910 | A | 2/1995 |
| JP | 07-076592 | | 3/1995 |
| JP | 07-135621 | A | 5/1995 |
| JP | 07123326 | | 5/1995 |
| JP | 07-162776 | | 6/1995 |
| JP | 07147657 | A | 6/1995 |
| JP | 07154349 | A | 6/1995 |
| JP | 07160732 | | 6/1995 |
| JP | 07184131 | A | 7/1995 |
| JP | 07193762 | A | 7/1995 |
| JP | 07193763 | A | 7/1995 |
| JP | 7212328 | | 8/1995 |
| JP | 07212331 | A | 8/1995 |
| JP | 07212732 | A | 8/1995 |
| JP | 07230666 | A | 8/1995 |
| JP | 07231437 | A | 8/1995 |
| JP | 07-288759 | | 10/1995 |
| JP | 07-298153 | | 11/1995 |
| JP | 07-321748 | | 12/1995 |
| JP | 07-336318 | | 12/1995 |
| JP | 08-018882 | A | 1/1996 |
| JP | 08-056352 | | 2/1996 |
| JP | 08032528 | A | 2/1996 |
| JP | 08032538 | | 2/1996 |
| JP | 08077763 | | 3/1996 |
| JP | 08-116495 | A | 5/1996 |
| JP | 08125497 | | 5/1996 |
| JP | 08130517 | A | 5/1996 |
| JP | 08180505 | | 7/1996 |
| JP | 08506941 | | 7/1996 |
| JP | 08-242436 | | 9/1996 |
| JP | 08242313 | A | 9/1996 |
| JP | 08251122 | | 9/1996 |
| JP | 08275077 | | 10/1996 |
| JP | 08317331 | | 11/1996 |
| JP | 08-331546 | A | 12/1996 |
| JP | 09-009245 | | 1/1997 |
| JP | 09037151 | A | 2/1997 |
| JP | 9037168 | | 2/1997 |
| JP | 09037172 | A | 2/1997 |
| JP | 09 065300 | | 3/1997 |
| JP | 09-070020 | | 3/1997 |
| JP | 09-102827 | A | 4/1997 |
| JP | 11-512903 | | 4/1997 |
| JP | 09-120686 | A | 5/1997 |
| JP | 09 148994 | | 6/1997 |
| JP | 09 162818 | | 6/1997 |
| JP | 09-162821 | | 6/1997 |
| JP | 09506226 | | 6/1997 |
| JP | 09182035 | | 7/1997 |
| JP | 09-214873 | | 8/1997 |
| JP | 08314979 | A | 8/1997 |
| JP | 09204286 | | 8/1997 |
| JP | 9245467 | | 9/1997 |
| JP | 09-261609 | A | 10/1997 |
| JP | 09-279965 | A | 10/1997 |
| JP | 09259515 | A | 10/1997 |
| JP | 09-298677 | | 11/1997 |
| JP | 09289630 | | 11/1997 |
| JP | 09322213 | | 12/1997 |
| JP | 1027076 | | 1/1998 |
| JP | 10-042235 | | 2/1998 |
| JP | 10042242 | | 2/1998 |
| JP | 10 065978 | | 3/1998 |
| JP | 10-093933 | | 4/1998 |
| JP | 10091534 | | 4/1998 |
| JP | 10092161 | A | 4/1998 |
| JP | 10093879 | | 4/1998 |
| JP | 10093905 | | 4/1998 |
| JP | 10093936 | | 4/1998 |
| JP | 10108122 | | 4/1998 |
| JP | 10112087 | | 4/1998 |
| JP | 10-143340 | | 5/1998 |
| JP | 10-143349 | | 5/1998 |
| JP | 10164487 | | 6/1998 |
| JP | 10174037 | A | 6/1998 |
| JP | 63141467 | A | 6/1998 |
| JP | 10191221 | | 7/1998 |
| JP | 10-228500 | | 8/1998 |
| JP | 10215440 | | 8/1998 |
| JP | 10243309 | | 9/1998 |
| JP | 10243344 | | 9/1998 |
| JP | 10243352 | | 9/1998 |
| JP | 10247344 | A | 9/1998 |
| JP | 10257400 | A | 9/1998 |
| JP | 10-289205 | | 10/1998 |
| JP | 10-512420 | | 11/1998 |
| JP | 11 032272 | | 2/1999 |
| JP | 1169317 | | 3/1999 |
| JP | 11-136615 | A | 5/1999 |
| JP | 11-136658 | | 5/1999 |
| JP | 11177682 | | 7/1999 |
| JP | 11177962 | A | 7/1999 |
| JP | 11205711 | | 7/1999 |
| JP | 10-40057 | | 8/1999 |
| JP | 11-266414 | A | 9/1999 |
| JP | 11261917 | A | 9/1999 |
| JP | 11295579 | | 10/1999 |
| JP | 11-313280 | A | 11/1999 |
| JP | 11-317937 | A | 11/1999 |
| JP | 11308561 | A | 11/1999 |
| JP | 11-353071 | A | 12/1999 |
| JP | H11-341040 | A | 12/1999 |
| JP | 2000-004272 | A | 1/2000 |
| JP | 2000-013708 | | 1/2000 |
| JP | 2000-138886 | | 5/2000 |
| JP | 2000-224533 | | 8/2000 |
| JP | 2000-235546 | | 8/2000 |
| JP | 2000216845 | A | 8/2000 |
| JP | 2000-261750 | A | 9/2000 |
| JP | 2000-287179 | A | 10/2000 |
| JP | 2000-306314 | | 11/2000 |
| JP | 2000-312333 | A | 11/2000 |
| JP | 2000-339931 | A | 12/2000 |

(56) References Cited

FOREIGN PATENT DOCUMENTS

| | | | |
|---|---|---|---|
| JP | 2001-022282 | A | 1/2001 |
| JP | 200186423 | | 2/2001 |
| JP | 2001-88372 | | 3/2001 |
| JP | 2001103404 | A | 4/2001 |
| JP | 2001-165669 | | 6/2001 |
| JP | 2001-167522 | | 6/2001 |
| JP | 2001167491 | A | 6/2001 |
| JP | 2001-213595 | | 8/2001 |
| JP | 2001-257950 | | 9/2001 |
| JP | 2002/010153 | A | 1/2002 |
| JP | 2002-063385 | A | 2/2002 |
| JP | 03286444 | B2 | 5/2002 |
| JP | 2002514794 | A | 5/2002 |
| JP | 2002-176610 | A | 6/2002 |
| JP | 2002/185931 | A | 6/2002 |
| JP | 2002/185951 | A | 6/2002 |
| JP | 2002/199318 | A | 7/2002 |
| JP | 2002-522977 | A | 7/2002 |
| JP | 2002-223425 | | 8/2002 |
| JP | 2002-279969 | | 9/2002 |
| JP | 2002-335463 | A | 11/2002 |
| JP | 2002335473 | A | 11/2002 |
| JP | 2002-354354 | A | 12/2002 |
| JP | 2002369108 | A | 12/2002 |
| JP | 2002374506 | A | 12/2002 |
| JP | 2003067226 | A | 3/2003 |
| JP | 2003076598 | A | 3/2003 |
| JP | 2003-162444 | A | 6/2003 |
| JP | 2003169087 | A | 6/2003 |
| JP | 2003-189267 | A | 7/2003 |
| JP | 2003-199004 | A | 7/2003 |
| JP | 2003-209893 | A | 7/2003 |
| JP | 2003219340 | A | 7/2003 |
| JP | 2003219367 | A | 7/2003 |
| JP | 2003-304503 | A | 10/2003 |
| JP | 2003-339000 | A | 11/2003 |
| JP | 2004-07592 | | 1/2004 |
| JP | 2004-23326 | | 1/2004 |
| JP | 2004-080083 | A | 3/2004 |
| JP | 2004-120038 | A | 4/2004 |
| JP | 2004-159004 | A | 6/2004 |
| JP | 2004159318 | A | 6/2004 |
| JP | 2004-193920 | A | 7/2004 |
| JP | 2004-343520 | A | 12/2004 |
| JP | 2005-094175 | A | 4/2005 |
| JP | 2005-117236 | A | 4/2005 |
| JP | 2005115790 | A | 4/2005 |
| JP | 4410169 | B2 | 12/2005 |
| JP | 2006025444 | A | 1/2006 |
| JP | 2006066968 | A | 3/2006 |
| JP | 200753566 | | 3/2007 |
| JP | 1078328 | | 5/2009 |
| JP | 04276342 | B2 | 6/2009 |
| JP | 2010506299 | A | 2/2010 |
| JP | 2010187389 | A | 8/2010 |
| JP | 2011083034 | | 4/2011 |
| JP | 5053378 | B2 | 10/2012 |
| JP | 05137104 | B2 | 2/2013 |
| KR | 19920015347 | | 7/1995 |
| KR | 1998025758 | | 7/1998 |
| KR | 1019970064188 | | 5/1999 |
| KR | 1999-0086454 | | 12/1999 |
| KR | 1020000054561 | | 9/2000 |
| KR | 1020030029410 | | 4/2003 |
| KR | 2005-0108181 | A | 11/2005 |
| KR | 2005-0113493 | A | 12/2005 |
| KR | 1020087015347 | | 4/2011 |
| SG | 60981 | | 12/1998 |
| WO | WO-83/02208 | A1 | 6/1983 |
| WO | WO-86/01359 | A1 | 2/1986 |
| WO | WO-86/01962 | | 3/1986 |
| WO | WO-87/03766 | | 6/1987 |
| WO | WO-88/01465 | A1 | 2/1988 |
| WO | WO-88/04057 | A1 | 6/1988 |
| WO | WO-88/04507 | | 6/1988 |
| WO | WO-8902682 | A1 | 3/1989 |
| WO | WO-89/03085 | | 4/1989 |
| WO | WO-89/11199 | A1 | 11/1989 |
| WO | WO-89/12370 | | 12/1989 |
| WO | WO-90/00847 | A1 | 1/1990 |
| WO | WO-90/01243 | A1 | 2/1990 |
| WO | WO-90/07844 | A1 | 7/1990 |
| WO | WO-90/15507 | | 12/1990 |
| WO | WO-9100670 | | 1/1991 |
| WO | WO-91/07050 | A1 | 5/1991 |
| WO | WO-91/08629 | A1 | 6/1991 |
| WO | WO-91/18476 | A1 | 11/1991 |
| WO | WO-92/04801 | | 3/1992 |
| WO | WO-92/17027 | | 10/1992 |
| WO | WO-9222983 | A2 | 12/1992 |
| WO | WO-9304473 | | 3/1993 |
| WO | WO-9305452 | A1 | 3/1993 |
| WO | WO-9308542 | | 4/1993 |
| WO | WO-93/10606 | A1 | 5/1993 |
| WO | WO-93/11638 | | 6/1993 |
| WO | WO-93/11639 | | 6/1993 |
| WO | WO-93/11640 | | 6/1993 |
| WO | WO-93/23957 | A1 | 11/1993 |
| WO | WO-9322877 | | 11/1993 |
| WO | W9-94/14283 | A1 | 6/1994 |
| WO | WO-94/13107 | | 6/1994 |
| WO | WO-94/13284 | | 6/1994 |
| WO | WO-94/14282 | A1 | 6/1994 |
| WO | WO-94/14284 | A1 | 6/1994 |
| WO | WO-9414281 | A1 | 6/1994 |
| WO | WO-94/15284 | | 7/1994 |
| WO | WO-94/16441 | A1 | 7/1994 |
| WO | WO-9421085 | A1 | 9/1994 |
| WO | WO-94/23383 | A1 | 10/1994 |
| WO | WO-94/29811 | A1 | 12/1994 |
| WO | WO-95/01056 | | 1/1995 |
| WO | WO-95/01058 | A1 | 1/1995 |
| WO | WO-95/01059 | A1 | 1/1995 |
| WO | WO-95/02945 | A1 | 1/1995 |
| WO | WO-95/04431 | A2 | 2/1995 |
| WO | WO-95/06389 | A1 | 3/1995 |
| WO | WO-95/07003 | | 3/1995 |
| WO | WO-95/10910 | | 4/1995 |
| WO | WO-9510916 | A1 | 4/1995 |
| WO | WO-9511567 | | 4/1995 |
| WO | WO-95/15657 | | 6/1995 |
| WO | WO-95/15658 | A1 | 6/1995 |
| WO | WO-95/16568 | A1 | 6/1995 |
| WO | WO-9515649 | A1 | 6/1995 |
| WO | WO-95/19092 | A1 | 7/1995 |
| WO | WO-9518449 | | 7/1995 |
| WO | WO-95/26095 | A2 | 9/1995 |
| WO | WO-95/26608 | A1 | 10/1995 |
| WO | WO-95/28055 | A1 | 10/1995 |
| WO | WO-95/28799 | A1 | 10/1995 |
| WO | WO-95/30961 | A1 | 11/1995 |
| WO | WO-95/32585 | | 11/1995 |
| WO | WO-95/32587 | | 11/1995 |
| WO | WO-9531069 | | 11/1995 |
| WO | WO-9532583 | A1 | 11/1995 |
| WO | WO-9532584 | | 11/1995 |
| WO | WO-95/33338 | A1 | 12/1995 |
| WO | WO-96/07270 | A1 | 3/1996 |
| WO | WO-96/08109 | A1 | 3/1996 |
| WO | WO-96/09721 | A1 | 3/1996 |
| WO | WO-9608113 | A1 | 3/1996 |
| WO | WO-96/13932 | A1 | 5/1996 |
| WO | WO-9613013 | A1 | 5/1996 |
| WO | WO-9613124 | A1 | 5/1996 |
| WO | WO-9613935 | A1 | 5/1996 |
| WO | WO-96/17467 | A2 | 6/1996 |
| WO | WO-9617473 | | 6/1996 |
| WO | WO-96/20555 | | 7/1996 |
| WO | WO-9621990 | A2 | 7/1996 |
| WO | WO-96/25821 | A1 | 8/1996 |
| WO | WO-96/26605 | | 8/1996 |
| WO | WO-9627270 | A1 | 9/1996 |
| WO | WO-9627982 | | 9/1996 |
| WO | WO-9627989 | | 9/1996 |

(56) References Cited

FOREIGN PATENT DOCUMENTS

| | | | |
|---|---|---|---|
| WO | WO-96/31980 | A1 | 10/1996 |
| WO | WO-96/32583 | A1 | 10/1996 |
| WO | WO-96/33572 | | 10/1996 |
| WO | WO-96/34467 | A1 | 10/1996 |
| WO | WO-96/34486 | A1 | 10/1996 |
| WO | WO-96/34491 | A1 | 10/1996 |
| WO | WO-9633579 | | 10/1996 |
| WO | WO-96/36172 | | 11/1996 |
| WO | WO-96/37075 | | 11/1996 |
| WO | WO-96/37983 | A1 | 11/1996 |
| WO | WO-9637996 | A1 | 11/1996 |
| WO | WO-96/38799 | A1 | 12/1996 |
| WO | WO-96/41418 | A1 | 12/1996 |
| WO | WO-96/41477 | A1 | 12/1996 |
| WO | WO-96/41478 | | 12/1996 |
| WO | WO-9638962 | | 12/1996 |
| WO | WO-9641470 | A1 | 12/1996 |
| WO | WO-9641471 | A1 | 12/1996 |
| WO | WO-9641472 | | 12/1996 |
| WO | WO-97/02568 | A1 | 1/1997 |
| WO | WO-97/02702 | A2 | 1/1997 |
| WO | WO-97/04595 | A1 | 2/1997 |
| WO | WO-9705616 | | 2/1997 |
| WO | WO-9707656 | | 3/1997 |
| WO | WO-97/12314 | A1 | 4/1997 |
| WO | WO-97/12486 | | 4/1997 |
| WO | WO-97/13368 | | 4/1997 |
| WO | WO-97/17774 | A1 | 5/1997 |
| WO | WO-97/18670 | A1 | 5/1997 |
| WO | WO-97/18675 | | 5/1997 |
| WO | WO-97/19555 | A1 | 5/1997 |
| WO | WO-97/19565 | | 5/1997 |
| WO | WO-97/22207 | | 6/1997 |
| WO | WO-9721291 | A2 | 6/1997 |
| WO | WO-97/23997 | A1 | 7/1997 |
| WO | WO-97/26612 | A1 | 7/1997 |
| WO | WO97/28499 | A1 | 8/1997 |
| WO | WO-97/31480 | | 8/1997 |
| WO | WO-9730546 | | 8/1997 |
| WO | WO-9731479 | A1 | 8/1997 |
| WO | WO-97/33434 | | 9/1997 |
| WO | WO-97/34413 | | 9/1997 |
| WO | WO-9732434 | A1 | 9/1997 |
| WO | WO-9734414 | | 9/1997 |
| WO | WO-9735428 | A1 | 9/1997 |
| WO | WO-97/36422 | | 10/1997 |
| WO | WO-9737500 | A1 | 10/1997 |
| WO | WO-9740623 | | 10/1997 |
| WO | WO-97/41673 | A2 | 11/1997 |
| WO | WO-97/42763 | | 11/1997 |
| WO | WO-97/46943 | A1 | 12/1997 |
| WO | WO-97/47106 | | 12/1997 |
| WO | WO-97/47124 | | 12/1997 |
| WO | WO-97/47143 | | 12/1997 |
| WO | WO-97/48230 | | 12/1997 |
| WO | WO-97/49237 | | 12/1997 |
| WO | WO-97/49241 | | 12/1997 |
| WO | WO-97/49242 | | 12/1997 |
| WO | WO-97/50250 | A1 | 12/1997 |
| WO | WO-97/50251 | | 12/1997 |
| WO | WO-9745786 | | 12/1997 |
| WO | WO-9746008 | | 12/1997 |
| WO | WO-9746016 | | 12/1997 |
| WO | WO-9748228 | A1 | 12/1997 |
| WO | WO-9749057 | | 12/1997 |
| WO | WO-9801995 | | 1/1998 |
| WO | WO-98/06098 | A1 | 2/1998 |
| WO | WO-98/06219 | | 2/1998 |
| WO | WO-98/07277 | A1 | 2/1998 |
| WO | WO-98/10589 | A1 | 3/1998 |
| WO | WO-98/10598 | | 3/1998 |
| WO | WO-9812872 | | 3/1998 |
| WO | WO-98/14009 | A1 | 4/1998 |
| WO | WO-98/16062 | | 4/1998 |
| WO | WO-98/17063 | A1 | 4/1998 |
| WO | WO-98/17064 | A1 | 4/1998 |
| WO | WO-9816056 | | 4/1998 |
| WO | WO-9817033 | A1 | 4/1998 |
| WO | WO-9818260 | A1 | 4/1998 |
| WO | WO-98/20675 | A1 | 5/1998 |
| WO | WO-9819459 | A1 | 5/1998 |
| WO | WO-9821664 | A1 | 5/1998 |
| WO | WO-9821877 | | 5/1998 |
| WO | WO-98/26584 | | 6/1998 |
| WO | WO-98/26594 | | 6/1998 |
| WO | WO-98/27723 | | 6/1998 |
| WO | WO-9826528 | A2 | 6/1998 |
| WO | WO-9826569 | A2 | 6/1998 |
| WO | WO-9826596 | | 6/1998 |
| WO | WO-98/28906 | A2 | 7/1998 |
| WO | WO-98/31148 | A1 | 7/1998 |
| WO | WO-9831115 | A2 | 7/1998 |
| WO | WO-9831116 | A2 | 7/1998 |
| WO | WO-9834405 | A1 | 8/1998 |
| WO | WO-9837694 | A1 | 8/1998 |
| WO | WO-98/39893 | A2 | 9/1998 |
| WO | WO-98/41020 | A1 | 9/1998 |
| WO | WO-9838831 | A1 | 9/1998 |
| WO | WO-98/43183 | A1 | 10/1998 |
| WO | WO-98/47279 | | 10/1998 |
| WO | WO-98/47290 | A1 | 10/1998 |
| WO | WO-98/48566 | A2 | 10/1998 |
| WO | WO-9843416 | A1 | 10/1998 |
| WO | WO-9847283 | | 10/1998 |
| WO | WO-9847287 | | 10/1998 |
| WO | WO-9847289 | | 10/1998 |
| WO | WO-98/51076 | A1 | 11/1998 |
| WO | WO-98/53611 | A1 | 11/1998 |
| WO | WO-98/56172 | A1 | 12/1998 |
| WO | WO-98/56173 | A1 | 12/1998 |
| WO | WO-98/56176 | A1 | 12/1998 |
| WO | WO-9859478 | A1 | 12/1998 |
| WO | WO-99/01984 | A1 | 1/1999 |
| WO | WO-99/03267 | A1 | 1/1999 |
| WO | WO-99/04561 | | 1/1999 |
| WO | WO-99/04570 | | 1/1999 |
| WO | WO-99/07142 | A1 | 2/1999 |
| WO | WO-99/14945 | A1 | 3/1999 |
| WO | WO-99/14947 | A1 | 3/1999 |
| WO | WO-9911060 | A1 | 3/1999 |
| WO | WO-9912320 | A1 | 3/1999 |
| WO | WO-9912346 | A2 | 3/1999 |
| WO | WO-9918722 | | 4/1999 |
| WO | WO-99/29109 | A1 | 6/1999 |
| WO | WO-99/30491 | A1 | 6/1999 |
| WO | WO-99/31480 | A1 | 6/1999 |
| WO | WO-9927681 | A2 | 6/1999 |
| WO | WO-9928897 | A1 | 6/1999 |
| WO | WO-99/33265 | A1 | 7/1999 |
| WO | WO-99/35584 | A2 | 7/1999 |
| WO | WO-99/35753 | A2 | 7/1999 |
| WO | WO-99/35845 | A1 | 7/1999 |
| WO | WO-99/38092 | A1 | 7/1999 |
| WO | WO-9935827 | A1 | 7/1999 |
| WO | WO-9937045 | A1 | 7/1999 |
| WO | WO-9939466 | A1 | 8/1999 |
| WO | WO-99/45700 | | 9/1999 |
| WO | WO-99/45701 | A1 | 9/1999 |
| WO | WO-99/45702 | | 9/1999 |
| WO | WO-99/52279 | | 10/1999 |
| WO | WO-99/52285 | A1 | 10/1999 |
| WO | WO-99/56466 | | 11/1999 |
| WO | WO-99/56473 | A1 | 11/1999 |
| WO | WO-99/57837 | A2 | 11/1999 |
| WO | WO-99/57859 | | 11/1999 |
| WO | WO-99/60493 | A1 | 11/1999 |
| WO | WO-99/60783 | | 11/1999 |
| WO | WO-99/60789 | | 11/1999 |
| WO | WO-9960790 | | 11/1999 |
| WO | WO-99/64969 | A2 | 12/1999 |
| WO | WO-99/66725 | | 12/1999 |
| WO | WO-9965237 | A1 | 12/1999 |
| WO | WO-9965244 | A1 | 12/1999 |
| WO | WO-00/04706 | A2 | 1/2000 |

(56) References Cited

FOREIGN PATENT DOCUMENTS

| | | | |
|---|---|---|---|
| WO | WO-00/04707 | | 1/2000 |
| WO | WO-00/04708 | A1 | 1/2000 |
| WO | WO-00/04709 | A1 | 1/2000 |
| WO | WO-0001149 | A1 | 1/2000 |
| WO | WO-0002385 | A1 | 1/2000 |
| WO | WO-00/07368 | | 2/2000 |
| WO | WO-00/08850 | | 2/2000 |
| WO | WO-00/08851 | | 2/2000 |
| WO | WO-00/08852 | | 2/2000 |
| WO | WO-0005885 | A1 | 2/2000 |
| WO | WO-0005889 | A1 | 2/2000 |
| WO | WO-00/11865 | A1 | 3/2000 |
| WO | WO-00/13415 | A2 | 3/2000 |
| WO | WO-00/16548 | | 3/2000 |
| WO | WO-00/17738 | A1 | 3/2000 |
| WO | WO-0011869 | A1 | 3/2000 |
| WO | WO-0013416 | A1 | 3/2000 |
| WO | WO-0016336 | A1 | 3/2000 |
| WO | WO-00/28379 | A1 | 5/2000 |
| WO | WO-00/28734 | | 5/2000 |
| WO | WO-00/28739 | | 5/2000 |
| WO | WO-00/30345 | A1 | 5/2000 |
| WO | WO-0027122 | A1 | 5/2000 |
| WO | WO-00/33208 | A2 | 6/2000 |
| WO | WO-00/33560 | A2 | 6/2000 |
| WO | WO-00/33573 | A1 | 6/2000 |
| WO | WO-00/33578 | A1 | 6/2000 |
| WO | WO-00/34891 | A2 | 6/2000 |
| WO | WO-0033160 | A2 | 6/2000 |
| WO | WO-0033224 | A1 | 6/2000 |
| WO | WO-0033565 | | 6/2000 |
| WO | WO-0035193 | A1 | 6/2000 |
| WO | WO-00/40012 | A1 | 7/2000 |
| WO | WO-00/040014 | A1 | 7/2000 |
| WO | WO-00/040026 | A1 | 7/2000 |
| WO | WO-00/44146 | A1 | 7/2000 |
| WO | WO-00/49801 | A1 | 8/2000 |
| WO | WO-00/51310 | A1 | 8/2000 |
| WO | WO-00/58214 | A1 | 10/2000 |
| WO | WO-00/58833 | | 10/2000 |
| WO | WO-00/58967 | | 10/2000 |
| WO | WO-00/59214 | A1 | 10/2000 |
| WO | WO-00/59223 | | 10/2000 |
| WO | WO-00/59230 | A1 | 10/2000 |
| WO | WO-00/59233 | | 10/2000 |
| WO | WO-00/62298 | | 10/2000 |
| WO | WO-00/62299 | | 10/2000 |
| WO | WO-00/62533 | | 10/2000 |
| WO | WO-00/67475 | | 11/2000 |
| WO | WO-00/74383 | A1 | 12/2000 |
| WO | WO-00/79798 | | 12/2000 |
| WO | WO-01/01677 | A1 | 1/2001 |
| WO | WO-01/06784 | A2 | 1/2001 |
| WO | WO-0103088 | A1 | 1/2001 |
| WO | WO-0110126 | A1 | 2/2001 |
| WO | WO-0110128 | A1 | 2/2001 |
| WO | WO-01/15438 | A1 | 3/2001 |
| WO | WO-01/22729 | | 3/2001 |
| WO | WO-01/35662 | A1 | 5/2001 |
| WO | WO-01/37549 | A2 | 5/2001 |
| WO | WO-01-46843 | A2 | 6/2001 |
| WO | WO-01/47238 | | 6/2001 |
| WO | WO-01/47249 | | 6/2001 |
| WO | WO-01/47257 | | 6/2001 |
| WO | WO-01/47273 | | 6/2001 |
| WO | WO-01/47279 | | 6/2001 |
| WO | WO-01/69929 | A1 | 9/2001 |
| WO | WO-01/76239 | | 10/2001 |
| WO | WO-01/76704 | A2 | 10/2001 |
| WO | WO-0176248 | A2 | 10/2001 |
| WO | WO-0182600 | A2 | 11/2001 |
| WO | WO-0189213 | A1 | 11/2001 |
| WO | WO-01/93588 | A2 | 12/2001 |
| WO | WO-01/98920 | A1 | 12/2001 |
| WO | WO-02/31731 | A2 | 4/2002 |
| WO | WO-02/67579 | A1 | 8/2002 |
| WO | WO-02/69636 | A1 | 9/2002 |
| WO | WO-02/78317 | | 10/2002 |
| WO | WO-02/84992 | A2 | 10/2002 |
| WO | WO-03/005712 | A1 | 1/2003 |
| WO | WO-03/032634 | A2 | 4/2003 |
| WO | WO-03/041410 | A1 | 5/2003 |
| WO | WO-03043321 | A1 | 5/2003 |
| WO | WO-03047235 | A2 | 6/2003 |
| WO | WO-03/060157 | A2 | 7/2003 |
| WO | WO-03/098932 | | 11/2003 |
| WO | WO-04/002156 | A1 | 12/2003 |
| WO | WO-04/019602 | A2 | 3/2004 |
| WO | WO-04/940906 | A2 | 5/2004 |
| WO | WO-04/054264 | | 6/2004 |
| WO | WO-04/091217 | A1 | 10/2004 |
| WO | WO-04/100526 | A2 | 11/2004 |
| WO | WO-05/002214 | A1 | 1/2005 |
| WO | WO-05/003921 | A2 | 1/2005 |
| WO | WO-05/022764 | A1 | 3/2005 |
| WO | WO-05/027512 | A1 | 3/2005 |
| WO | WO-05/084031 | A1 | 9/2005 |
| WO | WO-05/091626 | | 9/2005 |
| WO | WO-05/101188 | A2 | 10/2005 |
| WO | WO-06/060157 | A2 | 6/2006 |
| WO | WO-06/113404 | A2 | 10/2006 |
| WO | WO-07078739 | A2 | 7/2007 |
| WO | WO-07/096815 | A1 | 8/2007 |
| WO | WO-07/106464 | A2 | 9/2007 |
| WO | WO-08/045305 | A2 | 4/2008 |
| WO | WO-09/014593 | A2 | 1/2009 |

OTHER PUBLICATIONS

"Buckeye DVR User Manual", Retrieved at <<http://www.buckeyecablesystem.com/downloads/User_Information/DVR_UserGuide.pdf>>, pp. 12.

"SureWest DVR", Retrieved at <<http://www.surewest.com/digital_tv/dvr/surewest_dvr_guide_fin.pdf>>, pp. 1-17.

"The Direct TV HD DVR Review and Overview", Retrieved at <<http://www.tvzap.com/free-direct-tv-dvr-deal.php>>, Sep. 25, 2008, pp. 2.

The Guru, "How to Record and Save Programs on your Dish Network DVR", Retrieved at <<http://satellitetvguru.net/how-to-record-and-save-programs-on-your-dish-network-dvr/>>, May 12, 2008, pp. 3.

U.S. Appl. No. 60/019,351.

U.S. Appl. No. 60/020,580.

U.S. Appl. No. 60/024,435.

U.S. Appl. No. 60/024,436.

U.S. Appl. No. 60/024,452.

U.S. Appl. No. 60/032,539.

"2720R Satellite Receiver User's Guide," General Instrument, 1991, pp. 58-61.

"A Wonderworld of Services," The Sunday Times, Innovation section, p. 4, Jan. 7, 1996, 1 page.

"Articles from PR Newswire", Published Jun. 5, 1997, 19 pages.

"Columbia House CD-ROM Direct: Detail Page," accessed from the internet at http://web.archive.org/web/19961221160255/http://www.columbiahouse.com/cd/cgis . . . , copyright 1996, printed on Sep. 19, 2013, 1 page.

"Columbia House CD-ROM Direct: Download Demos!," accessed from the internet at http://web.archive.org/web/19961221095819/http://www.columbiahouse.com/cd/cgis . . . , copyright 1996, printed on Sep. 19, 2013, 3 pages.

"Columbia House CD-ROM Direct: Member Center," accessed from the internet at http://web.archive.org/web/19961221085905/http://www.columbiahouse.com/repl/cd/ . . . , copyright 1996, printed on Sep. 19, 2013, 2 pages.

"Columbia House CD-ROM Direct: Member Center," copyright 1996, 1 page.

"Columbia House CD-ROM Direct: The Connection," accessed from the internet at http://web.archive.org/web/19961221100721/http://www.columbiahouse.com/repl/cd/ . . . , copyright 1996, printed on Sep. 20, 2013, 1 page.

(56) References Cited

OTHER PUBLICATIONS

"Columbia House CD-ROM Direct: The Connection," accessed from the internet at http://web.archive.org/web/19961223152924/http://www.columbiahouse.com/repl/cd/ . . . , copyright 1996, printed on Sep. 20, 2013, 1 page.
"Columbia House Laser Disc Club: FAQ Answers," accessed from the internet at http://web.archive.org/web/19961223165516/http://www.columbiahouse.com/rep1/lc/t . . . , copyright 1996, printed on Sep. 20, 2013, 5 pages.
"Columbia House Laser Disc Club: Join The Club," accessed from the internet at http://web.archive.org/web/19961221094037/http://www.columbiahouse.com/repl/lc/t . . . , copyright 1996, printed on Sep. 20, 2013, 2 pages.
"Columbia House Music Club: Join The Club," accessed from the internet at http://web.archive.org/web/19961221091101/http://www.columbiahouse.com/repl/mc . . . , copyright 1996, printed on Sep. 20, 2013, 2 pages.
"Columbia House Music Club: Search," accessed from the internet at http://web.archive.org/web/19961221114653/http://www.columbiahouse.com/repl/mc . . . , copyright 1996, printed on Sep. 19, 2013, 1 page.
"Columbia House Music Club: Shopping Cart," accessed from the internet at http://web.archive.org/web/19961221120941/http://www.columbiahouse.com/mc/cgis . . . , copyright 1996, printed on Sep. 19, 2013, 1 page.
"Columbia House Video Club: Essential Collection," accessed from the internet at http://web.archive.org/web/19961221131908/http://www.columbiahouse.com/vc/cgis/j . . . , copyright 1996, printed on Sep. 20, 2013, 1 page.
"Comdex—Mitsubishi Previews 40-Inch DiamondWeb TV," Newsbytes, Nov. 19, 1996, Abstract, 2 pages.
"Computer Network: Current Status and Outlook on Leading Science and Technology," Bureau of Science & Technology (Japan), vol. 1, Dec. 1986, 326 pages.
"Cool Websites: [2 Star Edition]," Houston Chronicle, Houston, Texas, Jul. 11, 1996, p. 3, Abstract.
"Creation-Modification of the Audio Signal Processor Setup for a PC Audio Editor," IBM Technical Disclosure Bulletin, vol. 30, No. 10, Mar. 1988, pp. 367-376.
"D2B-Home Bus Für Audio and Video," Selektor, Apr. 1990, pp. 10, 12. (English langauge translation attached) 8 total pages.
"DAVIC 1.0 Specifications", Part 1, "Description of DAVIC Functionalities," Revision 3.2, Digital Audio-Visual Council, Jul. 10, 1995, 61 pages.
"Description of Digital Audio-Visual Functionalities (Technical Report)," Digital Audio-Visual Council (DAVIC), 1.3.1 Part 1,:1998, 86 pages.
"Does NBC Get It," Aug. 14, 1995, retrieved from the internet at http://www.open4success.org/db/bin19/019687.html, retrieved on Dec. 11, 2013, 1 page.
"Don Imus: The Thinking Man's Shock Jock", Broadcasting Cable, Jun. 13, 1994, 6 pages.
"Electronic Program Guide via Internet," Research Disclosure, Kenneth Mason Publications, Hampshire, GB, vol. 385, No. 2, May 1, 1996, ISSN: 0374-4353, 1 page.
"Enhanced Content Specification," "ATVEF," from the internet at http:--www.atvef.com-library-spec.html, printed Aug. 22, 2001, the document bears a Copyright date of 1998, 1999, 2000, 41 pages.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994, ETS 300 468, 64 pages.
"Facsimile Transmission," NHK Research Monthly Report, Dec. 1987 (Unknown author), 78 pages.
"GameSpot: Allied General—Download It Now!!!!," accessed from the internet at http://web.archive.org/web/19970206133452/http://www.gamespot.com/strategy/allie . . . , copyright 1997, printed on Sep. 19, 2013, 1 page.
"GameSpot: Allied General at a Glance," accessed from the internet at http://web.archive.org/web/19970205153530/http://www.gamespot.com/strategy/allie . . . , copyright 1996, printed on Sep. 19, 2013, 1 page.
"GameSpot's Downloads for Allied General," accessed from the internet at http://web.archive.org/web/19970205060703/http://www.gamespot.com/strategy/allie . . . , copyright 1997, printed on Sep. 19, 2013, 1 page.
"Gateway Destination: The PC for the Office and the Family Room," PC Magazine, First Looks section, pp. 39-41, Jun. 11, 1996.
"General Instrument Features the Latest Interactive, Revenue-Generating Applications on its Advanced Analog CFT-2200 Platform at the National Cable Television Association's Show," PR Newswire—NY May 4, 1998, 2 pages.
"Getting Started" Installation Guide, "Using StarSight 1" Manual, and Remote Control "Quick Reference Guide." Undated, 93 pages.
"Hobbes' Internet Timeline 10.2," by Robert H'obbes' Zakon, from the internet at http://www.zakon.org/robert/internet/timeline/, printed from the internet on Sep. 13, 2012, 29 pages.
"Information Technology—Generic Coding of Moving Pictures and Associated Audio Information—Part 6: Extensions for DSM-CC," International Standard First Addition, Sep. 1, 1998 (626 pages).
"Interactive Computer Conference Server," IBM Technical Bulletin, vol. 34, No. 7A, Dec. 1991, pp. 375-377.
"Interactivity for the Passive," published in Dec. 6, 1993 issue of Forbes, 5 pages.
"Interface Device for Conventional TVs to Improve Functionality", IBM Technical Disclosure Bulletin, vol. 36, No. 7, Jul. 1993, pp. 53-54.
"Internet User Forecast by Country," Computer Industry Almanac—Press Release, from the internet at http://www.c-i-a.com/internetusersexec.html, printed from the internet on Sep. 13, 2012, 3 pages.
"IS-60.3 Physical Layer and Medium Specifications. Part 3—CS Physical Layer & Medium Specification," CX Specification, Revised Mar. 19, 1992, Table of Contents and pp. 1-41 (45 pages).
"List-Mania," published in May 1992 issue of Video Review, 5 pages.
"MSI Datacasting Systems," TV Communications Journal, 2 pages, Jan. 1973.
"Open TV Launches OpenStreamer™ Technology for Broadcasters to Deliver First Ever Real-Time Digital Interactive Television," from the internet at http:--www.opentv.com-news-openstreamer_press_final.htm, printed on Jun. 28, 1999, the document bears a copyright date of 1999, 2 pages.
"Prevue Channel Sep. 1, 1995 (part 1)," PrevueGuide, from the internet at http://www.youtube.com/watch?v=OVul78nH6RY, retrieved on Nov. 26, 2013, 1 page.
"Prevue Networks and OpenTV(R) Agree to Work Together on Deploying Interactive Program Guides Worldwide," from the internet at http:--www.opentv.com-news-prevuefinal.htm, printed on Jun. 28, 1999, 2 pages.
"Prevue Online Debuts Local Listings for 250 Systems; System-Specific Listings Include Multimedia Features—Free Build Acceleration," PR Newswire, Jun. 5, 1997, 2 pages.
"Prevue Online", Dec. 28, 1996, extract from web.archive.org, printed on Nov. 18, 2014, http://www.prevue.com, 1 page.
"Probe XL Brochure, Auto Tote Systems Inc.," (Newark, Delaware) (undated) 57 pgs.
"Step Up to the Superhighway," The Sunday Times, Innovation section, p. 6, Jan. 7, 1996.
"Student.Net TV Search & Remind," from the internet at http://web.archive.org/web/19970124213237/http://www.student.net/tv/ and http://web.archive.org/web/19970124214926/www.student.net/tv/serch.cgi?searchTerm=Fri . . . , printed on May 12, 2005, 5 pages.
"Switched Digital Video & Cable's Looming Bandwidth Crisis: Executive Summary," Heavy Reading, vol. 5, No. 16, Dec. 2007, 4 pages. [http://www.heavyreading.com/details.asp?sku_id=2014&skuitem_itemid=1063&promo_code=&aff_code=&next_url=%2Fdefault.asp%3F].

(56) References Cited

OTHER PUBLICATIONS

"Technological Examination & Basic Investigative Research Report on Image Databases," Japan Mechanical Engineering Organization Int'l Society for the Advancement of Imaqe Software, Japan, Mar. 1988, 127 pages.
"Technology: Turn on, tune in and print out—An experimental interactive television service is set to alter our viewing habits," Financial Times (London), Oct. 14, 1993, p. 11.
"The Columbia House Video Club: Download Software," accessed from the internet at http://web.archive.org/web/19961223163101/http://www.columbiahouse.com/repl/vc . . . , copyright 1996, printed on Sep. 19, 2013, 1 page.
"The History Behind Broadcatch—SmarTV (1989)," Broadcatch Technologies, from the internet at http://www.broadcatch.com/smartv.html, Jul. 1989, pp. 1-6, printed from the internet on Aug. 31, 2005.
"The New Media and Broadcast Policy: An Investigation & Research Conference Report on Broadcasting Diversification," Radio Regulatory Bureau, Japan Ministry of Posts & Telecommunications, Mar. 1982, 114 pages.
"Today's Stop: What's on Tonite," Oct. 3, 1995, retrieved from the internet at http://internettourbus.com/arch/1995/TB100395.TXT, retrieved on Dec. 9, 2013, 3 pages.
"TV Listings Functional Spec.," Time Video Information Services, Inc., undated, 11 pages.
"Welcome to Columbia House Online," accessed from the internet at http://web.archive.org/web/19961221085121/http://www.columbiahouse.com/, copyright 1996, printed on Sep. 19, 2013, 1 page.
"What's New @ Prevue Online—Real™ Video," May 2, 1997, extract from web.archive.org, printed on Nov. 18, 2014, http://www.prevue.com/scripts/whatsnew.asp, 5 pages.
"What's on Tonite!," Jan. 28, 1995, retrieved from the internet at http://www.library.georgetown.edu/newjour/publication/whats-tonite-tm, retrieved on Dec. 11, 2013, 9 pages.
"Yearling's Free Personalised TV Guide," from the internet at http://www.yearling.com/, Dec. 30, 1996, 15 pages.
A Financial Times Survey: Viewdata (Advertisement), Financial Times, Mar. 20, 1979.
Abarca, C. et al., Telecommunications Information Networking Architecture Consortium "TINA-C Deliverable" Service Architecture, Version 5.0, Jun. 16, 1997, 168 pages.
ACM Multimedia 93 Proceedings, A Digital On-Demand Video Service Suporting Content-Based Queries, Little et al. pp. 427-436, Jul. 1993.
Addressable Converters: A New Development at CableData, Via Cable, vol. 1, No. 12, Dec. 1981, 11 pages.
Advanced Analog Systems—Addressable Terminals General Instrument Corp. of Horsham, Pennsylvania (URL:http//www.gi.com/BUSAREA/ANALOG/TERMINAL/WATCH/watch.html) Printed from the Internet on Mar. 4, 1999, 1 page.
Advertisement for "TV Decisions," Cable Vision, Aug. 4, 1986, 3 pages.
Aho, Debra, "New Delphi Ads Push Envelope: Starting Visuals From Upstart Agency Go Too Far for One Paper's Tastes," Advertising Age 0.0, May 30, 1994, p. 16, Abstract (2 pages).
Alexander, Michael "Visualizing cleared-off desktops," *Computerworld*, May 6, 1991, p. 20.
Andrews, "A Chip That Allows Parents to Censor TV Sex and Violence," The New York Times, Sunday, Jul. 18, 1993, 2 pages.
Antonoff, M., "Stay Tuned for Smart TV," *Popular Science*, Nov. 1990, pp. 62-65.
Arango et al., "The Touring Machine System," Communications of the ACM, Jan. 1993, vol. 36, No. 1, pp. 68-77.
Intel Intercast's Website from Archieve. Org, "How Does It Work?", <https://web.archive.org/web/19990429214537/www.intercast.com/intercast/howitwks.htm>, Acessed on Jul. 8, 2008, 2 pages.
Intel Intercast's Website from Archieve. Org, "What Is It?", <http://web.archive.org/web/19990422195517/www.inercast.com/intercast/whatisit.htm>, Acessed on Jul. 8, 2008, 1 page.
Armstrong, "Channel-Surfing's next wave: Henry Yuen's interactive TV guide takes on TCI and Viacom," BusinessWeek, Jul. 31, 1995, 3 pages.
Arnold, "Britain to get wired city—via telephone," Electronics, Mar. 4, 1976, at 76.
Automating in a digital world, servers lead the way into the new realm of DTV, Broadcasting and Cable, published Nov. 24, 1997, 5 pages.
Bach U et al, "Multimediales-TV-Gereat," Radio Fernsehen Electronik, De, Veb, Verlag, Technik, Berlin, vol. 45, No. 9, Aug. 1, 1996, pp. 28, 30-31, XP 000636538, ISSN: 1436-1574 (Translation, pp. 1-5).
Bach U et alk "Multimedia-Terminal ALS Endgeraet," Funkschau, De, Franzis-Verlag K.G. Munchen, vol. 68, No. 6, Mar. 1, 1996, pp. 70-75, XP 000556486, ISSN: 0016-2841 (Translation, pp. 1-7).
Bach, U. et al., "Multimedia TV Set, Part 1" Radio-Fernsehen Elektronik (RFE), Sep. 1996, pp. 28, 30, 31. (English language translation attached).
Bach, U. et al., "Multimedia TV Set, Part 2 and Conclusion," Radio-Fernsehen Elektronik (RFE), Oct. 1996, pp. 38-40. (English language translation attached.).
Bacon, "Concurrent Systems," 2nd Ed, Addison Wesley Longman Ltd., 59 pages, 1998.
Baer, R.H, "Innovative Add-On TV Products," IEEE Transactions on Consumer Electronics, vol. CE-25, Nov. 1979, pp. 765-771.
Bell Atlantic Buys Cable TV Company for $22bn, Financial Times (London), Oct. 14, 1993 p. 65.
Bensch, U., "VPV Videotext Programs Videorecorder," *IEEE Paper*, Jun. 1988, pp. 788-792.
Berniker, "TV Guide going online", Broadcasting & Cable, pp. 49-52 (Jun. 13, 1994).
Berniker, M., "DEC Develops Server/Set-Top Alliance: Company Wants to Insure Compatibility for Next Generation of TV Sets," Dec. 5, 1994, 1 page.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Blahut et al., "Interactive Television," Proceedings of the IEEE, Jul. 1995, 17 pages.
Bolle, et al., "Video Query: Research Directions," IMB Journal of Research and Development 42, 2: ProQuest p. 233, Mar. 1998.
Bowen et al., The Datacycle Architecture, Communications of the ACM, vol. 35, No. 12 pp. 71-81, Dec. 1992.
Boyd-Merritt, "Television wires two-way video," Electronic Engineering Times, Apr. 25, 1994, 3 pages.
Brochure, "A New Approach to Addressability," CableData, undated, 9 pages.
Brochure, "Westar and Videotoken Network Present the CableComputer," Revised Aug. 15, 1985, 41 pages.
Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated, (pp. V 79167-79175).
Brochure, VTN "Videotoken Network, New Dimension Television," Dec. 1985, 10 pages.
Brody H., Information highway: The Home Front, Technology Review, vol. 96:6 (Aug./Sep. 1993) p. 30, 7 pages.
Brown, "The Next Step: Searchable Television," Broadcasting & Cable, 128, 22: ProQuest, p. 30, May 25, 1998.
Brugliera, "Digital On-Screen Display—A New Technology for the Consumer Interface," Symposium Record Cable Sessions, 18th International Television Symposium and Technical Exhibition, Montreux, Switzerland, Jun. 10-15, 1993, pp. 572-586, Jun. 11, 1993.
Buchholz et al., "Revolution auf dem Bildschirm—Die neuen Medien Videotext und Bildschirmtext," Wilhelm Goldmann Verlag, Munich, Germany, copyright 1979, pp. 24-33 and 36-39 (English language translation attached).
Business Wire, Gemstar Adopts Shareholder Rights Plan and Amendments to Articles and Memorandum of Association, Jul. 12, 1998, 2 pages.

(56) References Cited

OTHER PUBLICATIONS

Bwanausi, D., 'Daily News' Zones Into New Editions, ADWEEK Western Edition, Sep. 17, 1990, 2 pages.
Cable Computer User's Guide, Rev. 1, Dec. 1985, 4 pages.
Cable Data, "What's a software company doing manufacturing addressable converters?" (2011), p. 331, 10 pages.
Cable Television Equipment, Jerrold Communications Publication, dated 1992 and 1993, pp. 8-2.1 to 8-6 and 8-14.1 to 8-14.3.
CableData, Roseville Consumer Presentation, Mar. 1986, 12 pages.
Carne, E.B., "The Wired Household," *IEEE Spectrum*, vol. 16 No. 10, Oct. 1979, pp. 61-66.
Case 4: 11-cv-06591-PJH, Complaint for Declaratory Relief (plaintiff), dated Dec. 21, 2011, 16 pages.
Chan, Patrick P., "Learning Considerations in User Interface Design: The Room Model," Publication of the Software Portability Laboratory, University of Waterloo, Ontario, Canada, Jul. 1984, 52 pages.
Chang, Yee-Hsiang et al., "An Open-Systems Approach to Video on Demand," IEEE Communications Magazine, May 1994, pp. 68-80.
Chawathe, Y., et al., "A Proxy Architecture for Reliable Multicast in Heterogeneous Environments", ACM Multimedia '98, Bristol, UK, pp. 151-159, 1998.
Chen et al., "Real Time video and Audio in the World Wide Web," Proc. 4th World Wide Web Conference, 1995, 15 pages.
Cheng et al., "Extended Relational Database Technology for New Applications,"IBM Systems Journal, vol. 33, No. 2 (1994), 16 pages.
Cherrick, S. et al., Individually addressable receiver with interactive channel guide display, VCR, and cable box control, IEEE Transactions on Consumer Electronics, 40:3 (1994), pp. 317-328.
Christodoulakis, Steven and Graham, Stephen "*Browsing Within Time-Driven Multimedia Documents*," publication of the Institute for Computer Research, University of Waterloo, Waterloo, Ontario, Canada Jul. 1988 pp. 219-227.
Cleland, Kim, "Look Out MSN, Here Comes MCI," Advertising Age, vol. 66, No. 32, Aug. 14, 1995, p. 19 (2 pages).
CNN Tech: Sonicblue revives ReplayTV, articles cnn.com, Sep. 10, 2001, retrieved from the internet http://articles.cnn.com/2001-09-10/tech/replay.tv.idg_1_replaytv-sonicblue-digital-video?_s=PM:Tech, 2 pages.
Compton et al., "Internet CNN Newsroom: a digital video news magazine and library," Proc. of the Intl. Conf. on Multimedia Computing and Systems. Washington, May 15-18, 1995; [Proceedings of the International Conference on Multimedia Computing and Systems], Los Alamitos, IEEE Comp. Soc. Press, US, May 15, 1995 (May 15, 1995), pp. 296-301, XP010154611.
Computer Science: An Overview, 5th Edition, Addison Wesley, ISBN 0-8053-4632-5, pp. 25 to 28 (undated).
Results listing from web.archive.org showing the archive date of Oct. 9, 1997 as the archived date of document, 1 page.
Costello, "VideoGuide vs. StarSight—Going Screen-to-Screen," Dealerscope Consumer Electronics Marketplace 38.1, Copyright North American Publishing Company, Jan. 1996, 4 pages.
Costello, M., On-screen TV program guides, Stereo Review, 60:8 (Aug. 1995), 3 pages.
Cox, J. et al, "Extended Services in A Digital Compression System," Proceedings from Eleven Technical Sessions: 42nd Annual Convention and Exposition of the National Cable Television Association, Jun. 1993, pp. 185-191.
Daily, Mack, "Addressable Decoder with Downloadable Operation," Proceedings from the Eleven Technical Sessions, 42nd Annual Convention and Exposition of the NCTA, Jun. 6-9, 1993, pp. 82-89.
Damouny, N.G., "Teletext Decoders-Keeping Up With the Latest Advances," *IEEE Transactions on Consumer Electronics*, vol. CE-30, No. 3, Aug. 1984, pp. 429-435.
Dan et al., "Evolution and Challenges in Multimedia," IBM Journal of Research and Development, 42, 2: ProQuest p. 177, Mar. 1998.
Davidson, Ken, "CEBus: A New Standard in Home Automation" Circuit Cellar Ink, pp. 40-52 (1989).
Day, "The Great PC/TV Debate," OEM Magazine, Jul. 1, 1996, 6 pages.
December, J., "Understanding the Potential of Java and the Web", Presenting Java, published Sep. 20, 1995, 219 pages.
Derwent Abstracts, RD 385002 A, "Electronic Program Guide System via Internet Uses Television Programs Displayed on Internet Pages and Associates it With Program Label and On-Screen Icons to Remotely Program and Control TV Receiver w.r.t. Selected Program," published May 10, 1996 (2 pages).
Dial M for Movie, Periodical Funkschau, vol. 11/1994, pp. 78-79 (English language translation attached).
Dialing the printed page, ITT in Europe Profile, 11/Spring 1977, 2 pages.
Dias, D. "A Scalable and Highly Available Web Server", IEEE, Proceedings of COMPCON '96, p. 85-92, 1996.
Dickson, G., "KPTV Gets on the Sony Digital Train," Broadcasting & Cable, 2 pages, Jan. 8, 1996.
Digital Video Broadcasting (DVB); DVB specification for data broadcasting, European Telecommunications Standards Institute, Draft EN 301 192 V1.2.1 (Jan. 1999), 33 pages.
Dinwiddie et al., "Combined-User Interface for Computers, Television, Video Recorders, and Telephone, Etc.," IP.com Prior Art Database Bulletin, Aug. 1, 1990, 3 pages.
DIRECTV Digital Satellite Receiver—Operating Instructions, Sony Electronics Inc., 60 pages. (2001).
DIRECTV Plus2 System, Thompson Consumer Electronics, Inc., 2 pages (1999).
DIRECTV Receiver—Owner's Manual, DIRECTV, Inc., 119 pages (2002).
DIRECTV Receiver with TiVo Digital Satellite Receiver/Recorder SAT-T60—Installation Guide, Sony Corporation, 43 pages (2000).
DIRECTV Receiver with TiVo Installation Guide, Philips, TiVo Inc., 68 pages (2000).
DIRECTV Receiver with TiVo Viewer's Guide, Tivo Inc., Sony Corp., 152 pages (1999, 2000).
DiRosa, S. "Pinochle's BIGSURG Netguide", Jul. 1995, vol. 3.1, pp. 260-270 (27 total pages).
DiRosa, S., "BIGSURF Netguide," Jul. 1995, vol. 3.1 (Sections 18, 21, and 28—renumbered as pp. 1-27).
DishPro Satellite System—User's Guide, Dish Network, 144 pages (Sep. 1, 2001).
Dr. Dobb's, "Implementing a Web Shopping Cart," from the internet at https://www.drdobbs.com/article/print?articleId=184409959&siteSect . . . , Sep. 1, 1996, printed from the internet on Sep. 13, 2012, 15 pages.
Eckhoff, "TV Listing Star on the Computer," Central Penn Business Journal, High Beam Research, 4 pages (Mar. 15, 1996).
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukünftige Informations—Und Datenangebote Beim Digitalen Fernsehen—EPG Und "Lesezeichen"," Rundfunktechnische Mitteilungen, vol. 41, pp. 67-72, Jun. 1997 (English language translation attached).
Electronic Program Guide via Internet, Research Disclosure, Kenneth Mason Publications, Hampshire, GB Nr. 385 (May 1996) p. 276, ISSN:0374-4353.
Electronic Programme Guide (EPG); Protocol for a TV Guide using electronic data transmission by European Telecommunication Standards Institute, May 1997, Valbonne, France, publication No. ETS 300 707, 89 pages.
Fall 2001 TiVo Service Update with Dual Tuner!, TiVo Inc., 9 pages (2001).
Fall, K., A Peer-to-Peer I/O System in Support of I/O Intensive Workloads, PhD Dissertation, University of California, San Diego (1994) 133 pages.
Federighi, C. et al. "A Distributed Hierarchical Storage Manager for a Video-on-Demand System", Storage and Retrieval for Image and Video Databases II, IS&T/SPIE, Symp. on Elec. Imaging Sci. & Tech., San Jose, CA, pp. 1-13, Feb. 1994.
Fox, A., et al., Adapting to Network and Client Variation Using Infrastructural Proxies: Lessons and Perspectives, Personal Communications IEEE, pp. 10-19 (Aug. 1998) (15 pages).

(56) References Cited

OTHER PUBLICATIONS

Fry et al., "Delivering QoS Controlled Continuous Media on the World Wide Web," Proceedings of the 4th International IFIP Workshop on QoS, Paris, Mar. 6-8, 1996, 12 pages.
FTP file listing of doc/resource-guide/front-matter at ftp.cs.toronto.edu (undated), 1 page.
Furht et al., Design issues for interactive television systems, Computer, vol. 28:5 (May 1995), pp. 25-39.
Garneau, "Information Highway in Quebec," Editor & Publisher, vol. 127, No. 5, Jan. 29, 1994 (4 pages).
Gavron, Jacquelyn, Moran, Joseph, How to Use Microsoft Windows NT 4 Workstation, 1996, entire document, pp. 1-5.
Gemstar Buys VideoGuide Stake, Consumer Electronics, Feb. 26, 1996, 2 pages.
Gemstar Development Corporation, VCR plus +, 1990, 4 pages.
Goff, Leslie, "Subs Find Lots of Program Guides Online," Multichannel News, vol. 17, No. 19, May 6, 1996, p. 38, Abstract (3 pages).
Goldberg, "A 35 inch Zenith TV premieres Star Sight's onscreen guide," Video, 1 page (Apr. 1995).
Gondow et al., "The Architecture of Communication Migration and Media State Management for Distributed Applications on Wearable Networks," Information Processing Society of Japan 61st National Conference, Oct. 3-5, 2000, (with English language translation ), 8 pages.
Growing US interest in the impact of viewdata, Computing Weekly, Jul. 20, 1978, 1 page.
Hallenbeck et al., "Personal Home TV Programming Guide," Digest of Technical Papers of the International Conference on Consumer Electronics, Jun. 6-8, 1990, pp. 310-311.
Han et al., "Dynamic Adaptation in an Image Transcoding Proxy for Mobile Web Browsing," IEEE Personal Communications, Dec. 1998, pp. 8-17.
Harada, Mamoru et al., "Internet de telebi housou ga hajimaru," ("Television Broadcasting Starts with the Internet"), Nikkei Electronics, Japan, Nikkei BP, No. 653, Jan. 15, 1996, pp. 67-75.
Hartwig, Rautenberg, Bollmann, "Broadcasting and Processing of Program Guides for Digital TV," *SMPTE Journal*, pp. 727-732, Oct. 1997.
Hauptmann et al., "News on Demand," News-on-Demand: An Application Informedia® Technology D-Lib Magazine, (Sep. 13, 1995), XP002675162, Retrieved from the Internet: URL:http://www.dlib.org/dlib/september95/nod/page3/html[retrieved on May 2, 2012], 1 page.
Healey, J., "Smart TV Recorders Get Another Player", San Jose Mercury News (California), Sep. 11, 1998, 2 pages.
Hedger, J., "Telesoftware: Home Computing Via Broadcast Teletext," *IEEE Transactions on Consumer Electronics*, vol. CE-25, No. 3, Jul. 1979, pp. 279-287.
Hirtz Gentlemen: et al:, "Open TV: Betriebssystem Fuer Interaktives Fernsehen," Fernseh Und Kinotechnik, de vde Verlag GMBH, Berlin, vol. 50, No. 3, Mar. 1, 1996, pp. 84-89, XP 000581417, ISSN: 0015-0142 (Translation, pp. 1-9).
Hitachi Consumer Electronics Co., Ltd., Certification of market introduction in 1993 of Hitachi Projection TV Model 55EX7K, 1 page.
Hitachi Projection Color TV Operating Guide, for Models 55EX7K, 50EX6K, 50ES1 B-K, and 46EX3B-4K, undated, 38 pages.
Hitachi Service Manual, No. 0021, Projection Color Television, Models 55EX7K, 50EX6K, 50ES1 B-K, 46EX3B-4K, and 46EX3BS-4KS, Aug. 1993, 1 page.
Hoarty, W. Leo, "Multimedia on Cable Television Systems," Symposium Record Table TV Sessions, 18th International Television Symposium and Technical Exhibition, Montreux, Switzerland, Jun. 10, 1993, pp. 555-567.
Hobbes Internet Timeline, Mar. 22, 2007, 17 pages.
Hodge, W. et al., Video on demand: Architecture, Systems, and Applications, Selected Papers from the SMPTE Advanced Television and Electronic Imaging Conference, Feb. 4, 1994, pp. 120-132.
Hofmann et al, "Videotext Programmiert Videorecorder," Rundfunktechnische Mitteilungen, Nov.-Dec. 1982, pp. 254-257 (translation attached).
Hofmann, J., "The Consumer Electronic Bus: An Integrated Multi-Media LAN for the Home," International Journal of Digital and Analog Communication Systems, vol. 4, No. 2, 1991, pp. 77-86.
Holland, "NAPLPS standard defines graphics and text communications," EDN, Jan. 10, 1985, at 179.
Honey, is there anything good on the remote tonight? advertisement from Multichannel News, Broadband Week Section, p. 168, Nov. 30, 1998.
Hong, et al. "A Networking Architecture for Mobility Services Using Mobile Agent Approach" Proceedings of the TINA '97—Global Convergence of Telecommunications and Distributed Object Computing 0-8186-8335-x/97, 1997 IEEE, 11 pages.
How Evolve Works, from the Internet at http://www.evolveproducts.com/network.html, printed on Dec. 28, 1998, 1 page.
Hua et al. "An adaptive hybrid technique for video multicast," Proceedings of the International Converence on Computer Communications and Networks, Lafayette, USA, Oct. 12, 1998, pp. 227-234, XP010587052.
IBM Corporation "IBM VideoCharger for AIX Version 2.0"Streaming the power of video to your desktop, pp. 1-5 Visit the IBM VideoCharger Website at: www.software.ibm.com/data/videocharger/, undated, 5 pages.
IBM Corporation, "IBM Video Charger Server", 2 pages, Jun. 1998.
IBM Technical Disclosure Bulletin, vol. 33, No. 3B, published Aug. 1990, 3 pages.
IEEE 1990 International Conference on Consumer Electronics Digest of Technical Papers, Table of Contents, Jun. 6-8, 1990, 14 pages.
Iizuka, Honbashi, Kuwana, Building Internet TV Guide Service 1 and 2, the 53rd National Conference Proceedings, Japan, Information Processing Society of Japan, Sep. 6, 1996 p. 3-227 to 230.
Ikejiri, Minoru et al., "Maruchimedia wo riido suru apurikeishon kaihatu," ("Application Development for Leading Multimedia"), Journal of NTT Technologies, Japan, The Telecommunications Association of Japan, vol. 7, No. 9, Sep. 1, 1995, pp. 48-55. (Concise Explanation included in IDS letter.).
Imke, S., Interactive Video Management and Production, Educational Technology Publications, May 1991, http://www.amazon.com/Interactive-Video-Management-Production-Steven/dp/0877782334/ref=sr_1_1?ie=UTF8&qid=1416426739&sr=8-1&keywords=interactive+video+management+and+production&pebp=1416426742553, 2 pages.
Indiana Gazette, Published Feb. 16, 1991, Showing Uniden is on the Market with Included Price, 2 pages.
Inouye et al., "System Support for Mobile Multimedia Applications", Proc. of the 7th Intl. Workshop on Network and Operating System Support for Digital Audio and Video, 1997, pp. 143-154.
Instruction Manual Using StarSight 2, StarSight Telecast, Inc., 1994, 27 pages.
Instructional Manual, "Sonic The Hedgehog," Sega of America, 1992, 11 pages.
Irven, "Multi-Media Information Services: A Laboratory Study," IEEE Communications Maqazine, vol. 26, No. 6, Jun. 1988, pp. 27-33 and 36-44.
Ishii, Hiroshi et al, "Clearface: Translucent Multiuser Interface for TeamWorkStation," ECSCW, Sep. 1991, pp. 6-10.
Ishii, Hiroshi et al, "Toward an Open Shared Workspace: Computer and Video Fusion Approach of Team Workstation," Communications of the ACM, Dec. 1991, vol. 34 No. 12, pp. 37-50.
Isobe, T. et al., Interactivity in broadcasting and its Application to ISDB Service, IEEE Transactions on Broadcasting, vol. 42:3 (Sep. 1996), pp. 179-185.
Jaidev, "XSLT—A Wired and Wireless Case Study," http://csharpcomputing.com/XMLTutorial/Lesson15.htm, 6 pages, printred Oct. 14, 2005.
James, A., "Oracle—Broadcasting the Written Word," Wireless World, Jul. 1973, vol. 79, No. 1453, pp. 314-316.

(56) References Cited

OTHER PUBLICATIONS

JiniTM Architecture Overview, by Jim Waldo, from the Internet at http://Java.sun.com/products/jini/whitepapers/architectureoverview.pdf/ printed on Jan. 25, 1999. The document bears a copyright date of 1998, 18 pages.
Judice, C.N., "Move Over Cable, Here Comes Video Via Voice Lines," *Network World*, Sep. 1986, p. 26.
JVC Service Manual, 27 Color Monitor-Receiver, Model AV-2771S (U.S.), Jul. 1991, 89 pages.
Kai et al., Development of a Simulation System for Integrated Services Television, Report from Information Processing Society of Japan, Japan, Sep. 13, 1996, vol. 96, No. 90 p. 13-20.
Karon, P., "Replay to Bow, Instant VCR", Daily Variety, Sep. 8, 1998, 2 pages.
Karstad, K., "Microprocessor Control for Color-TV Receivers," IEEE Transactions on Consumer Electronics, vol. CE-26, May 1980, pp. 149-155.
Karunanithi et al., "A Feature-Based Neural Network Movie Selection Approach," Proc. Intl. Workshop on Applications of Neural Networks to Telecommunications, Stockholm, Sweden, May 22-24, 1995, pp. 162-169.
Katkere et al., "Interactive Video on WWW: Beyond VCR-like Interfaces," Computer Networks and ISDN Systems, vol. 28, Issue 11, 1996, pp. 1559-1572.
Katsuhiro Ochiai (Random TV: Next-generation TV program watching system with random access media), Information Processing Society of Japan, 56th National Conference Proceedings (3) (1998, first part) Mar. 17, 1998 3-302 to 303 (English translation attached).
Kembery, Network based video storage for retrieval over the ISDN, International Conference on Storage and Recording Systems, Apr. 5-7, 1994, pp. 124-128.
Khoo et al., "An Expert System Approach to Online Catalog Subject Searching," Information Processing & Management: An International Journal, vol. 30, No. 2, 1994, pp. 223-238.
Komarinski, Mark, Anonymous FTP p. 1, May 1, 1995 Linux Journal, entire document.
Komarinski, Mark, Anonymous FTP p. 2, May 1, 1995 Linux Journal, entire document.
Kornhaas, W., "Von der Textprogrammierung uber TOP zum Archivsystem," *Radio Fernsehen Elektronik*, vol. 40, No. 8, Aug. 30, 1991, pp. 465-468, XP 000240875 Veb Verlag Technik. Berlin, DE ISSN: 1436-1574.
Large, "Throw away the books—Viewdata's coming," Guardian, Jan. 10, 1978. 1 page.
Large, "Viewdata, the invention that brings boundless advice and information to the home, also sets a test for the Post Office," Financial Guardian, Jun. 29, 1978, 3 pages.
Larsson, L. C., Creating a Serials Database in Access: A Primer for Resource Center Managers, Jun. 23, 1998, accessed Dec. 23, 2011 at http://faculty.washington.edu/larsson/conf/aiha98/primer/reports.htm., 22 pages.
Leftwich, Jim & Schein, Steve, StarSight Interactive Television Program Guide, Phase III, Functional/Interactional Architecture Specification Document, Orbit Interaction, Palo Alto, California, undated, 36 pages.
Leftwich, Jim, Lai, Willy & Schein, Steve, StarSight Interactive Television Program Guide, Phase IV, Functional/Interactional Architecture Specification Document, Orbit Interaction, Palo Alto, California, published before Apr. 19, 1995, 88 pages.
Li, et al., "Distributed Multimedia Systems," Proceedings of the IEEE, vol. 85, No. 7, pp. 1063-1108 (Jul. 1997).
Li, W. et al., Vision: A Digital Library, Proceedings of the ACM Conference on Digital Libraries, Mar. 20-23, 1996, pp. 19-27.
Limongiello, et al. An Experimental Open Architecture to Support Multimedia Services based on CORBA, Java and WWW Technologies, TELECOM Italia Headquarters, Springer Berlin Heidelberg, 1997. 69-75. pp. 69-75.
Listing of computer code for operating system within the Cable Computer in 1985 (Plaintiff's Exhibit 298), undated, 97 pages.
Listing of computer code for Video HTU Program (Plaintiff's Exhibit 299), undated, 1 page.
Lists> What's on Tonite TV Listings Internet Article, [Online], Jan. 28, 1995, XP002378869 Retrieved from the Internet: URL: www.scout.wisc.edu/Projects/PastProjects/NH/95-01-31/0018.html> [retrieved on Apr. 28, 2006] *the whole document*.
Little et al., "Prospects for Interactive Video-on-Demand," IEEE Multimedia, Fall 1994, pp. 14-24.
Lloyd, "Impact of technology," Financial Times, Jul. 1978, 2 pages.
Loen et al., "Subscriber Terminal Units for Video Dial Tone Systems," IEEE Network, Sep./Oct. 1995, pp. 48-57.
Louth Automation website (www.louth.com) dated Aug. 1997, 6 pages.
Lowenstein, R.L. and Aller, H.E., "The Inevitable March of Videotex," *Technology Review*, vol. 88, Oct. 1985, p. 22.
Lynch's timeline of net related terms and concepts, Mar. 22, 2007, 8 pages.
M-A-COM, Inc., "Videocipher II Satellite Descrambler Owner's Manual," dated Prior Feb. 1986, pp. 1-17.
Mah et al., "Providing Network Video Service to Mobile Clients," 1993 IEEE, pp. 48-54.
Mannes, G., "Smart Screens: Development of Personal Navigation Systems for TV Viewers," Video Magazine, Dec. 1993, 6 pages.
Manual for Internet Explorer 4—Chapter 9—Browser Features and Functionality, Jan. 10, 2008, 34 pages.
Mar. 19, 1985 letter from G. Knapp of CableData to R. Hansen of Weststar Communications, Inc. (Plaintiff's Exhibit 325), 6 pages.
Markowitz, A. "Companies Jump on Interactive Bandwagon," Discount Store News, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
McMurray, "Overview of Dedicated Hosting," Cloud Computing Talk, 1 page, Apr. 24, 1997; retrieved from http://noveltieshere.com/overview-of-dedicated-hosting, Sep. 16, 2014, 1 page.
McNab, R. et al., "A Distributed Digital Library Architecture Incorporating Different Index Styles," IEEE International Forum on Research and Technology Advances in Digital Libraries, Apr. 22-24, 8 pages (1998).
Melton, "The Uniden Super 4800," OnSat magazine, Jun. 10-Jun. 16, 1990, pp. 2-4.
Merrell, R.G., "Tac Timer," 1986 NCTA Technical Papers, pp. 203-206.
Miller, M.D., "A Scenario for the Deployment of Interactive Multimedia Cable Television Systems in the United States in the 1990s," IEEE, vol. 82:(4) 1994, 5 pages.
Model D9500 Switched Digital Video (SDV) Server, Scientific Atlanta, Apr. 2006. [http://www.cisco.com/en/US/prod/collateral/video/ps9159/ps9195/ps9258/product_data_sheet0900aecd806cec4a.pdf], 2 pages.
Money, "Teletext and Viewdata," Butterworth & Co. Ltd., London, 1979, 159 pages.
Mosley, "NAPLPS chip sets, though scarce, satisfy limited US videotex demand," EDN, Mar. 21, 1985, at 57.
Moss, L., 500 Channels Awe Advertisers, Multichannel News, p. 1A (Apr. 19, 1993), 4 pages.
Motorola, Inc.; Integrated Datacasting Solutions for Digital Television XP-002204351; Jun. 1999, 13 pages.
Network World, "NetWare users get audited," 11(17), 2 pages (Apr. 25, 1994).
Neue, Digitale Strategien Bericht Von Den 5. Dermastaedter Fernsehtagen, FKT Fernseh Und Kinotechnik, vol. 49, No. 3, Mar. 1, 1995, pp. 135-139, XP000507348, Fachverlag Schiele & Schon GMBH., Berlin, DE ISSN: 140-9947.
Neumann, Andreas, "WDR Online Aufbau Und Perspektiven Automatisierter Online-Dienste Im WDR," Rundfunktechnische Mitteilungen, vol. 41, pp. 56-66, Jun. 1997.
Nguyen, Jim & Ran, Oz, "Evolving Switched Broadcast Beyond First Generation Deployments," BigBandNet.com, SCTE Cable-Tec Expo Conference Presentation, 2006. [http://www.bigbandnet.com/index.php/tech_whitepaper_evolve.html], 12 pages.
Norton Backup, Version 1.0, User's Guide and reference, published in 1990 (chapters 3 and 4), 18 pages.

(56) References Cited

OTHER PUBLICATIONS

O'Brien, Jr., T.E., "Physical and Media Specifications of the CXBus," IEEE Transactions on Consumer Electronics, vol. 37, No. 3, Aug. 1991, pp. 357-366.
Ochiai et al., "@randomTV: A New TV System," NEC C&C Media Research Laboratories, Mar. 17, 1998, pp. 3-302-3-303.
Ohyama et al., Teletext System, National Technical Report, vol. 27, No. 4, Aug. 1981 (includes English Translation), 91 pages.
Okimi, Katsuya et al., "Shinban ISDN," ("New ISDN Edition"), Japan, Ohmsha, Ltd., First Edition, Oct. 5, 1995, pp. 261-285.
Open TV fur interaktives Fernsehen, Trend and Technik, 9-95 RFE, p. 100. (English language translation attached).
Owen, "How dial-a-fact is coming closer to home," The Times, Sep. 30, 1977, 2 pages.
Owen, "Why the Post Office is so excited by its plans for a TV screen information service," The Times, Sep. 26, 1976, 4 pages.
Paryzek, Chip & Adams, Michael, "Raising the Bar on SDV," CedMagazine.com, Oct. 1, 2006. [http://www.cedmagazine.com/raising-the-bar-on-sdv.aspx], 5 pages.
Peddicord, Ross, "New on TV: You Bet Your Horse," The Sun, Baltimore Maryland Dec. 15, 1994, 1 pg.
Periodical RFE, vol. 9'95, p. 100: Trend and Technology Open TV for Interactive Television; 4 pages.
Personal Entertainment Guide-User's Guide, Version 1.0, Copyright 1991 by Lookahead Communications Inc., 82 pages.
Pfister, Larry T., "Teletext: Its Time Has Come," Prepared for the IGC Videotext—Teletext Conference, Andover, Massachusetts, Dec. 14, 1982, pp. 1-11.
Pohlman, House Calls, Video Magazine, vol. 20:6 (Oct. 1996), 2 pages.
Poole, "Demand for Viewdata grows," Sunday Times, Feb. 10, 1977, 3 pages.
Postel, J., Reynolds, J., Request for Comments: 959 File Transfer Protocol, Oct. 1985, entire document (70 pages).
PR Newswire, NextLevel Systems, Inc. and nCUBE demonstrate their integrated near-video-on-demand solution on NextLevel's advanced analog CFT 2200 platform, Dec. 10, 1997, 3 pages.
Premium Channels Publishing Company Inc., Premium channels publishing will market a weekly program guide listing pay TV, cable and broadcast offerings by daypart, Cable Television Business, Nov. 15, 1982, p. 194.
Prevue Guide Brochure, Spring 1984, 2 pages.
Prevue Guide Brochure, Spring 1994, 22 pages.
Printout from Google News Archives, Mar. 22, 2007.
Proceedings of Patent Infringement Action for European Patent Application No. 05077272.2, Jun. 12, 2009, 668 pages.
Prodigy Launches Interactive TV Listing, Apr. 22, 1994, Public Broadcasting Report, 1 page.
Program and System Information Protocol for Terrestrial Broadcast and Cable, ATSC, Dec. 23, 1997, 95 pages.
PTV Recorder Setup Guide, Philips Electronics, TiVO Inc.(2000), 68 pages.
Qayyum, "Using IVDS and VBI for Interactive Television," IEEE, Jun. 10, 1996, 11 pages.
Rajapakshe et al., "Video on demand," (last modified Jun. 1995) <http://www-dse.doc.ic.ac.uk/~nd/suprise_95 /Journal/vol4/shr/report.html>, 14 pages.
Ramachandran, "Space-Time Memory: a parallel programming abstraction for interactive multimedia applications, SIGPLAN Notices", vol. 34:8 (Aug. 1999), pp. 183-192.
Rath et al., "Set-Top Box Control Software: A Key Component in Digital Video," Philips Journal of Research, vol. 50, No. 1/2 1996, at 185.
Rayers, D.J., "Telesoftware by Teletext," *1984 IEEE Conference Papers*, vol. 240, p. 323.
Raz, Yaron, & Ronald, David, "What's Ahead for Switched Digital Video," CedMagazine.com, Dec. 1, 2006. [http://www.cedmagazine.com/Article-What-is-ahead-switched-digital-video.aspx], 2pages.
RCA Satellite Receiver User's Guide, Thomson Multimedia Inc. (2001), 80 pages.
Reaching your subscribers is a complex and costly process—until now, from the Internet at http://www.evolveproducts.com/info.html, printed on Dec. 28, 1998, 1 page.
Re-Exam Documents for 90/013,279, filed Jun. 13, 2014, U.S. Pat. No. 7,543,320, 88 pages.
Re-Exam Documents for 90/013,283, filed Jul. 2, 2014, U.S. Pat. No. 7,162,729, 94 pages.
Replay TV 5000 series manual, 2002, entire document (86 pages).
Research Disclosure, No. 329, Sep. 1991, Havant GB, p. 657, XP226205, "Installation of consumer apparatus".
Rewind, replay and unwind with new high-tech TV devices, by Lawrence J. Magid, LA Times. This document was printed from the Internet on Jun. 6, 1999 and bears a date of May 19, 1999, 4 pages.
RFC 765—File Transfer Protocol Specification, Jun. 1980, 70 pages.
Rogers, C., "Telcos vs. Cable TV: The Global View With Markets Converging and Regulatory Barriers Falling, Service Carriers Are Ready to Rumble," Data Communications, vol. 24, No. 13, pp. 75, 76, 78, and 80, Sep. 21, 1995, 8 pages.
Rohde, "Bank Breaks the Database Rules," Network World, An International Data Group Publication, vol. 11, No. 17, 2 pages, Apr. 25, 1994.
Roizen, Joseph "Teletext in the USA," Society of Motion Picture and Television Engineers Journal, Jul. 1981, pp. 602-610.
Rosch, "New data and information system set for commercial market trial," Telephony, Mar. 20, 1978, at 96.
Rovira, Luis et al., "Switched Digital Video," Cable360.net, Feb. 1, 2006. [http://www.cable360.net/technology/emergingtech/14909.html], 4 pages.
Rowe, L., et al., A Continuous Media Player, Proc. 3rd Int. Workshop on Network and OS Support for Digital Audio and Video (Nov. 1992), 11 pages.
Rudnick, U.S. Appl. No. 09/283,681, filed Apr. 1, 1999, entitled Interactive Television Program Guide System Having Graphic Arrangements of Program Event Regions (35 pages).
Ruffler et al., "InfoRadio on Demand, WebTV and digiTaz—Telecommerce Case Studies," 3rd International Workshop on Community Networking, May 23-24, 1996, 8 pages.
Rumbaugh, "Controlling Propagation of Operations using Attributes on Relations," 3rd Annual Conference on Object-Oriented Programming Systems, Languages, and Applications (OOPSLA 88), San Diego, CA, pp. 285-296, Sep. 25-30, 1988.
Ryan, "Interactive TV Takes a Corporate Twist," Electronic Engineering Times, Jul. 10, 1995, 3 pages.
Ryan, K., "Free Interactive TV Guide," Google Newsgroup, Alleged Date Sep. 29, 1995, 1 page.
Saito, Takeshi, et al., "Homenetwork Architecture Considering Digital Home Appliance," Technical Committee meeting of The Institute of Electronics, Information and Communication Engineers (IEICE), Japan, Nov. 6, 1997, vol. 97, No. 368, p. 57-64. (English translation attached).
Sandringham, St. John "Dress rehearsal for the PRESTEL show," New Scientist, Jun. 1, 1978, at 586.
Sandsta et al., "Design and Implementation of the Elvira Video Server," Norwegian Computer Science Conference NIK'96 (Norsk Informatikkonferanse), 1996, pp. 259-270.
Sanyo Technical Report, No. 44, vol. 22, No. 1, Feb. 1990, 10 pages.
Savage, "Internet's 'What's on Tonite!' Tells You Just That and More," The News, InfoWatch, May 29, 1995, 1 page.
Schauer: Internet Article, [Online] Sep. 28, 1995 (Sep. 28, 1995), XP002378870, Retrieved from the Internet: URL: www.vision2020.moscow.com/Archives/1995/9509/0058.htlm> [retrieved on Apr. 28, 2006] *the whole document* (1 page).
Schepp, Brad et al., "The Complete Guide to CompuServe," Chapter 7, "Iquest and General Information Gathering," pp. 211-258, (McGraw-Hill Osborne Media, Har/Dis edition 1990).
Schlender, B.R., "Couch Potatoes! Now It's Smart TV," *Fortune*, Nov. 20, 1989, pp. 111-116.
Schmuckler, Eric, "A marriage that's made in cyberspace (television networks pursue links with online information services)," May 16, 1994, Mediaweek, v4, n20, p. 22 (3), 5 pages.
Scully S., Digital Librarian Could Prove PPV Boon, Broadcasting & Cable, Jun. 7, 1993, p. 97.

(56) References Cited

OTHER PUBLICATIONS

Scully, "Turner backs violence guidelines," HighBeam Research, Broadcasting & Cable (1993), 2 pages.
Scully, S., For some, interactive future is now, Broadcast & Cable, Jun. 1993, pp. 77-78.
Sealfon, Peggy, "High Tech TV," Photographic, Dec. 1984, 2 pages.
Selected pages from the "BBC Online—Schedules" web page. This web page is located at http://www.bbc.co.uk/schedules/ (as printed from the Internet on Oct. 19, 1999 and being dated as early as May 24, 1997), 6 pages.
Sharpless et al., "An advanced home terminal for interactive data communication," Conf. Rec. Int. Conf. Commun. ICC '77, IEEE, Jun. 12-15, 1977, at 19.6-47.
Sheth, A., C. Bertram and K. Shah (1999). "VideoAnywhere: A system for Searching and Managing Distrbuted Video Assets." SIGMOD Record 28(1): 104-109, 6 pages.
Singru et al., "Framework for Interactive Video-on-Demand Service", Proc. of the IEEE 14th Annual Intl. Phoenix Conf. on Computer and Communications, 1995, pp. 636-642.
Sistla et al., "Temporal Triggers in Active Databases," IEEE Transactions on Knowledge and Data Engineering, vol. 7, No. 3, Jun. 1995, 16 pages.
Smith et al., "Transcoding Internet Content for Heterogeneous Client Devices", Proc. IEEE Int. Conf. on Circuits and Syst. (ISCAS), May 1998, pp. 599-602.
Smith, John R., "Digital Video Libraries and the Internet", IEEE Communications Magazine, 1999, vol. 37, pp. 92-97.
SONICblue Incorporated: ReplayTV 4000 User Guide 12.17 , Chapter Five: Networking, Sep. 10, 2001; retrieved from the internet: http://www.digitalnetworksna.com/support/replayty/dowloads/ReplayTV4000UserGuide.12.17.pdf, 13 pages.
Sony Digital Satellite Receiver Operating Instructions, SATA1, 92 pages (1995).
Sony Digital Satellite System DirecTV, USSB (May 1995), 6 pages.
Sony SLV-760IIF et al. operating instructions (Sony 2") , published in 1995, 68 pages.
Sorce et al., "Designing a Broadband Residential Entertainment Service: A Case Study," GTE Laboratories Incorporated, undated, pp. 141-148.
Spangler, Todd, "How Time Warner Austin Did Switched Digital," Multichannel News, Jun. 21, 2007. [http://www.multichannel.com/article/CA6454447.html] (2 pages).
Start Here, Sony, TiVo and DIRECTV (undated), 8 pages.
Startup puts MPEG-2 encoder in fast forward, EE Times (undated), 3 pages.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ", 2 pages.
Stickland, "It's a common noun," The Economist, Jun. 5, 1978, 1 page.
Stokes, "The viewdata age: Power to the People," Computing Weekly, Jan. 1979.
Submission by Velocity in European patent No. 1099341 (Mar. 19, 2010) (6 pages).
Sun's Next Steps in Digital Set-Tops, article in Cablevision, p. 56, Nov. 16, 1998, 1 page.
Sunada, K. et al, "Teletext Color Television Receiver Model C-29M950, C26M940," NEG Home Electronics, NEG Giho, 1987, 16 pages.
SuperGuide/Uniden 4800, "A Quick Guide to Programming the Uniden 4800—Dealer Set-Up Manual," undated, 8 pages.
SuperGuide/Uniden 4800, "A User's Guide to SuperGuide's™ Features," undated, 12 pages.
Sussman, A. "GTE Tunes in to Home TV Shopping," PC Week, Jun. 28, 1988, p. C15. (IDS Feb. 6, 2014.
Tech Notes: Product Updates from M-A-COM Cable Home Group, "Videocipher Owner's Manual Update," Issue No. 6, Feb. 1986, 19 pages.
Technical White Paper, "Open TV™ Operating Environment," (© 1998 OpenTV Inc.), pp. 1-12.
Tedesco, R., "WebTV Clicks on 'TV Guide'," Broadcasting & Cable, vol. 127, No. 3, Jan. 20, 1997, p. 56.
Tedesco, R., Thomson to produce RCA NC box for NetChannel, Broadcasting & Cable, 127:30, Jul. 21, 1997, p. 100.
Tedesco, R., TV-'Net vendors resist the marketing Web, Broadcasting & Cable, 127:21 (May 19, 1997), p. 55.
Teletext presents the alternative view, Financial Times, Oct. 24, 1977, 2 pages.
Teraoka et al., "Host Migration Transparency in IP networks: The VIP Approach" ACM SIGCOMM—Computer Communication Review, ACM Press, New York, NY, USA, Jan. 1993, pp. 45-65.
The clickTV television program guide website of TVData of Queensbury, New York. This website is located at www.clicktv.com (as printed from the Internet on Aug. 13, 1997/Sep. 1, 1998), 5 pages.
The Evolve EZ Guide. The Remote Control, from the Internet at http://www.evolveproducts.com/display2.html, printed on Dec. 28, 1998, 1 page.
The InfoBeat television program guide website of InfoBeat, Inc. This website is located at www.infobeat.com (as printed from the Internet on Dec. 8, 1997), 46 pages.
The New York Times Website Article, "2 Makers Plan Introductions of Digital VCR", by John Markoff, Mar. 29, 1999. (2 pages).
The television program guide website of Gist Communications, Inc. of New York, New York. This website is located at www.gist.com (as printed from the Internet on Aug. 14, 1997), 133 pages.
The television program guide website of TV Guide Entertainment Network. This website is located at www.tvguide.com (as printed from the Internet on Aug. 14-18, 1997), 139 pages.
Thibadeau, "The Question of Standard for Digital Interactive Television," Research Paper, 19 pages (Nov. 1993).
Third Party Submission Under 37 CFR 1.290 filed Jul. 31, 2013, U.S. Appl. No. 13/181,915 Concise Description of Relevance, (30 pages).
Thomas, "Electronic Program Guide Applications—The Basics of System Design," NCTA Technical Papers, 1994, pp. 15-20.
Three men on a Viewdata bike, The Economist, Mar. 25, 1978, 2 pages.
Time Warner Signs Tulsa Firm to Provide Cable Program Guide, Journal Record, May 25, 1994, 2 pages.
Tolenkin, D., "Determining Navigation Needs," Telemedia Week, undated, 1 page.
*Transcript of the Deposition of John Roop*, Oct. 1996, pp. 186-187.
Tsao, S. and Y. Huang, An Efficient Storage in Near Video-on-Demand Systems, IEEE Transactions on Consumer Electronics, vol. 44:1 (Feb. 1998), p. 27-32.
Tsao, S., et al., A Novel Data Placement Scheme on Optical Discs for Near-VOD Servers, Interactive Distributed Multimedia Systems and Telecommunications Services Lecture Notes in Computer Science, vol. 1309 (1997), pp. 133-142.
TV Guide Magazine dated Feb. 4-10, 1989 (excerpts), 4 pages.
TV Guide movie database Internet web pages printed on Aug. 12, 1999 (9 pages).
TV Guide on Screen Prior Use Transcript of Proceedings, "Violence on Television," House of Representatives, Committee on Energy and Commerce, Subcommittee on Telecommunications and Finance, Jun. 25, 1993, 36 pages.
TV Guide Online Set for Fall, Entertainment Marketing Letter, Aug. 1994, 1 page.
Ueda, Hirotada et al, "Impact: An Interactive Natural-Motion-Picture Dedicated Multi-Media Authoring System," Communications of the ACM, Mar. 1991, pp. 343-350.
Uniden®, UST-4800 Super, Integrated Receiver/Descrambler, Preliminary Reference Manual, Nov. 12, 1991, 80 pages.
Uniden®, UST-4800, Integrated Receiver/Descrambler, Installation Guide, copyright 1990, 60 pages.
Uniden®, UST-4800, Integrated Receiver/Descrambler, Operating Guide, copyright 1990, 24 pages.

(56) References Cited

OTHER PUBLICATIONS

United Media Enterprises, United Media Enterprises (New York, NY) affiliate 'TV Watch/DIP' now provides a monthly satellite print guide with schedules for all satellite and pay services, Satellite News, Dec. 24, 1980, p. 7.
User's Guide RCA Color TV with TV Plus + Guide, 1997, 88 pages.
Using StarSight 2, published before Apr. 19, 1995, 29 pages.
UVSG Offers System-Specific Web Site Development for OPS, press release of United Video Satellite Group, Apr. 12, 1996, 2 pages.
UVSG Teams With Microsoft on Internet Information Server, press release of United Video Satellite Group, Feb. 22, 1996, 2 pages.
Various publications of Insight Telecast, 1992 and 1993, 10 pages.
Veith, R.H., "Television's Teletext," Elsevier Science Publishing Co., Inc, 1983, pp. 13-20,41-51.
Venditto, G., Prodigy for Dummies, IDG Books, pp. 57-63, 213 (1995).
Verknuepfung von TV mit INternet, Funkschau, De, Franzis—Verlag K.G. Munchen, vol. 68, No. 18 Aug. 16, 1996, pp. 70-71, XP 000631189, ISSN: 0016-2841 (Translation, pp. 1-3).
Verma, D., "Content Distribution Networks—An Engineering Approach", p. 24-49, 2002 (16 pages).
Videocipher Stipulation, May 1996, 5 pages.
VideoGuide, Videoguide User's Manual, 1995, pp. 1-28.
Viewdata and its potential impact in the USA: Final Report/vol. One, The UK Experience, Link and Butler Cox & Partners Limited, Oct. 1978, 129 pages.
Viewdata moves in US but GEC may lose out, Computing Weekly, Jan. 25, 1978, 1 page.
Viewdata Service Terminal Specification, British Post Office, Issue 5, Aug. 1978, 57 pages.
VPS weiterentwickelt: Service Uber Videotext, Funkschau Recorder-Programmierung, Nov. 1986, pp. 40-43 with English translation.
Web TV and Its Consumer Electronics Licenses debut First Internet Television Network and Set Top Box, Jul. 10, 1996 <http:// www.ohlfs.com/keith/self/webtv/home/HTML/home.license.html>, 6 pages.
Wedlund, Elin and Henning Schulzrinne, Mobility Support using SIP, § 4, ACM, copyright ACM Aug. 1999, 7 pages.
Whale, "Identification of Program Similarity in Large Populations," The Computer Journal, vol. 33, No. 2, 1990, pp. 140-146.
What is Jini?, from the Internet at http://java.sun.com/products/jini/whitepapers/whatsjini.pdf, printed on Jan. 25, 1999, 4 pages.
Whitehorn, "Viewdata and you," Observer, Jul. 30, 1978, 1 page.
Why Jini Now?, from the internet at http://java.sun.com/products/jini/whitepapers/whyjininow.pdf, printed on Jan. 25, 1999. The document bears a copyright date of 1998, 16 pages.
Willcox, "WebTV Hardware Suppliers Set Complete Related Roster," Twice, Sep. 29, 1997, at p. 34.
Williams, David M., and Perry, Burt, "Rich Online Services as the Archetype for Interactive TV," Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.
Wilson, Programme delivery control for simplified home video recording, IEEE Transactions on Consumer Electronics, vol. 37:4 (Nov. 1991), pp. 737-745.
Windows 98 Feature Combines TV, Terminal and the Internet,New York Times, Aug. 18, 1998, 1 page.
Wittig, H. et al., "Intelligent Media Agents in Interactive Television Systems," Proceedings of the International Conference on Multimedia Computing and Systems, Los Alamitos, CA, US, May 15, 1995 (May 15, 1995),—May 18, 1995, (May 18, 1995) pp. 182-189, XP00603484 p. 183, left hand column, paragraph 2, p. 184, right-hand column, paragraph 2 figure 4.
Wolfe, Alexander, "Beyond the SIPC," Electronic Engineering Times, No. 910, Jul. 15, 1996, p. 41, Abstract (2 pages).
Wolfe, Alexander, "Microsoft Poses PC Specs.," Electronic Engineering Times, Jul. 8, 1996, Abstract (2 pages).
Yarrow, "The Media Business; Pay-Per-View Television is Ready for Takeoff," The New York Times, Archives, Nov. 14, 1988, 3 pages.
Yoshiaki, Kurata; Syun no Video Kyoyu Site wo Tettei Koryaku Mezase! YourTube Expert (Thorough Analysis of Video Sharing Site in Trend), MacPeople, ASCII, Oct. 1, 2006, vol. 12, No. 10, pp. 201-207. Translation not available. (Concise Explanation included in IDS letter.).
Yoshida, "Interactive TV a Blur," Electronic Engineering Times, Jan. 30, 1995, 2 pages.
Youtube Website, "YouTube Homepage, Categories browsing", pp. 1-4, (Aug. 26, 2006) http://web.archive.org/web/20060826163534/youtube.com/index>.
Zahariadis et al., "Interactive Multimedia Services to Residential Users," IEEE Communications Magazine, 1997, vol. 35, pp. 61-68.

* cited by examiner

REDUCING UNICAST SESSION DURATION WITH RESTART TV

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED U.S. APPLICATION DATA*

*This application is a reissue application of U.S. Pat. No. 10,063,934, which issued based upon U.S. patent application Ser. No. 12/277,797, which is hereby incorporated by reference herein in its entirety.*

BACKGROUND

Television viewing and recording technology has been continually advancing, with hundreds of channels, digital video recorders (DVRs), and video-on-demand programs finding their way into many homes. Despite such advances, problems still remain. One such problem is that although some systems may allow different users to begin watching the same program at different times, this can result in situations where many dedicated sessions are established between a program server and each of multiple individual users' systems for the same program. This can thus result in increased resource requirements and costs for servers and other components, and thus the overall cost of the television viewing system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first portion of programming aired prior to a first time is obtained via a unicast session with a server. The first portion includes previously aired programming. A switch is made, after programming data received via the unicast session catches up to a multicast broadcast of the programming, to obtaining a remaining portion of the programming from a different source other than the server.

In accordance with one or more aspects, a first portion of programming aired prior to a first time is sent to a consumer device via a unicast session with the consumer device. The first portion of programming includes previously aired programming. The unicast session is terminated after programming data sent to the consumer device via the unicast session catches up to a multicast broadcast of the programming.

BRIEF DESCRIPTION OF THE DRAWINGS

The same numbers are used throughout the drawings to reference like features.

DETAILED DESCRIPTION

Reducing unicast session duration with restart TV is discussed herein. In accordance with one or more embodiments, when a user requests to have audio/video programming played back that is already being aired, the programming is transmitted to the user's device via a combination of a unicast session and a multicast broadcast. A first portion of the programming, including a portion that was broadcast prior to the user's request, is obtained by the user's device via a unicast session with a server maintaining a copy of the programming. Concurrently, the remaining portion of the programming can optionally be recorded by the user's device via the multicast broadcast. Once the data sent to the user's device via the unicast session catches up to the data in the program being currently multicast broadcast, the unicast session is terminated. The remainder of the programming can then be played back at the user's device from another source, such as from the recording on the user's device, or from the multicast broadcast.

Figure 1:
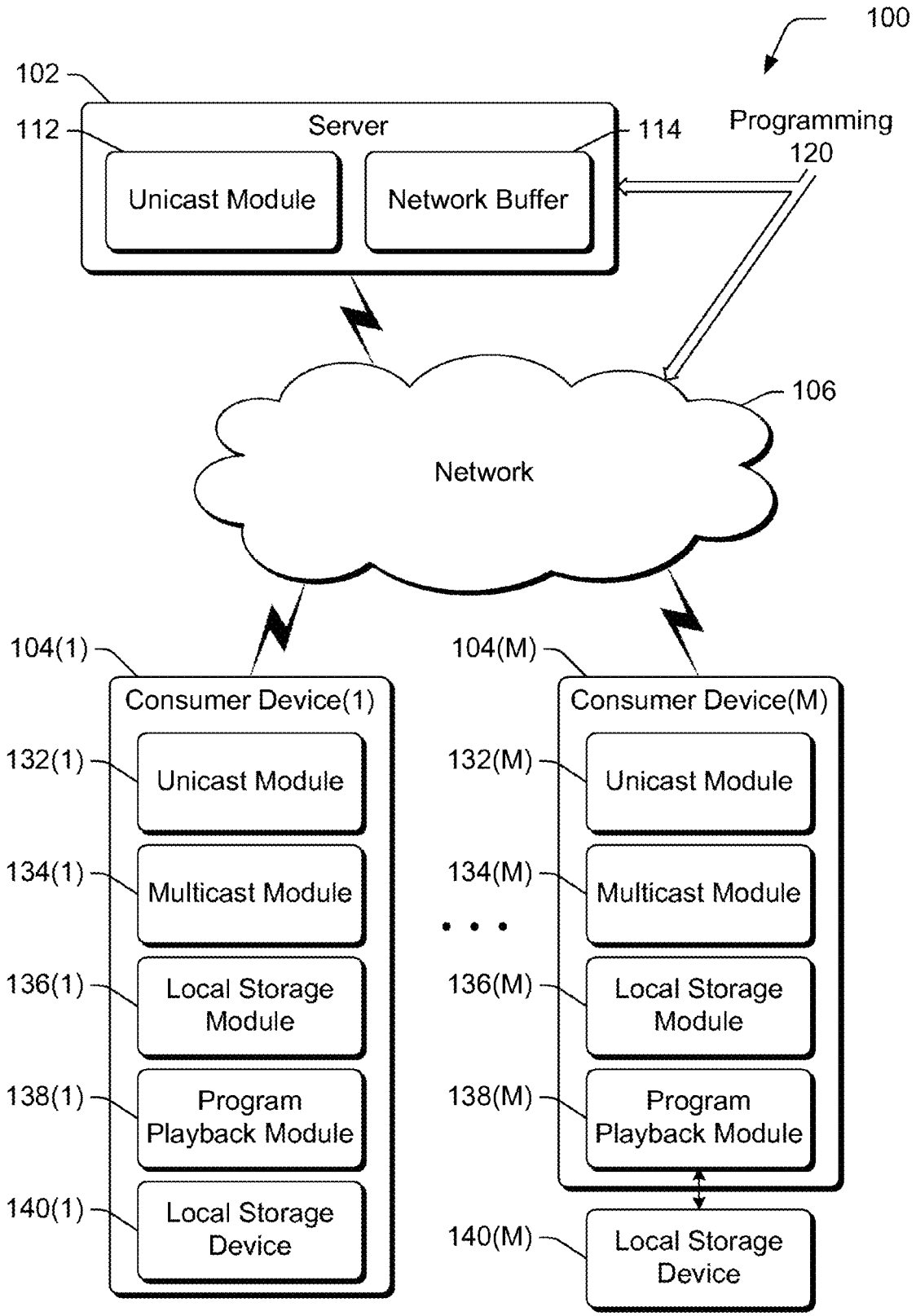
FIG. 1 illustrates an example system implementing the reducing unicast session duration with restart TV in accordance with one or more embodiments.

FIG. 1 illustrates an example system 100 implementing the reducing unicast session duration with restart TV in accordance with one or more embodiments. System 100 includes a server 102 that can communicate with one or more (M) consumer devices 104(1-M) via a network 106. Network 106 can be a variety of different networks, including the Internet, a local area network (LAN), a cellular or other wireless phone network, a public telephone network, an intranet, other public and/or proprietary networks, combinations thereof, and so forth. In one or more embodiments network 106 is implemented to include an Internet Protocol (IP)-based network that facilitates programming content distribution and data communication between the server 102 and any number of consumer devices 104. An IP-based network is a network that supports communication among devices using IP, such as IP version 4 (IPv4, such as discussed in IETF RFC 791), as well as other versions such as IP version 6 (IPv6).

Server 102 includes a unicast module 112 and a network buffer 114. Although server 102 is illustrated as including both module 112 and buffer 114, alternatively module 112 and buffer 114 can be implemented in different servers. Server 102 can be implemented as one or more computing devices. Additionally, although a single server 102 is illustrated in FIG. 1, alternatively multiple servers can communicate with consumer devices 104 via network 106.

Generally, server 102 receives programming 120 in the form of a multicast broadcast from one or more sources as the programming is aired by the source(s). Server 102 stores the aired programming as programming data in network buffer 114. This programming data stored in buffer 114 is then made accessible to consumer devices 104 after (and during) airing of the programming so that the programming can be obtained and played back (and/or stored) by consumer devices 104. This allows a user of a device 104 to request playback of a particular program after the program has begun airing, and have the portion of the program that has already aired transferred to the device 104 from network buffer 114. This functionality allowing playback of a program that has already begun airing is also referred to as restart TV, as it allows a user to restart playback of particular programming from the beginning of the programming (e.g., restart playback of a particular television program from the beginning of the television program).

Programming 120 can also be distributed directly to consumer devices 104 via network 106. Programming 120 is typically a multicast broadcast of programming data. A multicast broadcast refers to the transmission of programming in a one-to-many configuration, where one source can broadcast the same data to multiple recipients concurrently. Different channels carrying different programming are typically multicast broadcast by one or more sources, and individual consumer devices 104 can tune to particular channels in order to obtain the programming being broadcast on the tuned-to channel.

Programming 120 includes audio and/or video programs from one or more sources, such as a satellite operator, a network television operator, a cable operator, and so forth. Programming 120 can be received from the sources via a variety of different transmission media, such as satellite transmission, radio frequency transmission, cable transmission, and so forth. Optionally, a content distributor (not shown in FIG. 1) receives programming 120 from the various sources and converts programming 120 into an appropriate format for a multicast broadcast via network 106. Alternatively, one or more sources can directly broadcast programming 120 via network 106 without using such a content distributor. The airing or broadcasting of programming refers to the transmitting of the programming by a source via any transmission media.

Programming 120 can include a variety of different television programs having a variety of different lengths, such as television sitcoms, news broadcasts, documentaries, cartoon shows, movies, and so forth. These programs can optionally include advertisements as well. Any program that can be aired by a source can be included as a program of programming 120.

Programming 120 is stored in network buffer 114. In one or more embodiments, all programs received as programming 120 by server 102 are stored in network buffer 114 at least temporarily. Alternatively, server 102 can optionally impose one or more filters to restrict which programs are stored in network buffer 114. Network buffer 114 stores programs at least temporarily, and the duration of this temporary storage can vary. For example, the duration can be 4 hours, 48 hours, 72 hours, 1 week, and so forth. It is to be appreciated that the exact duration of this temporary storage can vary by implementation and based on the desires of an operator of server 102.

Unicast module 112 manages unicast sessions between consumer devices 104 via which programming stored in network buffer 114 can be sent. A unicast session refers to a one-to-one configuration in which a dedicated communication session between server 102 and one consumer device 104 is established. Programming data from network buffer 114 can be sent to the one consumer device 104 via this dedicated communication session, but no other consumer device receives the programming data via this dedicated communication session. Unicast module 112 can typically manage multiple unicast sessions concurrently. However, each of these multiple unicast sessions would be to a different consumer device 104 or would be independent unicast sessions to the same device 104, even if the same programming data were being communicated in the multiple unicast sessions.

It should be noted that each unicast session typically involves a dedicated server and also relies on having access to a particular quality of service for network path resources. An operator of server 102 typically plans network and server capacity to meet a peak demand. This can result in significant resource needs for the unicast sessions as deployments scale to serve large numbers of users.

As discussed in more detail below, unicast module 112 receives a request from a consumer device 104 for programming that is currently being aired. Unicast module 112 establishes a unicast session with the requesting consumer device 104, and a portion of the program that has already been aired is sent to the consumer device 104 from network buffer 114 via the unicast session. Once the data that is sent via the unicast session catches up to the data being broadcast as programming 120, consumer device 104 switches to obtaining the remaining portions of the programming from a different source. This different source could be, for example, the source of programming 120 as programming 120 is being multicast broadcast, or from a local storage device of the consumer device 104 as discussed in more detail below.

Each consumer device 104 can be a variety of different types of devices. For example, a consumer device 104 can be a desktop computer, a mobile station, an entertainment appliance, a television, a portable computer, a television set-top box, a cellular or other wireless phone, a gaming system, an automotive computer, and so forth. Thus, consumer devices 104 may range from a full resource device with substantial memory and processor resources (e.g., personal computers, game consoles) to a low-resource device with limited memory and/or processing resources (e.g., traditional set-top boxes, hand-held game consoles).

Each consumer device 104 includes a unicast module 132, a multicast module 134, a local storage module 136, and a program playback module 138. It is also to be appreciated that a consumer device 104 can include multiple unicast modules 132, multiple multicast modules 134, multiple local storage modules 136, and/or multiple program playback modules 138. Unicast module 132 communicates with unicast module 112 of server 102 to establish a unicast session between server 102 and consumer device 104. Unicast module 132 also manages obtaining data from server 102 (the programming data from network buffer 114) via the unicast session. Unicast module 132 forwards the data obtained via the unicast session to program playback module 138 for playback, and/or to local storage module 136 for storage. In one or more embodiments, unicast module 132 initiates establishing the unicast session with module 112 in response to a user request received at consumer device 104 for a particular program to be played back and/or recorded, as discussed in more detail below.

Multicast module 134 manages obtaining programming 120 as the programming 120 is being multicast broadcast. Multicast module 134 receives programming 120 via network 106, and forwards the data obtained from the multicast broadcast to program playback module 138 for playback, and/or to local storage module 136 for storage.

Local storage module 136 manages the storage of programming data on a local storage device of consumer device 104. Module 136 can implement, for example, a digital video recorder (DVR). In one or more embodiments this local storage device is included as part of consumer device 104 (e.g., an internal disk drive of consumer device 104). An example of such a local storage device is shown as storage device 140(1). Alternatively, this local storage device can be coupled to consumer device 104, such as via a bus (e.g., an IEEE 1394 bus, a universal serial bus (USB), a wireless universal serial bus (wireless USB), etc.), via a local network (e.g., a LAN), and so forth. An example of such a local storage device is shown as storage device 140(M). Programming that is obtained by unicast module 132 and/or multicast module 134 can be stored in the local storage device 140 by local storage module 136.

Program playback module 138 manages the playback of programming by consumer device 104. Consumer device 104 can include display and/or audio playback components via which programming is played back, or alternatively consumer device 104 can output a signal to one or more other components or devices which in turn can display and/or audibly playback the programming. The video content of programming can be played back on any type of television, monitor, LCD, projector, or similar television-based display system that renders video and/or image data. The audio content of programming can be played back on any type of television, stereo, or similar television-based audible playback system that renders audio data.

The programming played back by program playback module 138 can be programming received from unicast module 132, programming received from multicast module 134, and/or programming retrieved from a local storage device 140 by local storage module 136. Playback module 136 can playback programs that have been received in their entirety, as well as portions of programs (e.g., one part of a program can be played back while one or more other parts of the program are being received from multicast module 134 or unicast module 132).

Users can input requests to consumer devices 104 for programming to be played back and/or recorded in a variety of different manners. In one or more embodiments, an electronic programming guide (EPG) is displayed to the user. The EPG includes a listing of various programs that are available, and optionally other information such as a channel on which the programs are available, a time at which the programs are aired, summary information describing the programs, and so forth. The user can navigate through the EPG in any of a variety of conventional manners (e.g., using directional keys on a remote control device) to select a particular program that he or she desires to have recorded. Alternatively, such requests can be input in other manners, such as selection of a program from a drop-down menu, inputting text identifying the program, selecting of one or more channel identifiers on a remote control (e.g., entering a channel number on the remote control), and so forth. Additionally, requests can optionally be forwarded to consumer device 104 from another device. For example, a user of a handheld device or cellular phone can send a request to consumer device 104 to request playback and/or recording of particular programming.

During operation, a user of consumer device 104 can request particular programming 120. This request can be a request to view and/or record the programming 120. Additionally, this request can be a request to view a particular program, or alternatively to just watch whatever programming is currently being aired on a particular channel. Situations often arise where the user requests particular programming 120 after a particular program has already begun airing. In such situations, unicast module 132 establishes a unicast session with server unicast module 112 of server 102 in order to obtain the portion of the particular program that has already begun airing from network buffer 114. Once the programming data obtained via the unicast session catches up to the programming data being multicast as programming 120, the unicast session can be terminated and the remaining portion of the programming obtained via the multicast broadcast.

In situations where the user requests to view and/or record a particular program, then the previously aired portion of that program is obtained as the previously aired portion of the programming by unicast module 132 via a unicast session. The previously aired portion of a program is the portion of the program that was aired starting with the beginning of the program and spanning up to the time of the user request. The previously aired portion of the program can be readily identified by consumer device 104 and/or server 102 using programming guide data (e.g., EPG data) or other metadata associated with programming 120.

In situations where the user requests to view and/or record a particular channel rather than requesting a particular program, the previously aired portion of the programming can be identified in different manners. In one or more embodiments, a current program being aired on the channel is identified and the previously aired portion of the programming is the previously aired portion of the identified program. The program can be identified in different manners, such as via programming guide data or other metadata associated with programming 120.

In other embodiments, the previously aired portion of the programming is identified by going backwards in time from the point in time at which the request was received. For example, the previously aired portion of the program can be a certain amount of time before the point in time at which the request was received (e.g., the preceding 15 minutes, the preceding hour, etc.). By way of another example, the previously aired portion of the programming can be the programming received since a most recent particular interval before the point in time at which the request was received (e.g., the most recent time on the hour, the most recent time on the half-hour, and so forth). As a specific example, if the request was received at 5:37 pm, then the previously aired programming could be the programming from 5:30 pm to 5:37 pm, from 5:00 pm to 5:37 pm, from 4:00 pm to 5:37 pm, and so forth. It is further to be appreciated that the previously aired portion of the programming can alternatively be identified in other manners.

In one or more embodiments, the user request is a request to playback and/or record particular programming after the airing of the programming has already begun. This request can be made by the user in a variety of different manners. The request could be a specific "restart" request via which the user requests playback and/or recording of the programming even though airing of the programming has already begun. The "restart" request invokes the restart TV functionality discussed herein. The "restart" request could be input by the user in a variety of different manners, such as by pressing a "restart" key, selecting an on-screen "restart" menu option, selecting a program that has already begun airing from an electronic programming guide, other inputs, and so forth. Alternatively, the request could be inferred by other user inputs, such as tuning to a particular channel. For example, consumer device 104 can be configured so that whenever the user tunes to or otherwise requests programming from certain channels, the tuning or other request is interpreted as a request to playback programming that has already begun airing. These certain channels can be set in different manners, such as via user preferences, device default settings, and so forth.

By way of yet another example, the "restart" request can be inherently input when a user enters a "rewind" or "skip back" command (e.g., presses a "rewind" or "skip back" button on a remote control). In response to such a command, the programming will be played back rolling backwards, using first any portion already captured on local storage device 140 and then continuing with a portion received via a unicast session with server 102. In one or more embodiments, the user can rewind up to the earliest point of time of programming available on server 102 (e.g., 4 hours ago) or up to a point that is the beginning of the current program. When the user reaches that point the programming received via the unicast session with server 102 automatically starts playing (in the normal forward direction). If the user were to enter a "fast forward" or "skip" command, playback of the programming at a faster rate would continue with programming received via the unicast session with server 102 until the data received via the unicast session catches up to the multicast broadcast (or to data stored on local storage device 140).

The user request could also be a request automatically input on behalf of the user, or inherent in some other request or situation. For example, a "restart" request can be incorporated into a recovery process in which a portion of the programming was missed due to a failure or other problem (e.g., a device or system crashes). As part of the recovery process, a "restart" request is included so that the missed portion of the programming can be obtained via a unicast session with server 102.

As indicated above, once the programming data obtained via the unicast session catches up to the programming data being multicast as programming 120, the unicast session can be terminated and the remaining portion of the programming can be obtained from another source. The manner in which the unicast session catches up to the programming data being multicast as programming 120 can vary. Generally, the data being received via the unicast session catching up to the multicast broadcast refers to the situation where the data from the unicast session is the same as the data being multicast broadcast.

In the discussions herein, reference is made to bandwidth and the amount of bandwidth available to the consumer devices 104. Generally, the amount of bandwidth available to a particular consumer device 104 refers to the amount of data that the particular device 104 can receive. Bandwidth is oftentimes expressed in megabits per second (Mbps), although other units of measure can alternatively be used. The amount of data that a device 104 can receive can vary based on the particular device, the location of the device, a type of network the device is coupled to, other data being transferred to the device, and so forth.

In one or more embodiments, consumer device 104 obtains the previously aired portion of the programming via the unicast session concurrently with obtaining at least a portion of the remaining portion of the programming being multicast as programming 120. In such embodiments, it is assumed that consumer device 104 has sufficient bandwidth to obtain the portions of the program via the unicast session and the multicast broadcast concurrently. By way of example, assume that programming is played back at consumer device 104 at a rate of 1 Mbps, and that consumer device 104 has 2 Mbps of available bandwidth. Accordingly, the previously aired programming is transferred to consumer device 104 via the unicast session at a rate of 1 Mbps, and the multicast broadcast of the remaining portion of the programming is broadcast at a rate of 1 Mbps. Accordingly, in this example consumer device 104 would use the available 2 Mbps of bandwidth in order to concurrently obtain both the previously aired programming and the remaining programming. In this example, the unicast session catches up to the multicast broadcast at the time in the programming that consumer device 104 began obtaining the remaining portion of the program via the multicast broadcast.

Figure 2:
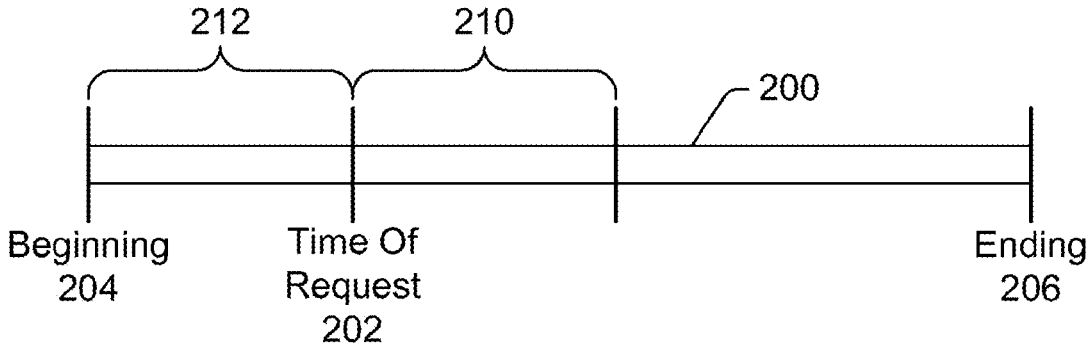
FIGS. 2, 3, and 4 illustrate different examples of the reducing unicast session duration with restart TV in accordance with one or more embodiments.

FIG. 2 illustrates an example of the reducing unicast session duration with restart TV in accordance with one or more embodiments. FIG. 2 illustrates an example situation where the previously aired portion of the programming is obtained via the unicast session concurrently with obtaining at least a portion of the remaining portion of the programming. In the example of FIG. 2, programming 200 is represented by a bar. A request to playback and/or record programming 200 after it has begun airing is received at time 202. A previously aired portion of the programming spanning from a programming beginning time 204 and the time 202 of the request is transferred to the consumer device via a unicast session. This beginning time 204 can be a time at which a particular program began airing, or alternatively this previously aired portion can be identified in other manners as discussed above.

The remaining portion of the programming 200, spanning from time 202 to the programming ending time 206 is transferred to the consumer device via the multicast broadcast. The programming ending time 206 refers to the time at which the consumer device stops recording and/or playing back the programming 200 being received. This programming ending time 206 can be identified in different manners, such as being the time at which airing of a particular program requested by the user ends, being the time at which the user changes channels, and so forth.

The example of FIG. 2 assumes that the previously aired programming is obtained by the consumer device at the same rate as the programming is played back by the consumer device. Accordingly, for an amount of time 210 after the time 202 of the request, the previously aired portion of the programming is obtained via the unicast session concurrently with obtaining the remaining portion of the programming via the multicast broadcast. The amount of time 210 is approximately equivalent to the amount of time 212 between the beginning time 204 and the time 202 of the request.

As the multicast broadcast is obtained, it is stored on a local storage device by the consumer device (e.g., by a local storage module 136 of FIG. 1). In response to the request received at time 202, playback of programming 200 at the consumer device begins at beginning time 204 using the programming data obtained via the unicast session. After amount of time 212 elapses, the playback of programming 200 at the consumer device continues using the data from the multicast broadcast that was stored on the local storage device. Accordingly, the unicast session can be terminated after the amount of time 212 elapses as the unicast session has caught up with the multicast broadcast. The remaining portion of programming 200 is played back from the multicast broadcast data stored on the local storage device by the consumer device. The duration of the unicast session can thus be reduced because the remaining portion of programming 200 is obtained via the multicast broadcast.

It should also be noted that, in the example of FIG. 2, after the unicast session is terminated the remaining portion of programming 200 is typically played back from the local storage device of the consumer device. As the user requested playback of the programming 200 after the programming 200 had already begun airing, the user is essentially watching a delayed version of programming 200 (delayed relative to the time the programming 200 is aired). Accordingly, after the unicast session is terminated, part of programming 200 previously recorded by the consumer device from the multicast broadcast is played back, while concurrently portions of programming 200 being multicast broadcast are recorded for subsequent playback.

Returning to FIG. 1, situations can arise where consumer device 104 has additional bandwidth beyond that used for the unicast session and the multicast broadcast. In such situations, the previously aired programming can be transferred to consumer device 104 via the unicast session at a rate that is faster than the rate at which the programming is played back. This transferring of the data at a faster rate allows the previously aired portion of the programming to catch up to the multicast broadcast more quickly, and allows the unicast session to thus be terminated more quickly.

By way of example, assume that programming is played back at consumer device 104 at a rate of 1 Mbps, and that consumer device 104 has 3 Mbps of available bandwidth. The remaining portion of the programming is multicast broadcast at a rate of 1 Mbps. The previously aired portion of the programming is obtained via the unicast session at a rate up to the 2 Mbps available bandwidth, allowing the previously aired portion of the program to be obtained at twice the rate as it is played back. Accordingly, in this example consumer device 104 would use the available 3 Mbps of bandwidth in order to concurrently obtain both the previously aired programming and the remaining programming. In this example, the unicast session catches up to the multicast broadcast at a time in the programming prior to the time at which consumer device 104 began obtaining the remaining portion of the program via the multicast broadcast.

Figure 3:
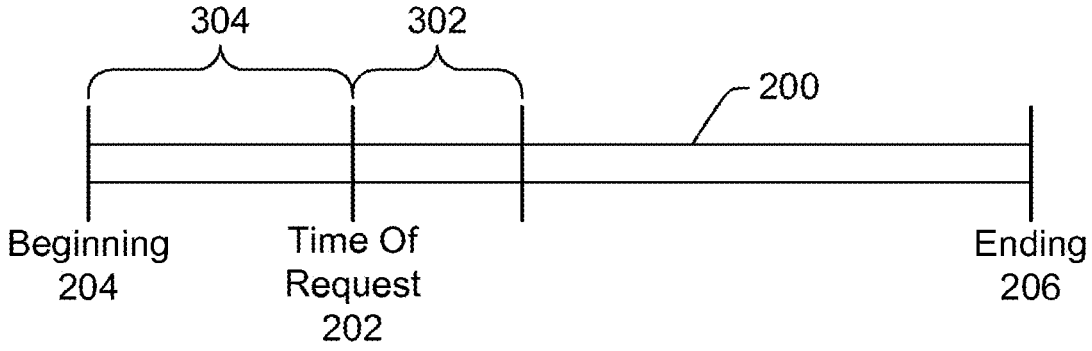

FIG. 3 illustrates an example of the reducing unicast session duration with restart TV in accordance with one or more embodiments. FIG. 3 illustrates an example situation where the previously aired portion of the programming is obtained via the unicast session concurrently with obtaining at least a portion of the remaining portion of the programming, and where consumer device 104 has additional bandwidth beyond that used for the unicast session and the multicast broadcast. In the example of FIG. 3, programming 200 is represented by a bar. A request to playback and/or record programming 200 after it has begun airing is received at time 202. A previously aired portion of programming 200 spanning from a programming beginning time 204 and the time 202 of the request is transferred to the consumer device via a unicast session. The remaining portion of programming 200, spanning from time 202 to the programming ending time 206 is transferred to the consumer device via the multicast broadcast. These times 202, 204, and 206 are those discussed above with reference to FIG. 2.

In FIG. 3, at least part of the remaining portion of the programming is obtained by the consumer device concurrently with the unicast session. The example of FIG. 3 assumes that the previously aired programming is obtained by the consumer device at a rate that is faster than the rate at which the programming is played back by the consumer device. Accordingly, for an amount of time 302 after the time 202 of the request, the previously aired portion of the programming 200 is obtained via the unicast session concurrently with obtaining the remaining portion of the programming 200 via the multicast broadcast. The amount of time 302 is less than the amount of time 304 between the beginning time 204 and the time 202 of the request because of the faster transfer rate.

As the multicast broadcast is obtained, it is stored on a local storage device by the consumer device (e.g., by a local storage module 136 of FIG. 1). Additionally, the excess bandwidth is used by the unicast session to transfer portions of programming 200 beginning at time 202 working backwards towards beginning time 204. These portions transferred in the excess bandwidth are also stored on the local storage device by the consumer device (e.g., by a local storage module 136 of FIG. 1).

In response to the request received at time 202, playback of programming 200 at the consumer device begins at beginning time 204 using the programming data obtained via the unicast session. After the part of programming 200 that was originally aired between time 204 and time 202 has been transferred via the unicast session (the amount of time 302), playback of programming 200 at the consumer device continues using the data stored on the local storage device of the consumer device. This playback from the local storage device begins using the data that was stored from the unicast session (the data transferred in the excess bandwidth), then continues using the data from the multicast broadcast. Accordingly, the unicast session can be terminated after the amount of time 302 elapses as the unicast session has caught up with the multicast broadcast. The duration of the unicast session can thus be reduced because the remaining portion of programming 200 is obtained via the multicast broadcast, and further because the excess bandwidth is used to obtain the previously aired portion of programming 200 more quickly.

Alternatively, the unicast session can be used to obtain the previously aired portion of the programming in other manners other than using the excess bandwidth to transfer portions of programming 200 beginning at time 202 working backwards towards beginning time 204. By way of example, the unicast session could use the excess bandwidth to generate a buffer locally on the consumer device (e.g., by local storage module 136 of FIG. 1). This buffer would be filled working forward from time 204 to time 202, until the unicast session catches up to the multicast broadcast. In this example, the previously aired programming is played back from the buffer on the consumer device rather than being played back as it is received in the unicast session.

Returning to FIG. 1, situations can arise where consumer device 104 does not have sufficient bandwidth to obtain both the previously aired programming via the unicast session and the remaining portion of the programming via the multicast broadcast concurrently. In such situations, consumer device 104 obtains the data for the programming via the unicast session until the data obtained via the unicast session catches up with the multicast broadcast. If there is sufficient bandwidth, the data can be transferred to consumer device 104 via the unicast session at a rate that is faster than the rate at which the programming is played back in order to catch up with the multicast broadcast quicker.

By way of example, assume that programming is played back at consumer device 104 at a rate of 1 Mbps, that the programming is multicast broadcast at a rate of 1 Mbps, and that consumer device 104 has 1.5 Mbps of available bandwidth. The previously aired portion of the programming is obtained via the unicast session at a rate up to the 1.5 Mbps available bandwidth. Additional portions of the programming aired after the request to playback and/or record the programming are also obtained via the unicast session. In this example, the unicast session catches up to the multicast broadcast at a time in the programming after the time at which the user requested playback and/or recording of the programming.

Figure 4:
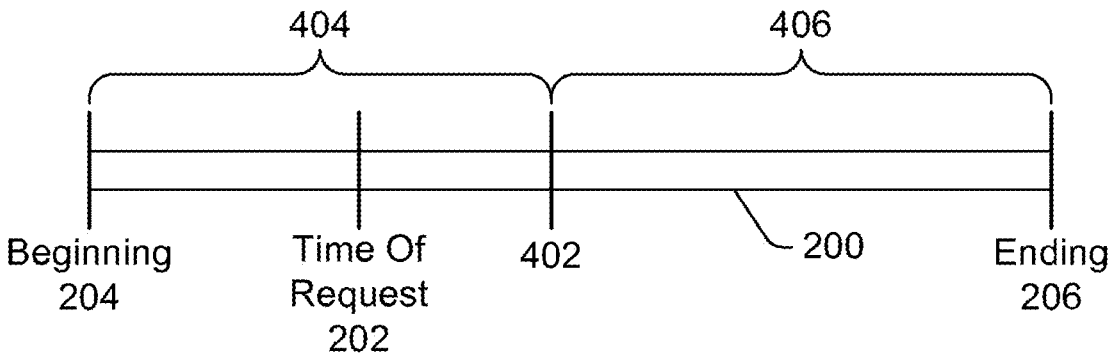

FIG. 4 illustrates an example of the reducing unicast session duration with restart TV in accordance with one or more embodiments. FIG. 4 illustrates an example situation where the consumer device has insufficient bandwidth to obtain both the previously aired programming via the unicast session and the remaining portion of the programming via the multicast broadcast concurrently. In the example of FIG. 4, programming 200 is represented by a bar, the programming 200 having a beginning time 204 and an ending time 206. A request to playback and/or record programming after it has begun airing is received at time 202. These times 202, 204, and 206 are those discussed above with reference to FIG. 2.

In response to the request to playback and/or record programming 200 at time 202, transfer of a previously aired portion of the programming from programming beginning time 204 begins. The portion of programming 200 being multicast broadcast is not received and stored by the consumer device as there is insufficient bandwidth for the consumer device to do so.

If there is no excess bandwidth beyond the rate at which the consumer device plays back programming 200, then the unicast session typically does not catch up to the multicast session. However, if there is excess bandwidth beyond the rate at which the consumer device plays back programming 200, then the unicast session can catch up to the multicast broadcast, typically at some time after time 202. Whether the unicast session catches up to the multicast broadcast, and if so the exact time at which the unicast session catches up to the multicast broadcast, can vary based on the amount of excess bandwidth, the time 202 the request was received, and how much time remains between the time 202 the request was received and the programming ending time 206.

FIG. 4 illustrates one example where the consumer device has excess bandwidth beyond the rate at which the consumer device plays back programming 200. In this example, the unicast session catches up to the multicast broadcast at a time 402 that is later in programming 200 than the time 202 that the request was received. The consumer device stores on a local storage device (e.g., using a local storage module 136 of FIG. 1) portions of programming 200 obtained via the unicast session that are not yet played back. Once the unicast session catches up to the multicast broadcast, the consumer device begins storing the multicast data on the local storage device (e.g., using a local storage module 136 of FIG. 1). In this example, portion 404 of the programming is obtained via the unicast session, while portion 406 of the programming is obtained via the multicast broadcast. The duration of the unicast session can thus be reduced because of the excess bandwidth being used to obtain portions of programming 200 more quickly.

Thus, following this example in FIG. 4, in response to the request at time 202, playback of the programming begins with the programming being obtained via the unicast session. After the unicast session catches up to the multicast broadcast, playback of the programming continues using the data stored on the local storage device of the consumer device. This playback from the local storage device begins using the data that was stored from the unicast session (the data transferred in the excess bandwidth), then continues using the data from the multicast broadcast.

In alternate embodiments, situations where the consumer device has insufficient bandwidth to obtain programming from the unicast session and the multicast broadcast concurrently are managed differently. By way of example, if the multicast broadcast protocol allows the multicast broadcast to be joined even if the consumer device has insufficient bandwidth, then the consumer device can obtain part of the programming via the multicast broadcast concurrently with obtaining part of the programming via the unicast session. Any parts of the multicast broadcast that could not be recorded due to the insufficient bandwidth can be obtained in other manners, such as via the unicast session, via another multicast broadcast, and so forth.

Various examples are discussed with reference to FIGS. 2-4 above. These examples refer to the playback of programming 200, although it is to be appreciated that the techniques discussed above can be used in situations where programming 200 is being recorded but not yet played back. In such situations, the data received via the unicast session is recorded to the local storage device of the consumer device rather than being played back. Subsequently, in response to a user request to playback the data, the programming data received via the unicast session and the multicast session is played back from the local storage device.

Also in the discussions of FIGS. 2-4, reference is made to a time 202 that a request is being received. It is to be appreciated that various actions based on time 202 are only approximations, and that various delays may be present with respect to time 202. For example, a delay (e.g., 300 milliseconds, 2 seconds, 5 seconds, etc.) may exist between the time the user physically inputs a request and the time the consumer device begins obtaining and recording the multicast broadcast.

As discussed above, a switch from obtaining data via the unicast session to obtaining data from another source is made when the unicast session catches up to the multicast broadcast. Generally, this catching up refers to the situation where the data received (or to be received) via the unicast session is the same as the data received (or to be received) via the multicast broadcast. This situation can be identified in a variety of different manners.

In one or more embodiments, the programming is separated into multiple pieces or packets each having an associated timestamp. This timestamp can be, for example, the time at which that piece or packet is to be played back relative to the other pieces or packets in the programming (e.g., a presentation timestamp), the time at which the piece or packet is to be sent to consumer devices relative to the other pieces or packets in the programming (e.g., a delivery timestamp), a specific date and/or time at which that piece or packet is to be played back, and so forth. When the timestamp for a piece or packet received via the unicast session is the same as the timestamp for a piece or packet being broadcast via the multicast broadcast, then the unicast session has caught up to the multicast broadcast. In one or more embodiments, this determination of when the timestamps are the same can be made by a server (e.g., server 102 of FIG. 1). Alternatively, the timestamps for pieces or packets being broadcast via the multicast broadcast can be made available to the consumer device, in which case the consumer device can make the determination.

Figure 5:
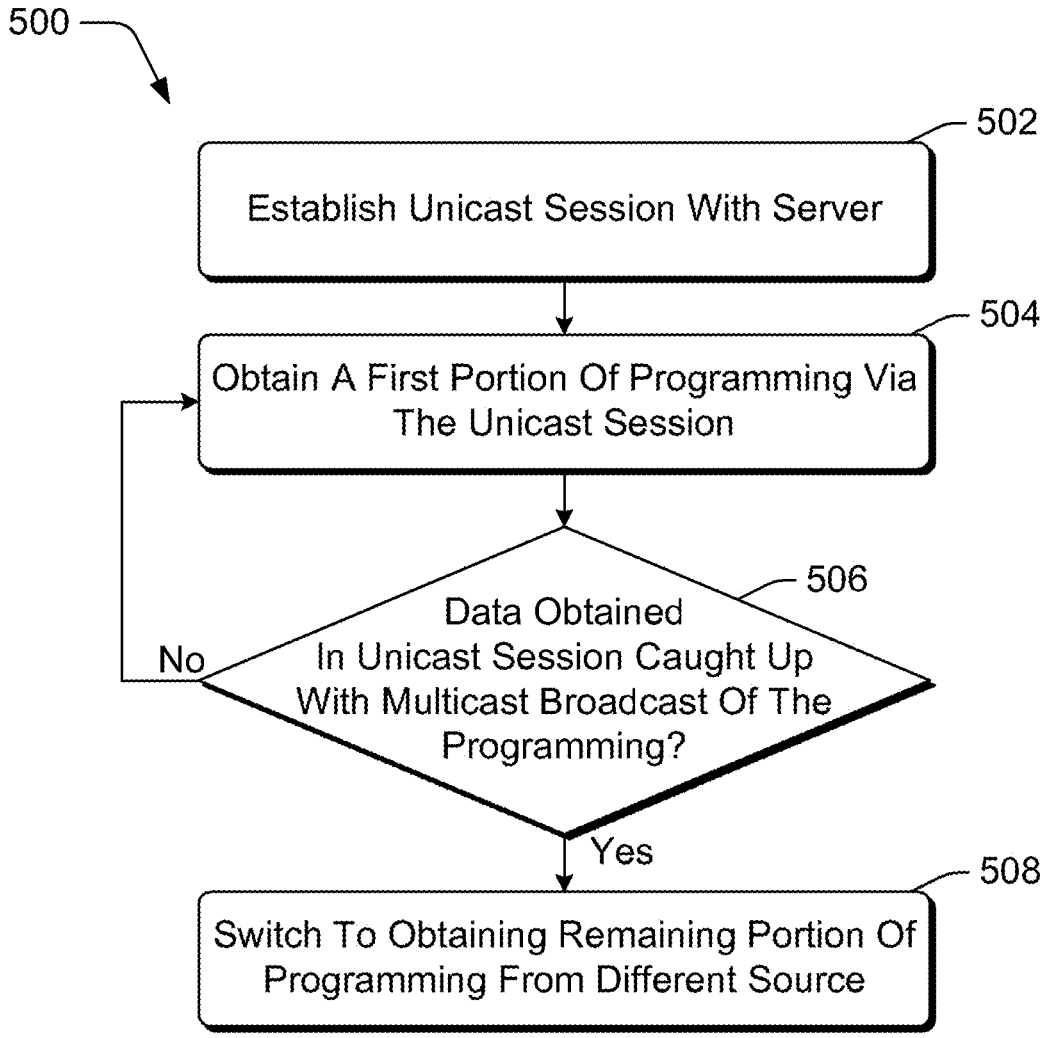
FIG. 5 is a flowchart illustrating an example process for reducing unicast session duration with restart TV in accordance with one or more embodiments.

FIG. 5 is a flowchart illustrating an example process 500 for reducing unicast session duration with restart TV in accordance with one or more embodiments. Process 500 is carried out by a consumer device, such as a device 104 of FIG. 1, and can be implemented in software, firmware, hardware, or combinations thereof. Process 500 is an example process for reducing unicast session duration with restart TV. Additional discussions of reducing unicast session duration with restart TV are included herein with reference to different figures.

In process 500, a unicast session is established with a server (act 502). This unicast session is typically established in response to a request from a user of the consumer device to playback and/or record programming that has already begun airing. A first portion of programming is obtained via the unicast session (act 504). A check is made as to whether the data in the unicast session has caught up with the multicast broadcast of the programming (act 506), and this first portion continues to be obtained via the unicast session until the data in the unicast session catches up with the multicast broadcast of the programming. As discussed above, the point at which the unicast session catches up with the multicast broadcast of the programming can vary, based at least in part on the time when the request to playback and/or record the programming is received and the amount of bandwidth available to the consumer device. Also as discussed above, the unicast session can be determined to have caught up to the multicast session in a variety of different manners.

When the data obtained in the unicast session has caught up with the multicast broadcast of the programming, then the consumer device switches to obtaining the remaining portion of the programming from a different source (act 508). As discussed above, this different source could be a local storage device (e.g., a local DVR), or could be the multicast broadcast. As part of this switching, a request to terminate the unicast session can be sent to the server.

Figure 6:
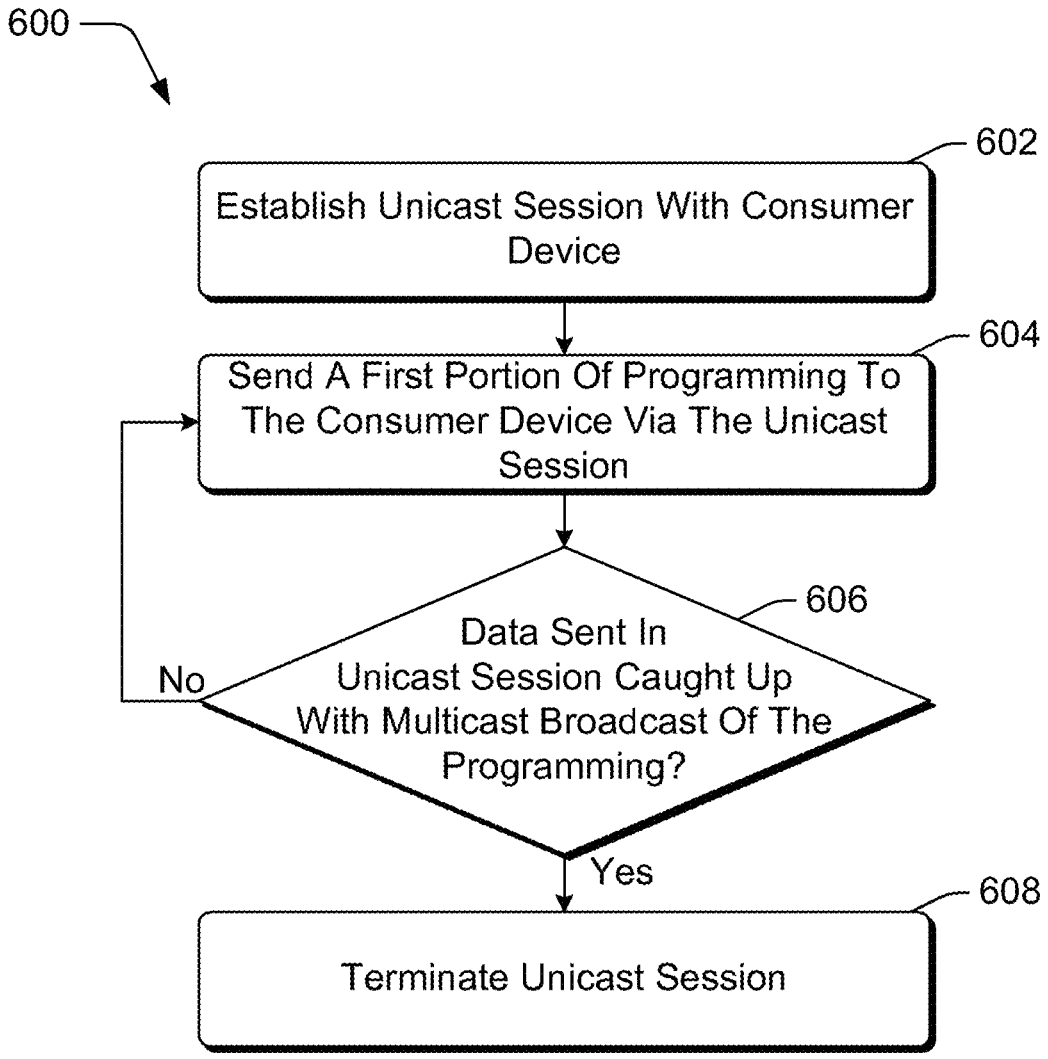
FIG. 6 is a flowchart illustrating another example process for reducing unicast session duration with restart TV in accordance with one or more embodiments.

FIG. 6 is a flowchart illustrating an example process 600 for reducing unicast session duration with restart TV in accordance with one or more embodiments. Process 600 is carried out by a server, such as a server 102 of FIG. 1, and can be implemented in software, firmware, hardware, or combinations thereof. Process 600 is an example process for reducing unicast session duration with restart TV. Additional discussions of reducing unicast session duration with restart TV are included herein with reference to different figures.

In process 600, a unicast session is established with a consumer device (act 602). This unicast session is typically established in response to a request from a user of the consumer device to playback and/or record programming that has already begun airing. A first portion of programming is sent to the consumer device via the unicast session (act 604). This first portion continues to be sent via the unicast session until the data in the unicast session catches up with the multicast broadcast of the programming (act 606). As discussed above, the point at which the unicast session catches up with the multicast broadcast of the programming can vary, based at least in part on the time when the request to playback and/or record the programming is received and the amount of bandwidth available to the consumer device. Also as discussed above, the unicast session can be determined to have caught up to the multicast session in a variety of different manners.

When the data obtained in the unicast session has caught up with the multicast broadcast of the programming, then the unicast session is terminated (act 608). In one or more embodiments the server determines when the unicast session has caught up with the multicast broadcast of the program, and terminates the unicast session at that time. The server also optionally informs the consumer device that the unicast session is being terminated, and that the consumer device is to obtain the remaining portion of the programming from another source. In other embodiments, the consumer device determines when the unicast session has caught up with the multicast broadcast of the program, and informs the server that the unicast session is to be terminated.

It should be noted that, in one or more embodiments various changes can be made to the particular programming that is obtained by the consumer device via the unicast session and/or the multicast broadcast. For example, if the user were to fast forward through part of the previously aired programming being obtained via the unicast session, then that part that is fast forwarded through would not need to be obtained via the unicast session, allowing the unicast session to catch up to the multicast broadcast sooner.

Figure 7:
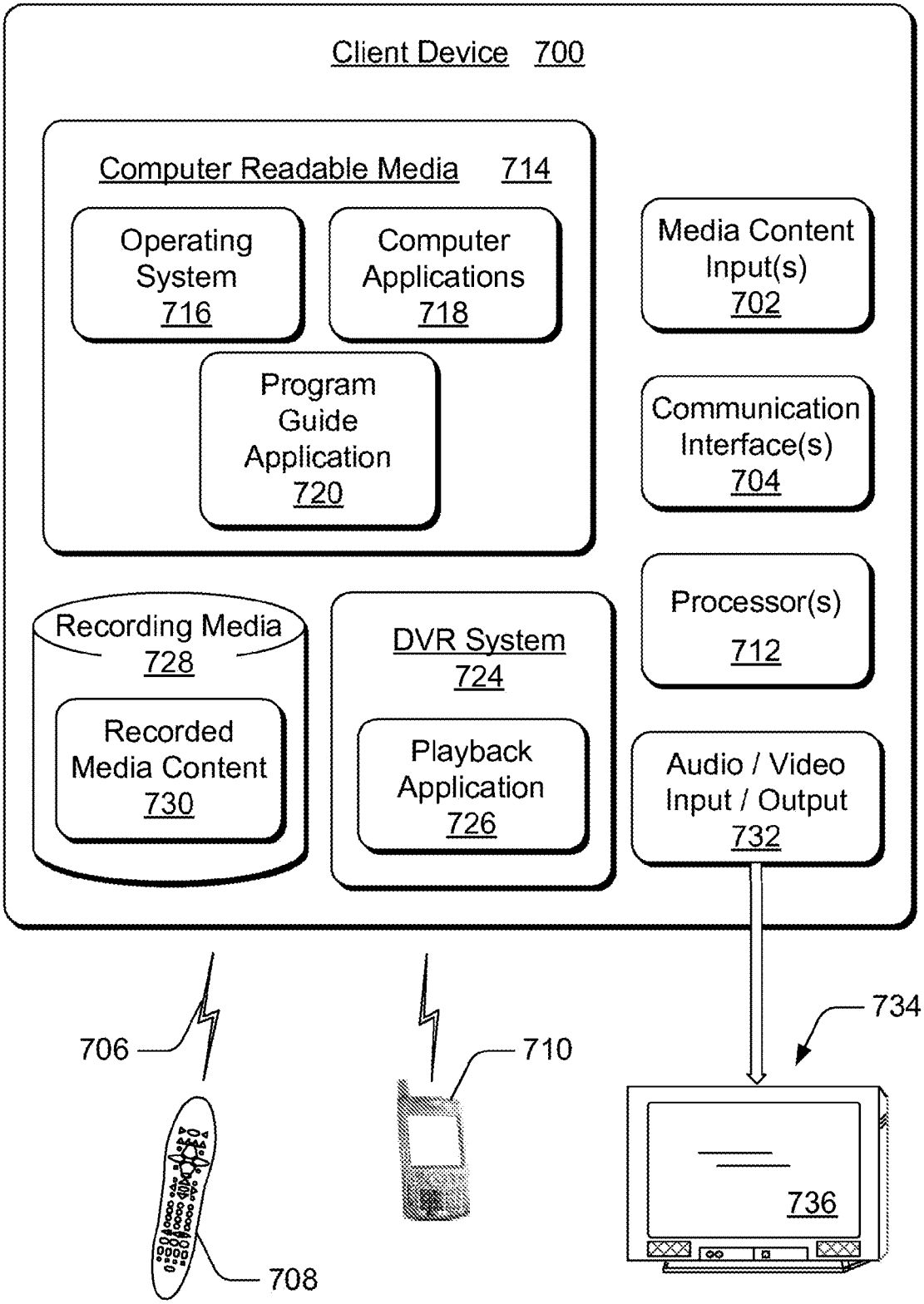
FIG. 7 illustrates various components of an example client device that can implement one or more embodiments of the reducing unicast session duration with restart TV.

FIG. 7 illustrates various components of an example client device 700 that can be implemented as any form of a computing, electronic, or television client device to implement one or more embodiments of the reducing unicast session duration with restart TV. For example, client device 700 can be implemented as any of the consumer devices 104(1-M) shown in FIG. 1. In various embodiments, client device 700 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Client device 700 includes one or more media content inputs 702 that may include Internet Protocol (IP) inputs over which streams of media content (programming) are received via an IP-based network. These streams can be received via unicast sessions and/or multicast broadcasts as discussed above. Client device 700 further includes communication interface(s) 704 that can be implemented as any one or more of a serial and/or parallel interface, a wireless interface, any type of network interface, a modem, and as any other type of communication interface. A wireless interface enables client device 700 to receive control input commands 706 and other information from an input device, such as from remote control device 708, a portable computing-based device (such as a cellular phone) 710, or from another infrared (IR), 802.11, Bluetooth, or similar RF input device.

A network interface provides a connection between client device 700 and a communication network by which other electronic and computing devices can communicate data with device 700. Similarly, a serial and/or parallel interface provides for data communication directly between client device 700 and the other electronic or computing devices. A modem facilitates client device 700 communication with other electronic and computing devices via a conventional telephone line, a DSL connection, cable, and/or other type of connection.

Client device 700 also includes one or more processors 712 (e.g., any of microprocessors, controllers, and the like) which process various computer-executable instructions to control the operation of device 700, to communicate with other electronic and computing devices, and to implement embodiments of the local recording of previously aired programming. Client device 700 can be implemented with computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 714 provides data storage mechanisms to store various information and/or data such as software applications and any other types of information and data related to operational aspects of client device 700. For example, an operating system 716 and/or other computer applications 718 can be maintained as software applications with the computer-readable media 714 and executed on processor(s) 712 to implement embodiments of the local recording of previously aired programming.

Client device 700 can also include a program guide application 720 that is implemented to process program guide data and generate program guides for display. A program guide enables a viewer to navigate through an onscreen display and locate various media content such as broadcast programs, recorded programs, video-on-demand programs and movies, interactive game selections, network-based applications, and other media content of interest to the viewer.

Client device 700 can also include a DVR system 724 with playback application 726, and recording media 728 to maintain recorded media content 730 that client device 700 downloads (or otherwise receives) and/or records. DVR system 724 can optionally include local storage module 136 of FIG. 1. Further, client device 700 may access or receive additional recorded media content that is maintained with a remote data store (not shown). Client device 700 may also receive media content from a video-on-demand server, or media content that is maintained at a broadcast center or content distributor that distributes the media content to subscriber sites and client devices. The playback application 726 is a video control application that can be implemented to control the playback of media content, the recorded media content 730, and/or other video-on-demand media content, music, and any other audio, video, and/or image media content which can be rendered and/or displayed for viewing.

Client device 700 also includes an audio and/or video output 732 that provides audio and/or video data to an audio rendering and/or display system 734. The audio rendering and/or display system 734 can include any devices that process, display, and/or otherwise render audio, video, and image data. Video signals and audio signals can be communicated from client device 700 to a display device 736 via an RF (radio frequency) link, S-video link, composite video link, component video link, DVI (digital video interface), analog audio connection, or other similar communication link. Alternatively, the audio rendering and/or display system 734 can be implemented as integrated components of the example client device 700. Client device 700 along with the audio rendering and/or display system 734 is an example of a viewing system that can be implemented in a household viewing area for viewing television programs and/or receiving other television media content.

Figure 8:
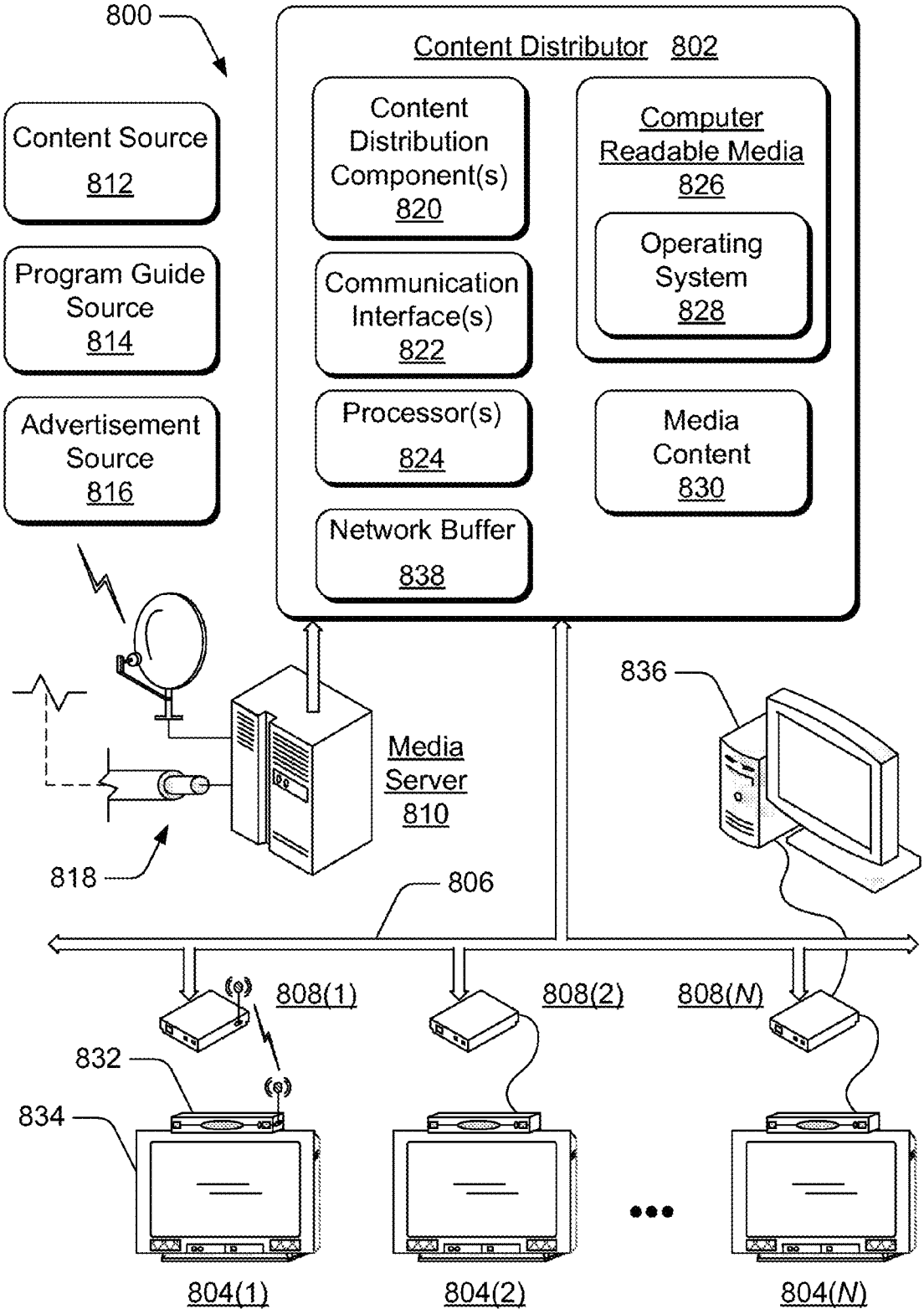
FIG. 8 illustrates an example entertainment and information system in which one or more embodiments of the reducing unicast session duration with restart TV can be implemented.

FIG. 8 illustrates an example entertainment and information system 800 in which one or more embodiments of the reducing unicast session duration with restart TV can be implemented. System 800 facilitates the distribution of media content, program guide data, and advertising content to multiple viewers and to multiple viewing systems. System 800 includes a content distributor 802 and any number "N" of client systems 804(1-N) each configured for communication via a communication network 806. Each client system 804(1-N) is an example of the consumer devices 104(1-M) described with reference to FIG. 1. Each of the client systems 804(1-N) can receive data streams of media content, program content, program guide data, advertising content, closed captions data, and the like from content server(s) of the content distributor 802 via the communication network 806.

The communication network 806 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 806 can be implemented using any type of network topology and any network communication protocol, and can be represented or otherwise implemented as a combination of two or more networks. A digital network can include various hardwired and/or wireless links 808(1-N), routers, gateways, and so on to facilitate communication between content distributor 802 and the client systems 804(1-N).

System 800 includes a media server 810 that receives media content from a content source 812, program guide data from a program guide source 814, and advertising content from an advertisement source 816. In one or more embodiments, the media server 810 represents an acquisition server that receives the audio and video media content from content source 812, an EPG server that receives the program guide data from program guide source 814, and/or an advertising management server that receives the advertising content from the advertisement source 816.

The content source 812, the program guide source 814, and the advertisement source 816 control distribution of the media content, the program guide data, and the advertising content to the media server 810 and/or to other servers. The media content, program guide data, and advertising content can be distributed via various transmission media 818, such as satellite transmission, radio frequency transmission, cable transmission, and/or via any number of other wired or wireless transmission media. In this example, media server 810 is shown as an independent component of system 800 that communicates the program content, program guide data, and advertising content to content distributor 802. In an alternate implementation, media server 810 can be implemented as a component of content distributor 802.

Content distributor 802 is representative of a headend service in a content distribution system, for example, that provides the media content, program guide data, and advertising content to multiple subscribers (e.g., the client systems 804(1-N)). The content distributor 802 can be implemented as a satellite operator, a network television operator, a cable operator, and the like to control distribution of media content, program and advertising content, such as movies, television programs, commercials, music, and other audio, video, and/or image content to the client systems 804(1-N).

Content distributor 802 includes various content distribution components 820 to facilitate media content processing and distribution, such as a subscriber manager, a device monitor, and one or more content servers. The subscriber manager manages subscriber data, and the device monitor monitors the client systems 804(1-N) (e.g., and the subscribers), and maintains monitored client state information.

Although the various managers, servers, and monitors of content distributor 802 (to include the media server 810 in one or more embodiments) are described as distributed, independent components of content distributor 802, any one or more of the managers, servers, and monitors can be implemented together as a multi-functional component of content distributor 802. Additionally, any one or more of the managers, servers, and monitors described with reference to system 800 can implement features and embodiments of the reducing unicast session duration with restart TV.

The content distributor 802 includes communication interface(s) 822 that can be implemented as any type of interface to communicate and receive data from client devices of the television system, including unicast sessions and/or multicast broadcasts as discussed above. The content distributor 802 also includes one or more processors 824 (e.g., any of microprocessors, controllers, and the like) which process various computer-executable instructions to control the operation of content distributor 802. The content distributor 802 also includes a network buffer 838 that operates analogous to network buffer 114 of FIG. 1, temporarily storing programs received from content source 812 (e.g., via media server 810). The content distributor 802 can be implemented with computer-readable media 826 which provides data storage to maintain software applications such as an operating system 828 and media content 830 for distribution to the client systems 804(1-N).

The client systems 804(1-N) can each be implemented to include a client device 832 and a display device 834 (e.g., a television, LCD, and the like). A client device 832 of a respective client system 804 can be implemented in any number of embodiments, such as a set-top box, a digital video recorder (DVR) and playback system, an appliance device, a gaming system, and as any other type of client device that may be implemented in an entertainment and information system. In an alternate embodiment, client system 804(N) is implemented with a computing device 836 as well as a client device. The computing device 836 is an example of a connected data store that can record and maintain media content for a client device. Additionally, any client device 832 of a respective client system 804 can implement features and embodiments of the reducing unicast session duration with restart TV as described herein.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer-readable memory devices, further description of which may be found with reference to FIGS. 7 and 8. The features of the local recording of previously aired programming techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a consumer device, the method comprising:

receiving a request at a first time for programming that has already begun to [air] *transmit*, wherein the programming is scheduled for transmission to a plurality of [users] *user devices* during a scheduled time interval, and wherein the first time corresponds to a point after a beginning time of the scheduled time interval;

determining the beginning time of the scheduled time interval;

obtaining by the consumer device, based on determining the beginning time, via a unicast session with a server, a first portion of the programming [aired] *transmitted* prior to the first time, the first portion including previously [aired] *transmitted* programming, wherein the previously [aired] *transmitted* programming corresponds to programming transmitted to [a] *the* plurality of [users] *user devices* starting from the beginning time of the scheduled time interval, and wherein the first portion is obtained as a first plurality of packets, each packet of the first plurality of packets having a presentation timestamp that indicates a play time of media data that is associated with a corresponding packet of the first plurality of packets;

obtaining by the consumer device, via a multicast broadcast of the programming concurrently with obtaining the first portion by the consumer device via the unicast session, at least part of a remaining portion of the programming that [airs] *transmitted* after the first time, wherein initiating said obtaining the first portion of the programming and said obtaining the remaining portion of the programming begin together at the consumer device, and wherein the multicast broadcast is obtained as a second plurality of packets, each packet of the second plurality of packets having a presentation timestamp that indicates a play time of media data that is associated with a corresponding packet of the second plurality of packets;

[comparing a first presentation timestamp of a first packet of the first plurality of packets with a second presentation timestamp of a second packet of the second plurality of packets;]

determining[, based on the comparing,] whether [the] *a* first presentation timestamp of [the] *a* first packet of the first plurality of packets matches [the] *a* second presentation timestamp of [the] *a* second packet of the second plurality of packets;

in response to determining that the first presentation timestamp of the first packet of the first plurality of packets matches the second presentation timestamp of the second packet of the second plurality of packets, determining that the unicast session has caught up to the multicast broadcast; and stopping, the unicast session when the unicast session has caught up to the multicast broadcast, to obtain the programming data from the unicast session, and continuing to obtain via the multicast broadcast the remaining portion of the programming from a different source other than the server.

2. A method as recited in claim 1, further comprising:

storing at least the part of the remaining portion on a storage device of the consumer device; and wherein the stopping comprises terminating the unicast session.

3. A method as recited in claim 2, wherein the obtaining the first portion of programming comprises obtaining the first portion of the programming at a rate faster than a playback rate of the programming.

4. A method as recited in claim 1, wherein the stopping comprises terminating the unicast session.

5. A method as recited in claim 4, further comprising obtaining, via the unicast session with the server, an additional portion of programming [aired] *transmitted* after the request for the programming is received but before the unicast session catches up to the multicast broadcast of the programming.

6. A method as recited in claim 1, wherein the programming is scheduled for transmission during a plurality of scheduled time intervals, wherein the scheduled time interval is a first of the plurality of scheduled time intervals, further comprising:

selecting a second of the plurality of scheduled time intervals that precedes the first scheduled time interval;

identifying a beginning time of the second scheduled time interval; and wherein the obtaining comprises obtaining, via the unicast session, programming transmitted to [a] *the* plurality of [users] *user devices* starting from the beginning time of the second scheduled time interval.

7. A method as recited in claim 1, wherein:

the request for the programming is a user request to playback particular programming; and the obtaining and the stopping are performed in response to the user request.

8. A method as recited in claim 1, wherein the stopping comprises sending a termination request to the server to terminate the unicast session.

9. A method as recited in claim 1, further comprising playing back the first portion as the first portion is received via the unicast session, and playing back the remaining portion from the different source.

10. A method implemented in a computing device, the method comprising:

sending, to a consumer device via a unicast session with the consumer device, a first portion of programming [aired] *transmitted* prior to a first time that corresponds to a request to at least one of view or record the programming, the first portion including previously [aired] *transmitted* programming and being identifiable using metadata associated with the programming that indicates the previously [aired] *transmitted* programming spans from a beginning of the programming up to the first time that corresponds to the request to at least one of view or record the programming, wherein the programming is scheduled for transmission to a plurality of [users] *user devices* during a scheduled time interval, and wherein the first time corresponds to a point after a beginning time of the scheduled time interval, wherein the consumer device is initiated to obtain the first portion of the programming via the unicast session concurrently with obtaining a multicast broadcast of the programming via the multicast broadcast of the programming, wherein initiating said obtaining the first portion of the programming and said obtaining the multicast broadcast of the programming begin together at the consumer device, wherein the first portion is obtained as a first plurality of packets, each packet of the first plurality of packets having a presentation timestamp that indicates a play time of media data that is associated with a corresponding packet of the first plurality of packets, and the multicast broadcast is obtained as a second plurality of packets, each packet of the second plurality of packets having a presentation timestamp that indicates a play time of media data that is associated with a corresponding packet of the second plurality of packets, wherein the first portion corresponds to programming transmitted to [a] *the* plurality of [users] *user devices* starting from the beginning time of the scheduled time interval, and wherein the multicast broadcast of the programming is configured for storage to enable playback by the consumer device after the first portion of the programming is played back by the consumer device;

[comparing a first presentation timestamp of a first packet of the first plurality of packets with a second presentation timestamp of a second packet of the second plurality of packets;]

determining[, based on the comparing,] whether [the] *a* first presentation timestamp of [the] *a* first packet of the first plurality of packets matches [the] *a* second presentation timestamp of [the] *a* second packet of the second plurality of packets;

in response to determining that the first presentation timestamp of the first packet of the first plurality of packets matches the second presentation timestamp of the second packet of the second plurality of packets, determining that the unicast session has caught up to the stored multicast broadcast of the programming; and stopping the unicast session when the unicast session has caught up to the stored multicast broadcast of the programming.

11. A method as recited in claim 10, wherein the terminating comprises terminating the unicast session in response to a termination request received from the consumer device to terminate the unicast session.

12. A method as recited in claim 10, wherein the sending comprising using excess bandwidth of the consumer device to send the first portion at a rate faster than a playback rate of the programming.

13. A method as recited in claim 10, further comprising sending, via the unicast session with the consumer device, an additional portion of programming [aired] *transmitted* after the first time but before the unicast session catches up to the multicast broadcast of the programming.

14. A method as recited in claim 10, wherein the request to view the programming comprises a request to restart a program at the consumer device, and wherein sending the first portion comprises sending the first portion in response to the request to restart the program.

15. A system *for communication with a consumer device having a local storage device, the system* comprising:

*a server configured to establish a unicast session and/or a multicast broadcast with the consumer device, the server comprising:*

*memory circuitry configured to store content of the unicast session and/or the multicast broadcast for distribution to the consumer device; and*

[control] *processing* circuitry configured to:

receive a request *from the consumer device* at a first time for programming that has already begun to [air] *transmit* , wherein the programming is scheduled for transmission to a plurality of [users] *user devices* during a scheduled time interval, and wherein the first time corresponds to a point after a beginning time of the scheduled time interval;

establish [a] *the* unicast session [with a] *at the* server based on the received request;

determine the beginning time of the scheduled time interval;

obtain, based on determining the beginning time, via the unicast session and in response to the request, a first portion of the programming that [aired] *transmitted* prior to a first time, the first portion including previously [aired] *transmitted* programming and being identifiable using metadata associated with the programming that indicates the previously [aired] *transmitted* programming spans from a beginning of the programming up to the first time, wherein the first portion is obtained at a rate faster than a playback rate of the programming, and wherein the first portion is obtained for playback by the consumer device, wherein the first portion corresponds to programming transmitted to [a] *the* plurality of [users] *user devices* starting from the beginning time of the scheduled time interval, and wherein the first portion is obtained as a first plurality of packets, each packet of the plurality of packets having a presentation timestamp that indicates a play time of media data that is associated with a corresponding packet of the first plurality of packets;

obtain the first portion of the programming via the unicast session, together with obtaining and recording, via [a] *the* multicast broadcast of the programming, at least a first part of the multicast broadcast of the programming, at the consumer device, wherein the multicast broadcast is obtained as a second plurality of packets, each packet of the second plurality of packets having a presentation timestamp that indicates a play time of media data that is associated with a corresponding packet of the second plurality of packets;

[compare a first presentation timestamp of a first packet of the first plurality of packets with a second presentation timestamp of a second packet of the second plurality of packets;]

determine[, based on the comparing,] whether [the] *a* first presentation timestamp of [the] *a* first packet of the first plurality of packets matches [the] *a* second presentation timestamp of [the] *a* second packet of the second plurality of packets;

in response to determining that the first presentation timestamp of the first packet of the first plurality of packets matches the second presentation timestamp of the second packet of the second plurality of packets, determining that data obtained via the unicast session has caught up to the recorded multicast broadcast; and stop, based on determining that data obtained via the unicast session has caught up to the recorded multicast broadcast, obtaining via the unicast session, the first portion of the programming, and obtaining a remaining portion of the programming from [a] *the* local storage device of the consumer device on which the at least the first part of the multicast broadcast was recorded, wherein the remaining portion is obtained for playback by the consumer device.

16. The system defined by claim 15, wherein the [control] *processing* circuitry is configured to record a second part of the multicast broadcast on the local storage device while the first part of the multicast broadcast is being played back from the local storage device.

17. The system defined by claim 15, wherein the request for the programming corresponds to a user request, received by the consumer device, to restart a television program.

18. The method defined by claim 1, further comprising storing the first portion of the programming and the at least part of the remaining portion of the programming concurrently to memory.

19. The method defined by claim 10, wherein the first portion of the programming and the at least part of the remaining portion of the programming are stored concurrently to memory.

20. The system defined by claim 15, wherein the [control] *processing* circuitry is further configured to store the first portion of the programming and the at least part of the remaining portion of the programming concurrently to memory.

*21. A method for playing, on a media device, a portion of programming that was broadcast prior to a time at which the media device began playing the programming the method comprising:*

*beginning to obtain, at a first time, via a first stream, programming that is scheduled for broadcast during a scheduled time interval, wherein the first time corresponds to a point after a beginning time of the scheduled time interval;*

*receiving, at a second time later than the first time, a request for a portion of the programming that was broadcast prior to the first time;*

*in response to receiving the request:*

*obtaining, via a second stream, a first plurality of packets containing media data of a first portion of the programming that was broadcast prior to the first time, each packet of the first plurality of packets having a presentation timestamp that indicates a respective play time of media data;*

*continuing to obtain, via the first stream, the programming, wherein the first stream is obtained as a second plurality of packets, each packet of the second plurality of packets having respective a presentation timestamp that indicates a play time of media data;*

*in response to determining that a presentation timestamp of the most recently obtained packet of the second plurality of packets matches a presentation timestamp of a most recently obtained packet of the first plurality of packets, determining, when playing the programming, that the second stream has caught up to the first stream; and*

*in response to determining that the second stream has caught up to the first stream, ending obtaining the second stream, and continuing to obtain via the first stream a remaining portion of the programming;*

*wherein the first stream is a multicast broadcast and the second stream is a unicast session.*

*22. The method of claim 21, further comprising storing at least the part of the remaining portion on a storage device of the media device.*

*23. The method of claim 21, wherein obtaining the first portion of programming comprises obtaining the first portion of the programming at a rate faster than a playback rate of the programming.*

*24. The method of claim 21, wherein at least part of the first portion of programming is stored on a storage device of the media device.*

*25. The method of claim 21, further comprising:*

*obtaining, via the unicast session, an additional portion of programming that is broadcast after the request is received but before the unicast session catches up to the multicast broadcast of the programming.*

*26. The method of claim 21, wherein the programming is scheduled for transmission during a plurality of scheduled time intervals, wherein the scheduled time interval is a first of the plurality of scheduled time intervals, further comprising:*

*selecting a second of the plurality of scheduled time intervals that precedes the first scheduled time interval;*

*identifying a beginning time of the second scheduled time interval; and*

*wherein the obtaining comprises obtaining, via the second stream, programming transmitted to a plurality of user devices starting from the beginning time of the second scheduled time interval.*

*27. The method of claim 21, wherein:*

*the request for the programming is a user request to play particular programming; and*

*the obtaining, via the second stream, and the ending of the second stream are performed in response to the user request.*

*28. The method of claim 21, wherein the ending comprises sending a termination request to a server to terminate the second stream.*

*29. The method of claim 21, further comprising playing the first portion as the first portion is received via the second stream and playing the remaining portion from the different source.*

*30. The method of claim 21, further comprising generating for display a notification to at least one of the plurality of user devices that the second stream is ending.*

*31. A system for playing a portion of programming that was broadcast prior to a time at which the media device began playing the programming, the system comprising:*

*a server configured to establish a second stream and/or a first stream with the media device, the server comprising:*

*memory circuitry configured to store content of the second stream and/or the first stream for distribution to the media device; and*

*processing circuitry configured to:*

*begin to obtain, at a first time, via the first stream, programming that is scheduled for broadcast during a scheduled time interval, wherein the first time corresponds to a point after a beginning time of the scheduled time interval;*

*receive, at a second time later than the first time, a request from the media device for a portion of the programming that was broadcast prior to the first time;*

*in response to receiving the request:*

*obtain, via the second stream, a first plurality of packets containing media data of a first portion of the programming that was broadcast prior to the first time, each packet of the first plurality of packets having a presentation timestamp that indicates a respective play time of media data;*

*continue to obtain, via the first stream, the programming, wherein the first stream is obtained as a second plurality of packets, each packet of the second plurality of packets having respective a presentation timestamp that indicates a play time of media data;*

*in response to determining that a presentation timestamp of the most recently obtained packet of the second plurality of packets matches a presentation timestamp of a most recently obtained packet of the first plurality of packets, determine, when playing the programming, that the second stream has caught up to the first stream; and*

*in response to determining that the second stream has caught up to the first stream, end obtaining the second stream, and continue to obtain via the first stream a remaining portion of the programming;*

*wherein the first stream is a multicast broadcast and the second stream is a unicast session.*

*32. The system of claim 31, further comprising a storage device, wherein the processing circuitry is further configured to store at least the part of the remaining portion on the storage device.*

*33. The system of claim 31, wherein the processing circuitry configured to obtain the first portion of programming is further configured to obtain the first portion of the programming at a rate faster than a playback rate of the programming.*

*34. The system of claim 31, further comprising a storage device, wherein at least part of the first portion of programming is stored on the storage device.*

*35. The system of claim 31, wherein the processing circuitry is further configured to obtain, via the second stream, an additional portion of programming that is broadcast after the request is received but before the second stream catches up to the first stream of the programming.*

*36. The system of claim 31, wherein the programming is scheduled for transmission during a plurality of scheduled time intervals, wherein the scheduled time interval is a first of the plurality of scheduled time intervals, and wherein the processing circuitry is further configured to:*

*select a second of the plurality of scheduled time intervals that precedes the first scheduled time interval;*

*identify a beginning time of the second scheduled time interval; and*

*wherein the obtaining comprises obtaining, via the second stream, programming transmitted to a plurality of user devices starting from the beginning time of the second scheduled time interval.*

*37. The system of claim 31, wherein:*

*the request for the programming is a user request to play particular programming; and*

*the processing circuitry is further configured to perform the obtaining, via the second stream, and the ending of the second stream in response to the user request.*

*38. The system of claim 31, wherein the processing circuitry configured to end the second stream is further configured to send a termination request to a server to terminate the second stream.*

*39. The system of claim 31, wherein the processing circuitry is further configured to play the first portion as the first portion is received via the second stream and playing the remaining portion from the different source.*

*40. The system of claim 31, wherein the processing circuitry is further configured to generate for display a notification to at least one of the plurality of user devices that the second stream is ending.*

* * * * *